US012683205B2

(12) United States Patent
Thramann

(10) Patent No.: US 12,683,205 B2
(45) Date of Patent: Jul. 14, 2026

(54) ENERGY STORAGE CANOPY

(71) Applicant: LT350, LLC, Longmont, CO (US)

(72) Inventor: Jeffrey Thramann, Longmont, CO (US)

(73) Assignee: LT350, LLC, Longmont, CO (US)

( * ) Notice: Subject to any disclaimer, the term of this patent is extended or adjusted under 35 U.S.C. 154(b) by 160 days.

(21) Appl. No.: 18/422,792

(22) Filed: Jan. 25, 2024

(65) Prior Publication Data

US 2024/0243373 A1    Jul. 18, 2024

Related U.S. Application Data

(63) Continuation of application No. 17/526,548, filed on Nov. 15, 2021, now Pat. No. 11,916,205, which is a
(Continued)

(51) Int. Cl.
*H01M 10/46* (2006.01)
*B60L 50/64* (2019.01)
(Continued)

(52) U.S. Cl.
CPC ........... *H01M 10/465* (2013.01); *B60L 50/64* (2019.02); *B60L 53/30* (2019.02); *B60L 53/305* (2019.02);
(Continued)

(58) Field of Classification Search
CPC ..... H01M 10/465; H01M 10/46; B60L 50/64; B60L 53/30; B60L 53/305; B60L 53/51;
B60L 53/63; B60L 53/64; B60L 53/65; B60L 53/665; B60L 53/80; B60L 55/00; B60L 58/21; B60L 58/26; B60L 2210/30;
(Continued)

(56) References Cited

U.S. PATENT DOCUMENTS 3,744,195 A    7/1973    Ferkich
4,030,478 A    6/1977    Beaver, Jr.
(Continued)

FOREIGN PATENT DOCUMENTS

CA    2794602 A1    10/2011
CN    102142702 A    8/2011
(Continued)

OTHER PUBLICATIONS

"Electric cars, batteries exchange, infinite power and the open road", Le Blog Exuberance, 3 pages, http://leblog.exuberance.com/2006/07/electric_cars_b.html.
(Continued)

*Primary Examiner* — M Baye Diao
(74) *Attorney, Agent, or Firm* — Husch Blackwell LLP

(57) ABSTRACT
An energy storage canopy associated with a local building is provided. The energy storage canopy includes support members that can support compartments, which may be integral with or removable from the energy storage canopy. Each compartment includes a plurality of high capacity batteries to store electrical energy, at least one power conditioner to allow coupling high capacity batteries to an external unit. The external unit may be a power grid, a building, other loads, or the like.

12 Claims, 39 Drawing Sheets

Related U.S. Application Data continuation-in-part of application No. 16/811,391, filed on Mar. 6, 2020, now Pat. No. 11,245,138, which is a continuation of application No. 16/249,728, filed on Jan. 16, 2019, now Pat. No. 10,587,015, which is a continuation-in-part of application No. 15/486,000, filed on Apr. 12, 2017, now abandoned, which is a continuation of application No. 14/678,476, filed on Apr. 3, 2015, now Pat. No. 9,647,300, which is a continuation-in-part of application No. PCT/US2014/058671, filed on Oct. 1, 2014.

(60) Provisional application No. 62/727,585, filed on Sep. 6, 2018, provisional application No. 61/885,897, filed on Oct. 2, 2013.

(51) Int. Cl.

| | |
|---|---|
| *B60L 53/30* | (2019.01) |
| *B60L 53/51* | (2019.01) |
| *B60L 53/63* | (2019.01) |
| *B60L 53/64* | (2019.01) |
| *B60L 53/65* | (2019.01) |
| *B60L 53/66* | (2019.01) |
| *B60L 53/80* | (2019.01) |
| *B60L 55/00* | (2019.01) |
| *B60L 58/21* | (2019.01) |
| *B60L 58/26* | (2019.01) |
| *H02J 7/00* | (2026.01) |
| *H02J 7/35* | (2006.01) |
| *H02J 7/54* | (2026.01) |
| *H02S 40/34* | (2014.01) |
| *H02S 40/38* | (2014.01) |

(52) U.S. Cl.
CPC .............. *B60L 53/51* (2019.02); *B60L 53/63* (2019.02); *B60L 53/64* (2019.02); *B60L 53/65* (2019.02); *B60L 53/665* (2019.02); *B60L 53/80* (2019.02); *B60L 55/00* (2019.02); *B60L 58/21* (2019.02); *B60L 58/26* (2019.02); *H02J 7/00* (2013.01); *H02J 7/35* (2013.01); *H02J 7/54* (2026.01); *H02S 40/345* (2014.12); *H02S 40/38* (2014.12); *B60L 2210/30* (2013.01); *B60L 2210/40* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(58) Field of Classification Search
CPC ...... B60L 2210/40; B60L 53/52; B60L 53/53; B60L 53/68; H02J 7/00; H02J 7/0016; H02J 7/35; H02J 2300/24; H02J 2300/28; H02J 3/381; H02S 40/345; H02S 40/38; H02S 20/30; Y02E 60/00; Y02E 60/10; Y02E 70/30; Y02E 10/50; Y02T 10/70; Y02T 10/7072; Y02T 10/72; Y02T 90/12; Y02T 90/14; Y02T 90/16; Y02T 90/167; Y04S 10/126; Y04S 30/14; Y02B 10/10
USPC .......................................... 320/101; 136/244
See application file for complete search history.

(56) References Cited

U.S. PATENT DOCUMENTS

| | | | |
|---|---|---|---|
| 4,089,916 A | 5/1978 | Hay | |
| 4,194,334 A | 3/1980 | Katona | |
| 4,237,965 A | 12/1980 | Hay | |
| 4,241,727 A | 12/1980 | Toti | |
| 4,245,621 A | 1/1981 | Hollobaugh | |
| 4,372,831 A | 2/1983 | Rosswag | |
| 4,375,831 A | 3/1983 | Downing, Jr. | |
| 4,498,306 A | 2/1985 | Tyree, Jr. | |
| 4,560,916 A | 12/1985 | Yoshiyuki et al. | |
| 4,575,670 A | 3/1986 | Hignutt | |
| 4,575,977 A | 3/1986 | Taylor | |
| 4,595,789 A | 6/1986 | Nagase et al. | |
| 4,718,404 A | 1/1988 | Sadler | |
| 4,867,133 A | 9/1989 | Sadler | |
| 4,984,399 A | 1/1991 | Taylor | |
| 5,091,687 A | 2/1992 | Meyer et al. | |
| 5,184,058 A | 2/1993 | Hesse et al. | |
| 5,187,423 A | 2/1993 | Marton | |
| 5,344,330 A | 9/1994 | Hoffman | |
| 5,349,535 A | 9/1994 | Gupta | |
| 5,477,091 A | 12/1995 | Fiorina et al. | |
| 5,631,536 A | 5/1997 | Tseng | |
| 5,644,207 A | 7/1997 | Lew et al. | |
| 5,644,219 A * | 7/1997 | Kurokawa ................ G05F 1/67 |
| | | | 323/303 |
| 5,711,110 A | 1/1998 | Williams | |
| 5,857,477 A | 1/1999 | James | |
| 6,115,694 A | 9/2000 | Cheetham et al. | |
| 6,156,989 A | 12/2000 | Miller et al. | |
| 6,165,619 A | 12/2000 | Ikenaga et al. | |
| 6,167,658 B1 | 1/2001 | Weiner | |
| 6,178,406 B1 | 1/2001 | Cheetham et al. | |
| 6,218,450 B1 | 4/2001 | Fagerburg | |
| 6,291,761 B1 | 9/2001 | Takada et al. | |
| 6,352,783 B1 | 3/2002 | Fagerburg | |
| 6,362,540 B1 | 3/2002 | Hill | |
| 6,368,724 B1 | 4/2002 | Fagerburg | |
| 6,380,637 B1 | 4/2002 | Hsu et al. | |
| 6,521,821 B2 | 2/2003 | Makita et al. | |
| 6,557,476 B2 * | 5/2003 | Batisse ................. B60M 7/003 |
| | | | 191/4 |
| 6,748,296 B2 | 6/2004 | Banerjee et al. | |
| 6,766,623 B1 | 7/2004 | Kalnay | |
| 6,803,746 B2 | 10/2004 | Aker et al. | |
| 6,922,701 B1 | 7/2005 | Ananian et al. | |
| RE38,850 E | 10/2005 | Ikenaga et al. | |
| 7,152,614 B2 | 12/2006 | Kalnay | |
| 7,248,018 B2 | 7/2007 | Sanders, Jr. et al. | |
| 7,510,797 B2 * | 3/2009 | Aker ................... H01M 50/253 |
| | | | 429/50 |
| 7,651,811 B2 * | 1/2010 | Aker ................. H01M 10/6551 |
| | | | 429/71 |
| 7,753,546 B2 | 7/2010 | Kuelbs | |
| 7,850,391 B2 | 12/2010 | Omar | |
| 7,888,584 B2 * | 2/2011 | Lyden ....................... H02J 7/35 |
| | | | 136/244 |
| 7,898,212 B2 | 3/2011 | Benn et al. | |
| 8,011,140 B2 * | 9/2011 | Durham ................. E04H 6/025 |
| | | | 135/90 |
| 8,080,900 B2 | 12/2011 | Corhodzic et al. | |
| 8,084,993 B1 | 12/2011 | Wong | |
| 8,183,714 B2 | 5/2012 | Mcdonnell | |
| 8,313,224 B2 | 11/2012 | Moyer | |
| 8,513,832 B2 | 8/2013 | Hunter et al. | |
| 8,710,791 B2 * | 4/2014 | Gochenaur ............ E04H 6/025 |
| | | | 320/101 |
| 8,987,939 B2 | 3/2015 | Yu et al. | |
| 9,045,047 B2 | 6/2015 | Ito et al. | |
| 9,121,189 B2 | 9/2015 | Hixson et al. | |
| 9,194,360 B2 | 11/2015 | Payre et al. | |
| 9,209,648 B2 | 12/2015 | Wheatley et al. | |
| 9,275,391 B2 * | 3/2016 | Thramann .............. G06Q 30/00 |
| 9,293,946 B2 | 3/2016 | Alexander | |
| 9,664,425 B2 | 5/2017 | Tsai | |
| 9,920,648 B2 | 3/2018 | Newcomb | |
| 9,923,371 B1 | 3/2018 | Emert et al. | |
| 10,055,706 B2 | 8/2018 | Thramann | |
| 10,069,456 B2 * | 9/2018 | Thramann .............. H02S 20/10 |
| 10,093,196 B2 * | 10/2018 | Unno ...................... B60L 53/62 |
| 10,518,657 B2 | 12/2019 | Wheatley et al. | |
| 10,666,188 B2 | 5/2020 | Thramann et al. | |

(56) References Cited

U.S. PATENT DOCUMENTS

| | | | |
|---|---|---|---|
| 10,903,781 | B2 | 1/2021 | Levin |
| 10,962,273 | B2 | 3/2021 | Dade et al. |
| 2002/0168901 | A1 | 11/2002 | Choumach |
| 2004/0065025 | A1 | 4/2004 | Durham |
| 2004/0200522 | A1 | 10/2004 | Fukawa et al. |
| 2005/0003219 | A1 | 1/2005 | Yonei et al. |
| 2005/0011547 | A1 | 1/2005 | Herndon et al. |
| 2005/0060951 | A1 | 3/2005 | Kalnay |
| 2005/0071264 | A1 | 3/2005 | Tsoa-Lee et al. |
| 2006/0086382 | A1 | 4/2006 | Plaisted |
| 2006/0118898 | A1 | 6/2006 | Uchimoto et al. |
| 2006/0162617 | A1 | 7/2006 | Tanaka et al. |
| 2006/0188776 | A1* | 8/2006 | Aker .................. H01M 50/209 |
| | | | 429/50 |
| 2006/0207192 | A1 | 9/2006 | Durham |
| 2007/0107768 | A1 | 5/2007 | Romana et al. |
| 2007/0158621 | A1 | 7/2007 | Sakamoto et al. |
| 2007/0163634 | A1 | 7/2007 | Wada et al. |
| 2007/0188137 | A1 | 8/2007 | Scheucher |
| 2007/0235077 | A1 | 10/2007 | Nagata et al. |
| 2007/0295381 | A1 | 12/2007 | Fujii et al. |
| 2008/0053716 | A1 | 3/2008 | Scheucher |
| 2008/0277173 | A1* | 11/2008 | Midrouillet .............. B60K 1/04 |
| | | | 180/65.1 |
| 2010/0006140 | A1 | 1/2010 | Parker et al. |
| 2010/0076615 | A1* | 3/2010 | Daniel ...................... F03D 9/25 |
| | | | 703/2 |
| 2010/0225266 | A1 | 9/2010 | Hartman |
| 2010/0226775 | A1 | 9/2010 | Hartman |
| 2011/0023931 | A1 | 2/2011 | Chen |
| 2011/0073161 | A1 | 3/2011 | Scanlon |
| 2011/0074351 | A1 | 3/2011 | Bianco et al. |
| 2011/0077809 | A1 | 3/2011 | Leary |
| 2011/0181233 | A1* | 7/2011 | Mino ........................ H02J 7/35 |
| | | | 320/101 |
| 2011/0204720 | A1 | 8/2011 | Ruiz et al. |
| 2012/0025744 | A1* | 2/2012 | Kim .......................... H02J 7/50 |
| | | | 429/158 |
| 2012/0042936 | A1* | 2/2012 | Feichtinger ............. B60L 8/003 |
| | | | 320/101 |
| 2012/0131866 | A1 | 5/2012 | Batut et al. |
| 2012/0131886 | A1 | 5/2012 | Caprarotta et al. |
| 2012/0205985 | A1 | 8/2012 | Inakagata |
| 2013/0042542 | A1 | 2/2013 | Welschholz |
| 2013/0257373 | A1 | 10/2013 | Mallon, IV et al. |
| 2014/0005844 | A1 | 1/2014 | Newcomb |
| 2014/0055094 | A1* | 2/2014 | Takagi .................... B60L 53/14 |
| | | | 320/126 |
| 2014/0077607 | A1 | 3/2014 | Clarke et al. |
| 2014/0166379 | A1* | 6/2014 | Kimura ................... B60L 50/64 |
| | | | 180/65.21 |
| 2014/0300194 | A1 | 10/2014 | Carcouet et al. |
| 2014/0319911 | A1 | 10/2014 | Alexander |
| 2014/0354229 | A1 | 12/2014 | Zhao et al. |

| | | | |
|---|---|---|---|
| 2015/0113987 | A1* | 4/2015 | Mackler .................. H02S 20/23 |
| | | | 60/641.2 |
| 2015/0222194 | A1 | 8/2015 | Bundschuh |
| 2015/0270731 | A1* | 9/2015 | Adelmann ................ H02J 7/35 |
| | | | 320/101 |
| 2015/0357692 | A1 | 12/2015 | Piggott et al. |
| 2016/0036236 | A1 | 2/2016 | Teichmann |
| 2016/0138832 | A1 | 5/2016 | Thramann et al. |
| 2017/0070180 | A1 | 3/2017 | Mills |
| 2017/0088009 | A1* | 3/2017 | Takizawa ................ B60L 58/12 |
| 2017/0222598 | A1* | 8/2017 | Campbell .......... E04B 1/34336 |
| 2021/0126465 | A1 | 4/2021 | Wheatley |
| 2021/0188105 | A1 | 6/2021 | Wheatley |
| 2022/0118872 | A1 | 4/2022 | Wheatley |
| 2022/0274497 | A1 | 9/2022 | Wheatley |

FOREIGN PATENT DOCUMENTS

| | | | | | |
|---|---|---|---|---|---|
| CN | 106183767 | B | * | 5/2019 | ............. B60L 50/00 |
| DE | 48533 | C | | 2/1889 | |
| DE | 2630345 | B2 | | 10/1979 | |
| DE | 102009039884 | A1 | | 3/2011 | |
| DE | 202011105517 | U1 | | 4/2012 | |
| DE | 102011014683 | A1 | | 9/2012 | |
| EP | 2107617 | A1 | | 5/1984 | |
| EP | 2355300 | A2 | | 8/2011 | |
| EP | 2428939 | A1 | | 3/2012 | |
| JP | 08019193 | A | | 1/1996 | |
| JP | 2017125699 | A | * | 7/2017 | ............. Y02E 60/10 |
| WO | 2010136468 | A1 | | 12/2010 | |
| WO | 2013016555 | A2 | | 1/2013 | |
| WO | WO-2013039753 | A1 | * | 3/2013 | ............. B60L 53/64 |

OTHER PUBLICATIONS

Adam Browning, "Project Better Place's Announcement is Story of the Year" , Renewable Energy World.com, Jan. 30, 2008, 5 pages, http://www.renewableenergyvorld.com/rea/news/recolumists/story/id=51281.

John Addison, Clean Fleet Report. "Opportunities in Plug-in Hybrid Vehicles and V2G Technology." 2008. 13 pages.

International Search Report and Written Opinion dated Jan. 6, 2015 for International Application No. PCT/US2014/058671.

PCT Notification of Transmittal of the International Search Report and Written Opinion of the International Search Authority, or the Declaration, date of mailing Jan. 6, 2015, 5 pages.

International Search Report and Written Opinion dated Nov. 8, 2019 for International Application No. PCT/US2019/049993.

MIT student ingenuity plus high-tech batteries yields advanced all-electric Porsche ", MIT Energy Initiative, 2 pages, http://web.mit.edu/mitei/education/spotlights/electric-porsche.html".

Extended European Search Report for Application No. 14851068.8, date of mailing Jul. 20, 17, 9 pgs.

\* cited by examiner

1802

1804

1808

1806

Fluid Cooled:

Air Cooled:

ENERGY STORAGE CANOPY

CROSS-REFERENCE TO RELATED APPLICATIONS

The present application is a continuation of U.S. patent application Ser. No. 17/526,548, filed Nov. 15, 2021, which is a continuation-in-part of U.S. patent application Ser. No. 16/811,391, filed Mar. 6, 2020, now U.S. Pat. No. 11,245, 138, which is a continuation of U.S. patent application Ser. No. 16/249,728, filed Jan. 16, 2019, now U.S. Pat. No. 10,587,015, which is a continuation in part of U.S. patent application Ser. No. 15/486,000, filed Apr. 12, 2017, which is a continuation of U.S. patent application Ser. No. 14/678, 476, now U.S. Pat. No. 9,647,300, filed Apr. 3, 2015, which is a continuation in part of International Patent Application Serial Number PCT/US14/58671, filed Oct. 1, 2014, which claims priority from and the benefit of U.S. Provisional Patent Application 61/885,897, filed Oct. 2, 2013, the disclosure of which is incorporated herein by reference as if set out in full. U.S. patent application Ser. No. 16/249,728, as well as the present application, claims priority from and the benefit of U.S. Provisional Patent Application 62/727,585, filed Sep. 6, 2018, the disclosure of which is incorporated herein by reference as if set out in full.

The present application is related to U.S. Provisional Patent Application Ser. Nos. 61/537,319; 61/608,425; 61/537,346; 61/537,412; 61/608,439; and 61/621,250 and United States Non-Provisional patent application Ser. Nos. 13/623,515; 13/624,428; and 13/623,723, all of which are incorporated by reference.

BACKGROUND

As countries become more concerned with oil reserves, renewable energy and carbon footprints become a focus of attention. Grid power, local power networks, and/or stand alone loads attempt to address some of the concerns with renewable energy sources as well as changes in rates based on the demands for energy (also known as on-peak rates and off-peak rate). However, renewable energy sources are inherently unpredictable in their output. For example, wind energy is necessarily dependent on the wind speed and direction in some cases. Solar energy is influenced by the time of day and weather conditions. Also, rate changes between on-peak demand and off-peak demand have a limited effect on the overall demand for energy during peak or on-peak demand hours as the larger consumers are typically corporations that have a limited ability to vary their energy demands. Additionally, large scale renewable energy farms, such as wind turbine frames and large solar arrays are traditionally coupled to the grid power network remote from any particular residential or commercial center. Thus, problems with the traditional or conventional power grid disrupts the renewable energy power source in a manner similar to the disruption of any power.

For most industrial countries, refrigeration systems, which include high volume air conditioning (HVAC) systems and refrigeration systems, such as food storage systems, are among some of the larger consumers of power from the grid or local power network. The large electrical power demand is generally due to the compressor used to compress the working fluid.

In part, in view of the above, it is desirable to provide an energy storage canopy or system that stored, and/or locally used, electrical energy and refrigerant (sometimes referred to as thermal) energy using renewable sources and/or off-peak demand power to reduce the demand for energy at on-peak demand times.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a solar canopy is provided. The solar canopy powers, among other things, a high capacity battery integrated into or retrofitted to the solar canopy. The solar canopy would, through a power conditioner or directly, charge the high capacity battery, which may include specially design high capacity batteries, or one or more electrical vehicle battery (or batteries). The discharge of the high capacity battery (or batteries) may be regulated such that the discharge over a defined period, such as 24 hours/day, would be constant to facilitate supplying regulated power to a grid or residential power network. In some aspects, the technology may be provided such that the solar canopy discharges to the grid at certain predefined times, peak power times or the like. In still other aspects, the technology may be provided to power a standalone load such that the energy use does not use any grid power.

In some aspects of the technology, an energy storage canopy is provided. The energy storage canopy may be operationally coupled to a local building, or directly to particular loads, to provide energy reserves to reduce or supplant the electrical energy needs of the local building to use energy during on-peak demand times, which are times when energy companies provide energy at a higher cost. The energy storage canopy minimizes the impact of the necessary equipment on the local building's real estate by locating the equipment above parking spaces, which is typically unused space.

In some embodiments, the energy storage canopy has at least one vertical and at least one horizontal support on which a roof is provided. The energy storage canopy further includes support members, typically horizontal, that can support compartments. The compartments may be integral with or removable from the energy storage canopy. The compartment comprises, among other things, a plurality of high capacity batteries to store electrical energy, which energy may be received from an integrated renewable energy source, such as a solar array or a wind turbine system. The compartment also comprises at least one power conditioner to allow coupling high capacity batteries to the power grid, the AC distribution panel of the local building, and/or a standalone load such that the high capacity batteries can supply power to local loads, such as, for example, computers, servers, lights, compressors for HVAC systems, or refrigerant systems. The compartment may, in certain aspects, also include a refrigerant energy storage tank containing a working fluid. The refrigerant energy storage tank contains piping or ductwork to be in fluid communication with the HVAC system, refrigerant system, or atmosphere of the local building to provide stored refrigerant energy to the local building.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIGS. 33A-D and 34 are schematic block diagrams of heat dissipation systems consistent with the technology of the present application.

Figure 35:
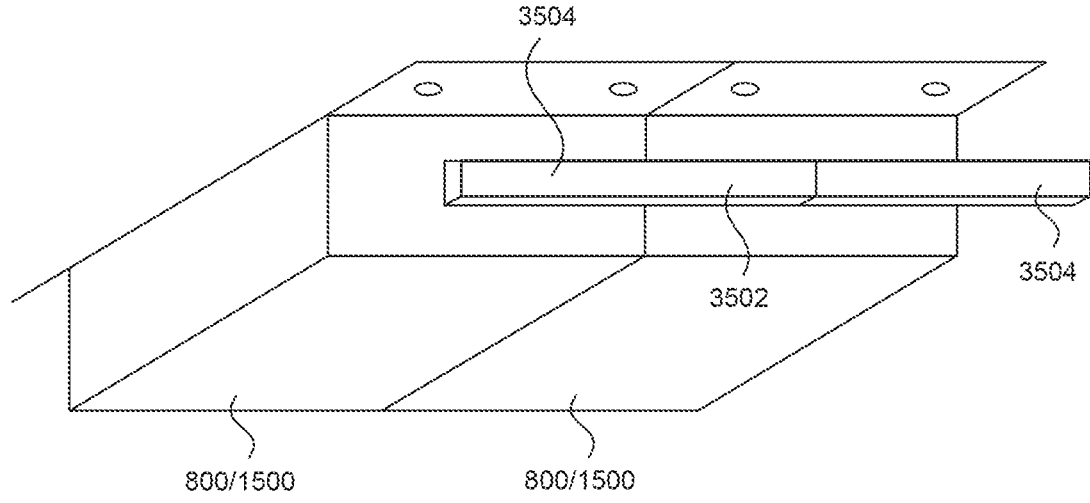
Figure 36:
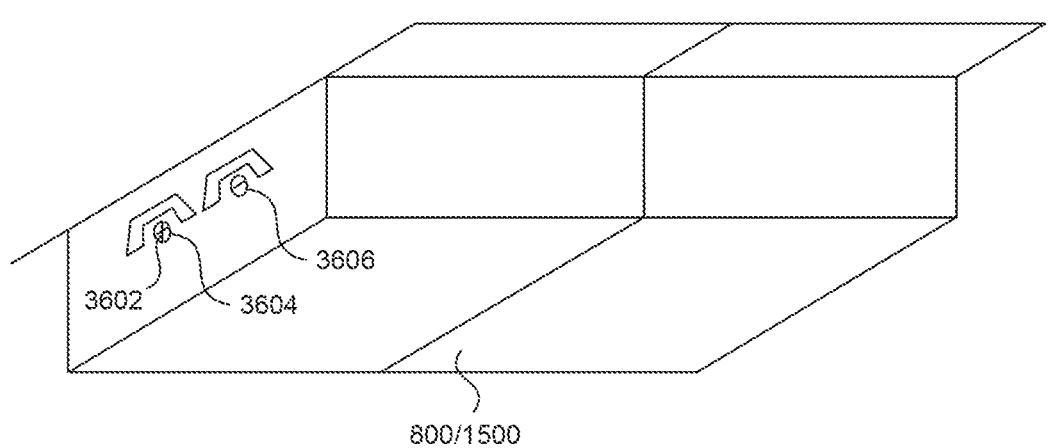

FIGS. 35 and 36 show possible contacts on compartments consistent with the technology of the present application.

Figure 37A:
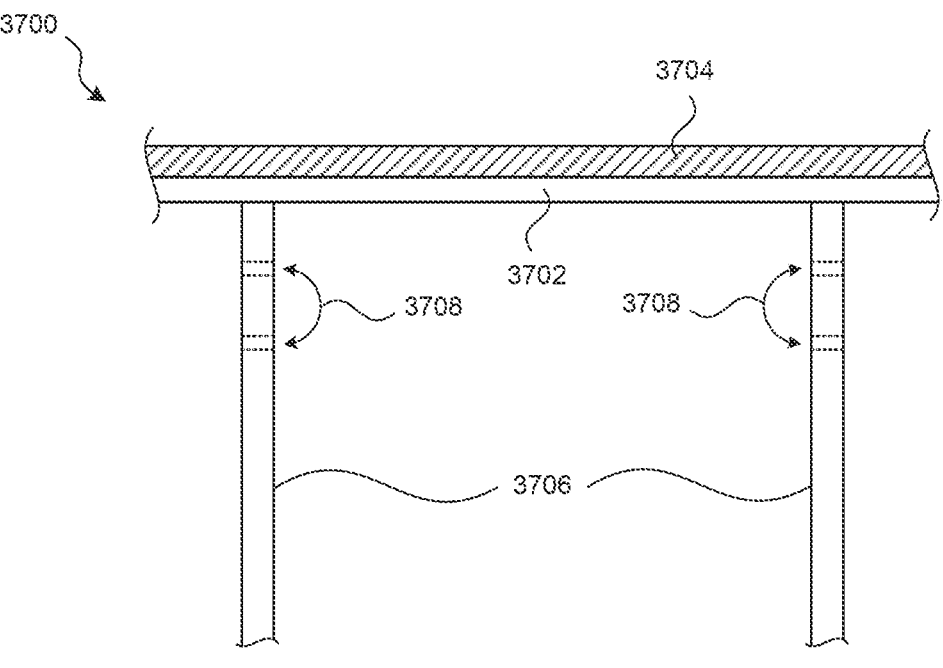
Figure 37B:
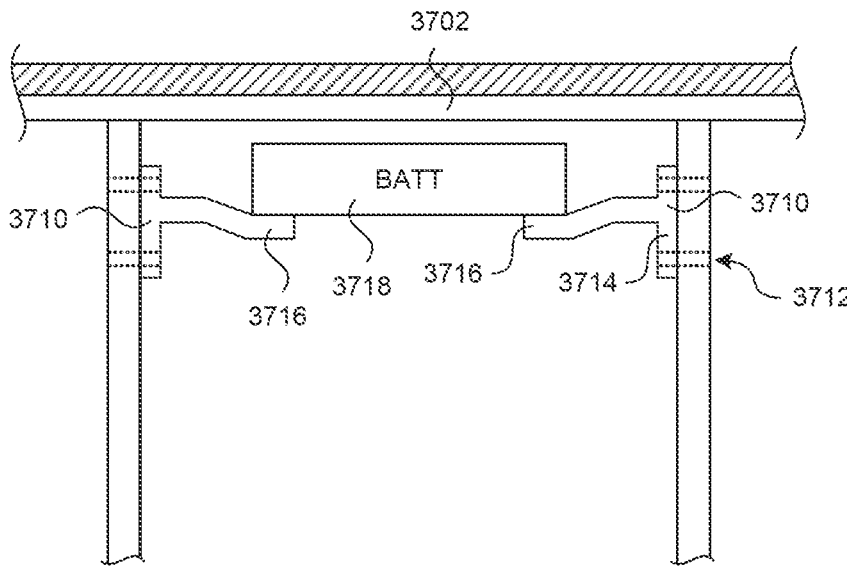
Figure 37C:
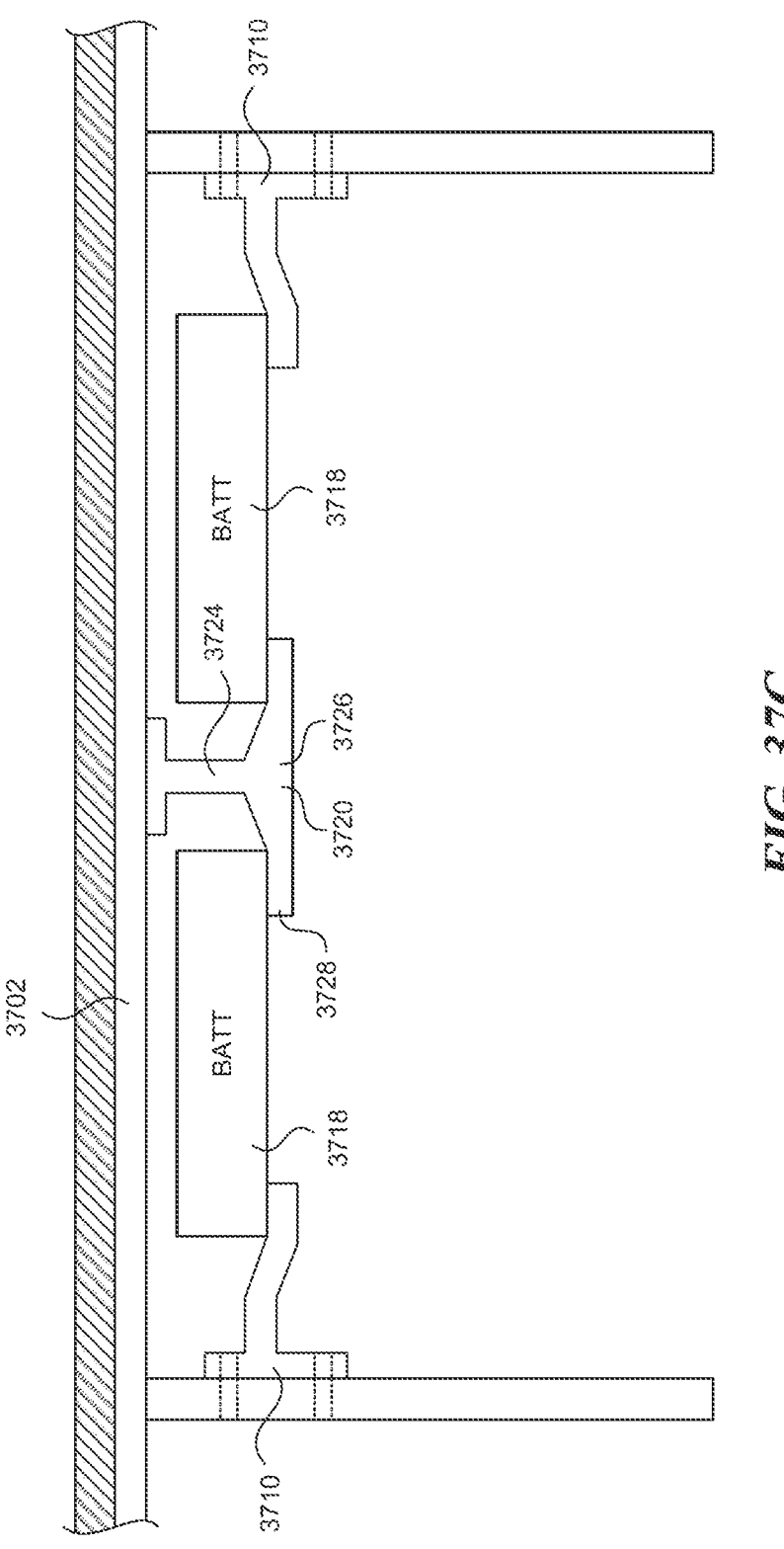

FIG. 37A-C show an elevation view of structure to mount an energy storage system to a solar canopy consistent with the technology of the present application.

Figure 38:
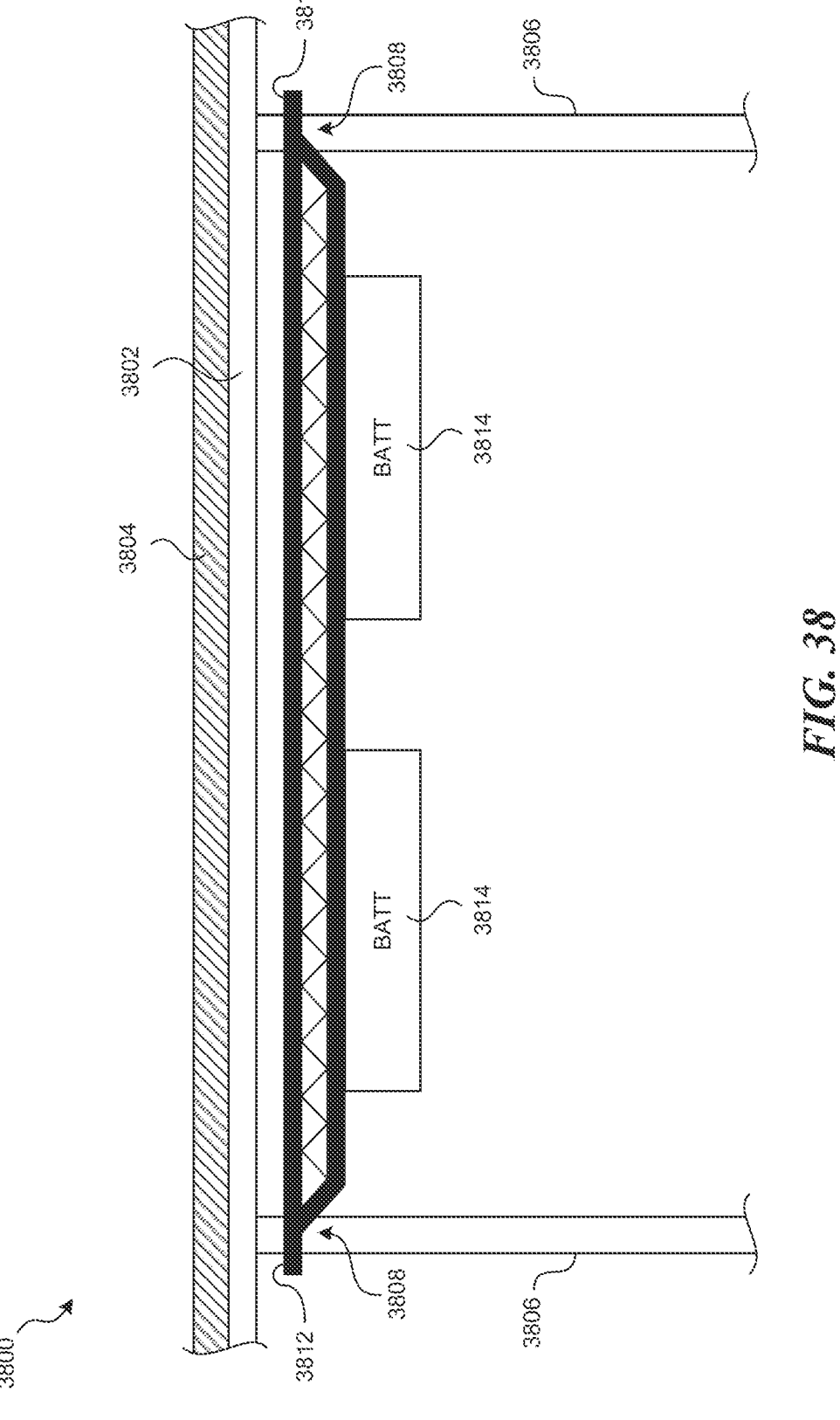

FIG. 38 show an elevation view of another structure to mount an energy storage system to a solar canopy consistent with the technology of the present application.

Figure 39:
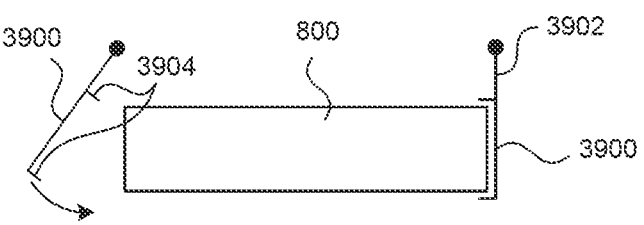

FIG. 39 show a view of another structure to mount an energy storage system to a solar canopy consistent with the technology of the present application.

Figure 40:
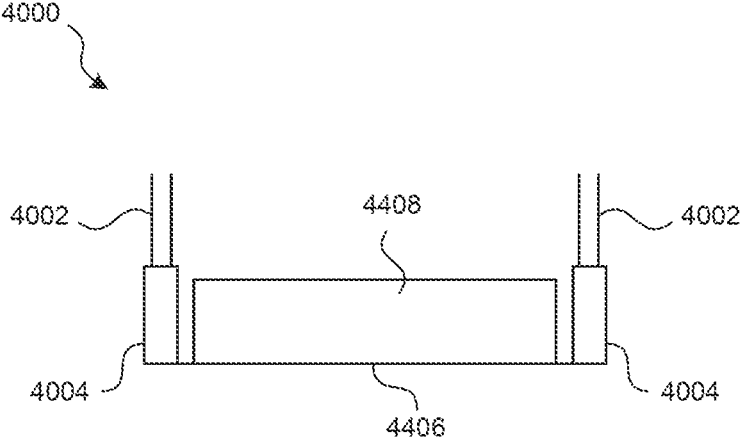

FIG. 40 show a view of structure to raise, lower, and mount an energy storage system to a solar canopy consistent with the technology of the present application.

Figure 41:
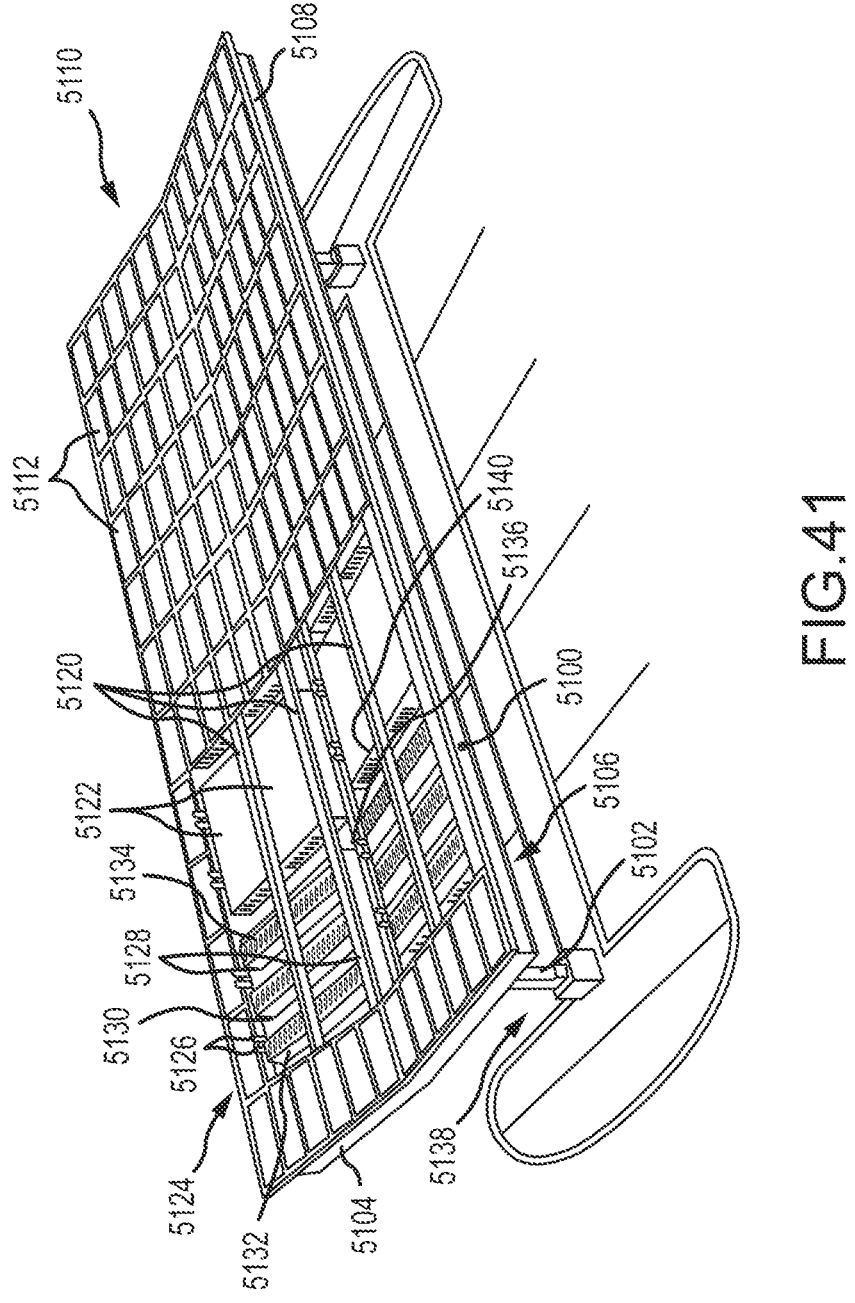

FIG. 41 is a perspective view of an energy storage canopy consistent with the technology of the present application.

Figure 42:
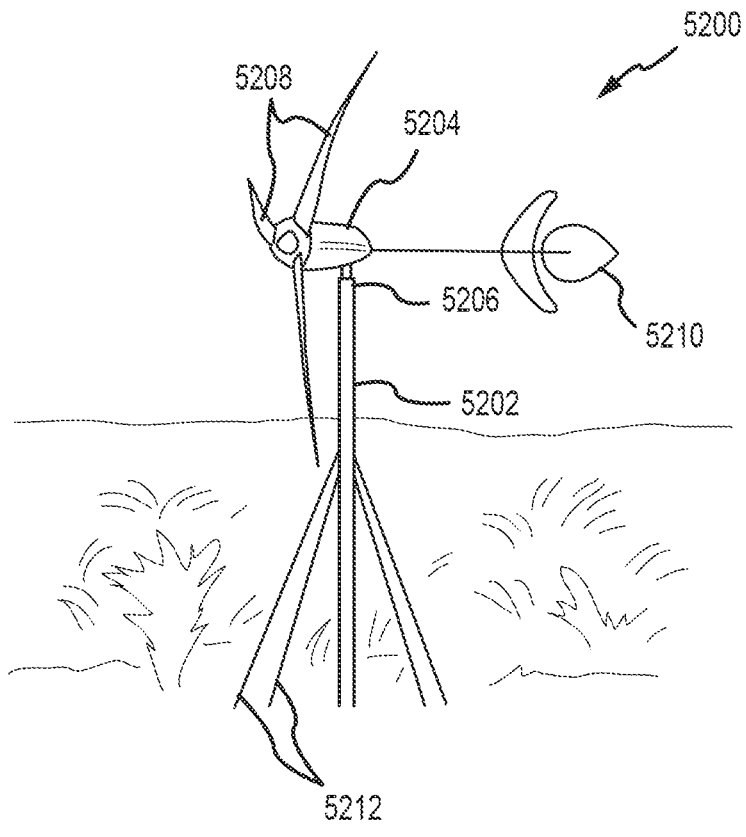

FIG. 42 is a perspective view of a wind turbine system consistent with the technology of the present application.

Figure 43:
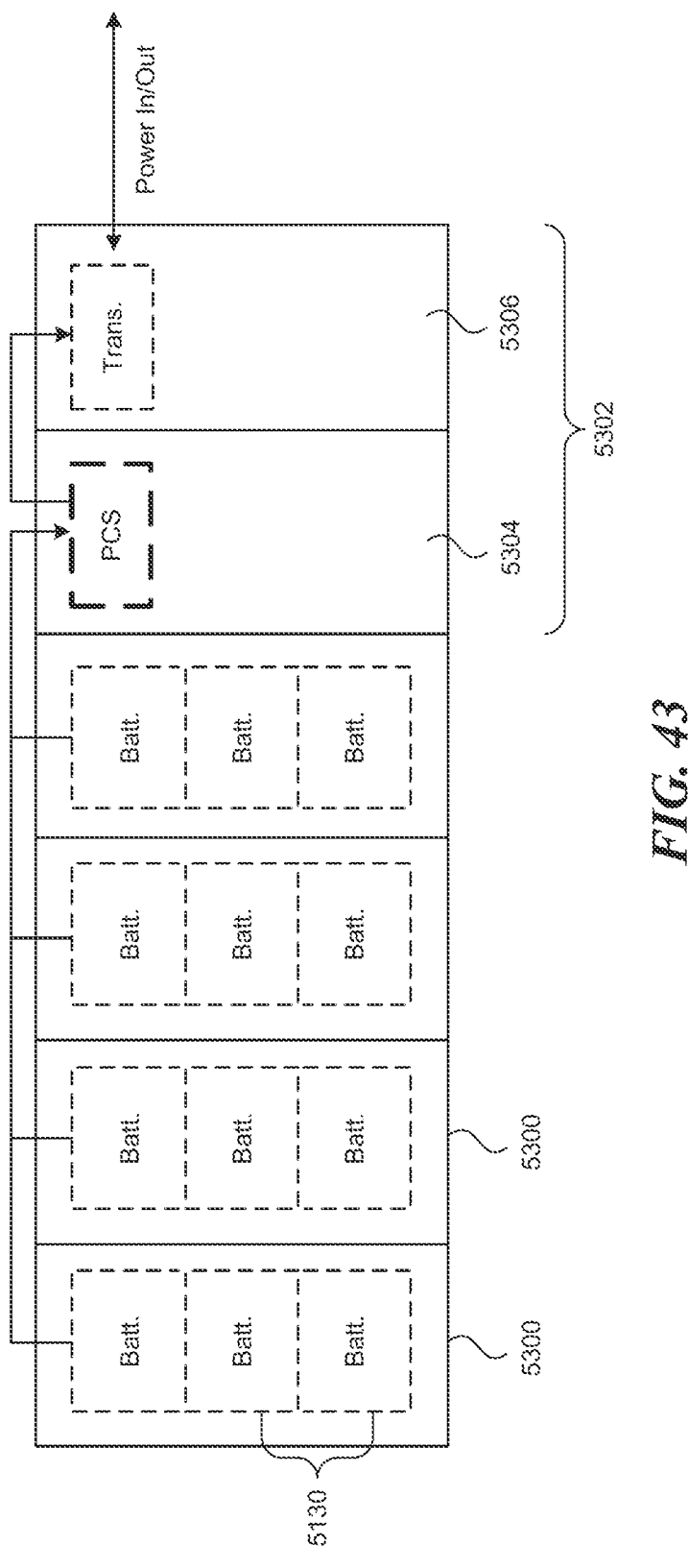

FIG. 43 is a schematic diagram of an electrical energy storage system contained in the energy storage canopy of FIG. 41.

Figure 44:
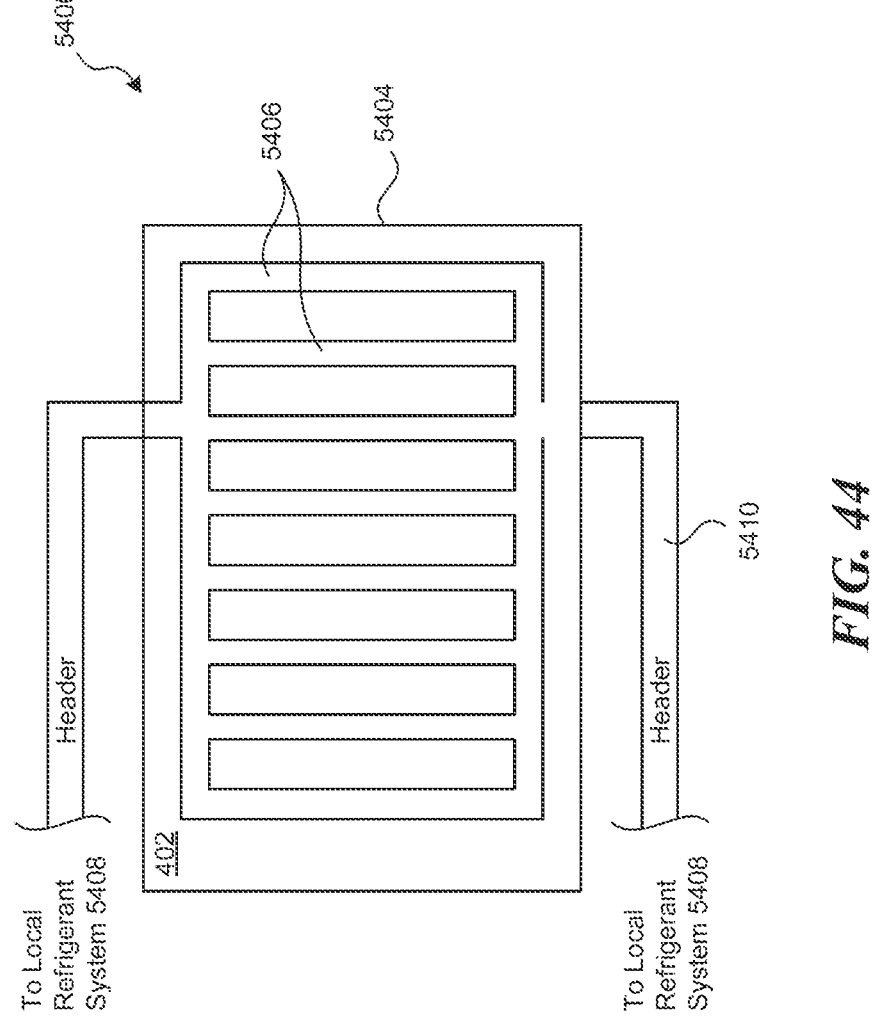

FIG. 44 is a cross sectional view of a refrigerant energy storage tank contained in the energy storage canopy of FIG. 41.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to photovoltaic cells (a/k/a solar panels) and commercial refrigeration systems. However, the technology described herein may be used with applications other than those specifically described herein. For example, the technology of the present application may be applicable to wind generation systems, server farms, electric vehicle charging stations, home air conditioning systems, morgue refrigeration systems, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
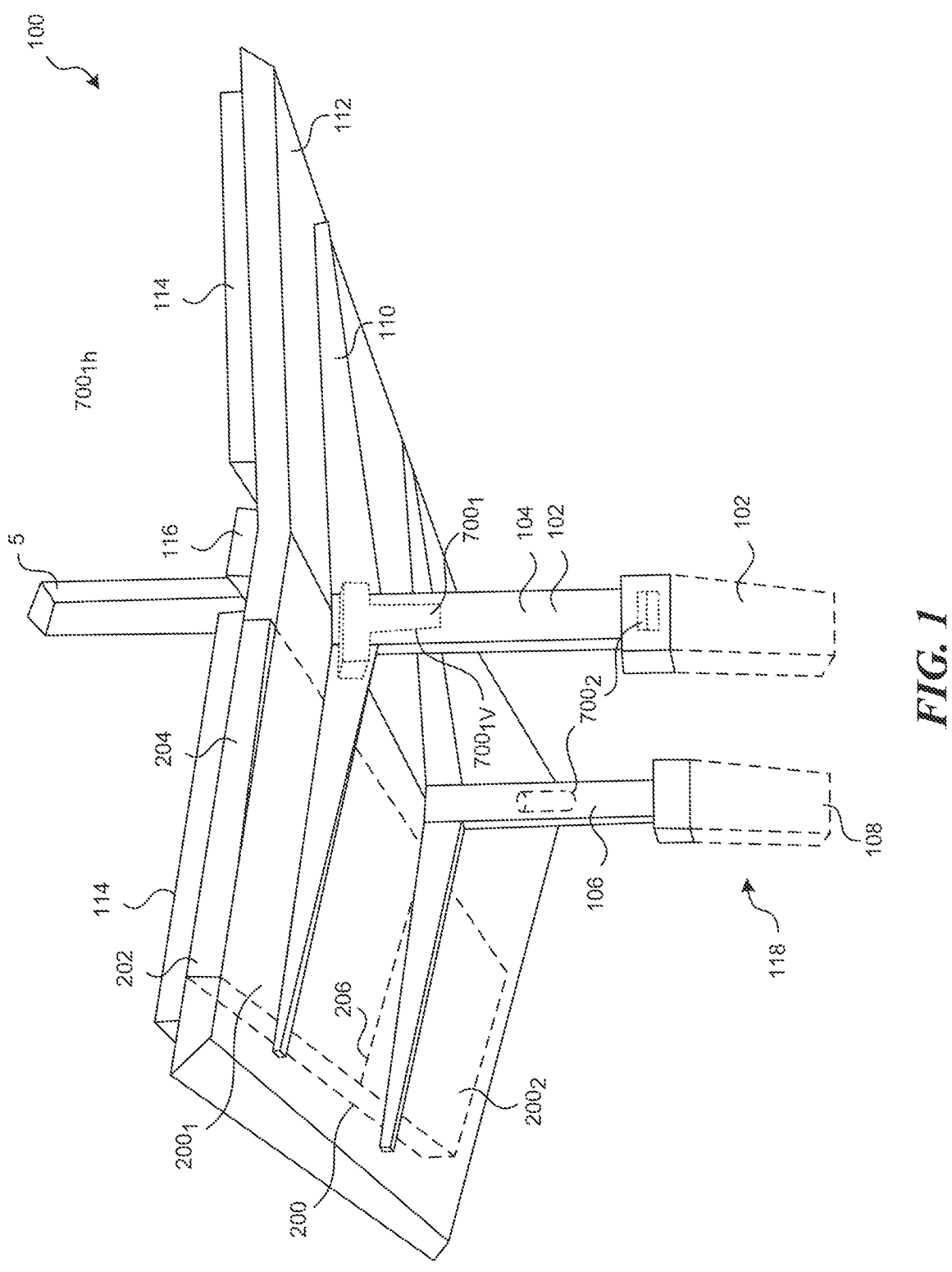
FIG. 1 is a perspective view of a solar canopy consistent with the technology of the present application.

With reference now to FIG. 1, a solar power canopy 100 is shown. Solar power canopy 100 is shown with a central support structure 102 comprising a vertical strut 104 having an exposed portion 106 and a buried portion 108. The buried portion may be below ground or connected to a foundation of a building, parking lot, etc. In other words, the buried portion 108 may alternatively be a flanged connection to a foundation. The central support structure 102 further has two horizontal support struts 110 extending from the vertical strut 104. The vertical strut 104 and two horizontal support struts 110 form a generally "T" shaped support structure, or in certain embodiments and inverted L shape. As shown, the horizontal support struts 110 form a generally "V" shape although flat or an inverted "V" shape among other shapes are possible. A roof 112 is formed over and supported by the horizontal support struts 110. Arranged on the roof 112 are photovoltaic panels 114, which are sometimes referred to as solar panels or simply panels. The panels 114 may be directly mounted to the roof 112 or raised to provide ventilation between the roof 112 and panels 114 to facilitate heat dissipation. Other heat dissipation structure or means include, for example, vents, fans, and the like. While a specific vent, such as a slot or opening, facilitates air movement, vent should be construed broadly herein as a structure that allows the passage of air or air flow. In other words, not hermetically sealing the cavities provides that the seams formed where parts abut may provide sufficient air flow to allow the seam to act as a vent. The panels 114 may be mounted in a fixed position to the roof 112 or mounted to allow for angulation or rotation of the panels to track the suns progression through the day or the time of year.

Figure 10:
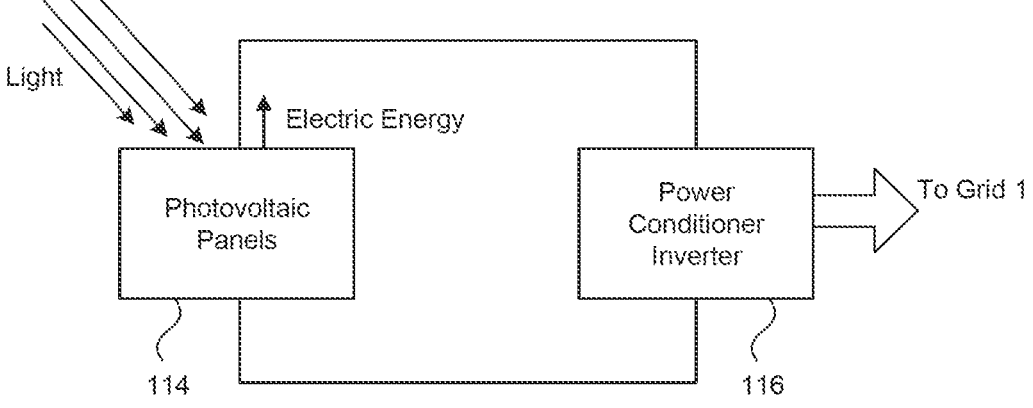
FIG. 10 is a functional schematic block diagram of a power circuit consistent with the technology of the present application.
Figure 11:
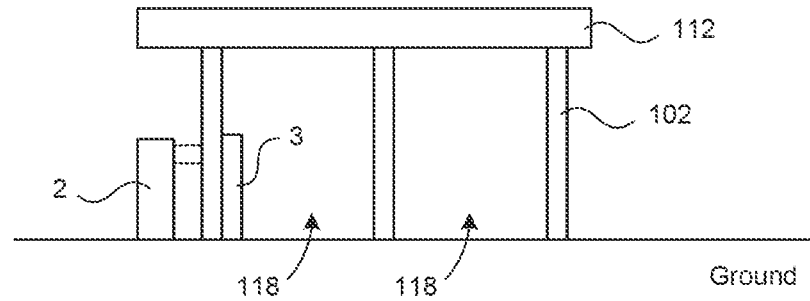
FIG. 11 is a view of an exemplary canopy of FIG. 1 with a standalone inverter box or rack consistent with the technology of the present application.

The panels 114 gather light and output electricity. The panels 114 may be coupled to a power conditioner 116, which may condition the power for coupling to a power grid 1, residential power network 1, or a local load 1 as shown in FIG. 10. Grid 1 is used generically in the present application to refer to supplying electrical power from the solar power canopy 100 to an external unit, which external unit 1 may include a national or State power grid, a local power grid, a residential or commercial building, an electrical vehicle charging unit, a server farm, compressors, HVAC systems, refrigerants, or combinations thereof. Such power conditioners may include a power control system (or PCS), computer processors or servers, an inverter, a converter or transformer, or the like. Power conditioners 116 to provide electrical energy from renewable energy sources to either a power grid, a residential power network, or other loads are generally known in the industry and will not be further explained except as necessary for a complete understanding of the present technology. Generally, the power conditioners 116 facilitate matching the conditions for a seamless transition of energy from the renewable energy source to the grid or other load without disrupting performance or providing a no-load condition. The power conditioner 116 may include a power switch (not specifically shown) to allow isolation of the canopy and the associated components from the load 1. As shown, the power conditioner 116 may be mounted to the roof 112, contained in the battery compartment (explained further below), or contained in a standalone inverter box, or the like. In another embodiment, the power conditioner 116 may be incorporated in one or more of the central support structures 102. In still other embodiments, the inverter may be mounted in a rack associated with the bay 118 provided under one or more of the solar canopies 110. With reference to FIG. 11, a view of an exemplary canopy 100 is shown with a standalone inverter box 2 or a rack 3 for the power conditioner 116. The standalone inverter box 2 would have an electrical conduit 4 connecting the standalone inverter box 2 to the canopy 100 to allow wires and cables to connect the panels 114 to the power conditioner 116. The rack 3 may be mounted directed to the central support structure 102 with wires and cables running in the canopy 100 as required to connect the panels 114 to the power conditioner 116. With reference to FIG. 11, if the canopy 100 is provided with a standalone inverter box 2 (also known as a power conditioner box) or a rack 3, the cavity 200 shown in FIG. 1 may be fit into a box that is connectable to either the standalone inverter box 2 or rack 3 rather than the roof 112 or support structure 102.

While solar canopy 100 is shown as a symmetrical structure, many alternative designs are possible including, for example, cantilever designs forming more of an inverted "L"-shape as opposed to the "Y" or "T"-shape of the canopy shown. In still other embodiments, the solar canopies may form peek or an inverted "V"-shape. Of course, these are but a few shapes of the canopies associated with the present technology.

Figure 1A:
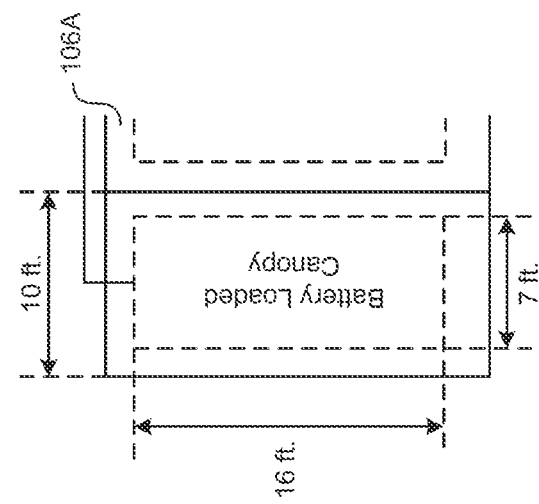
FIG. 1A is another perspective view of a solar canopy consistent with the technology of the present application.
Figure 1A:
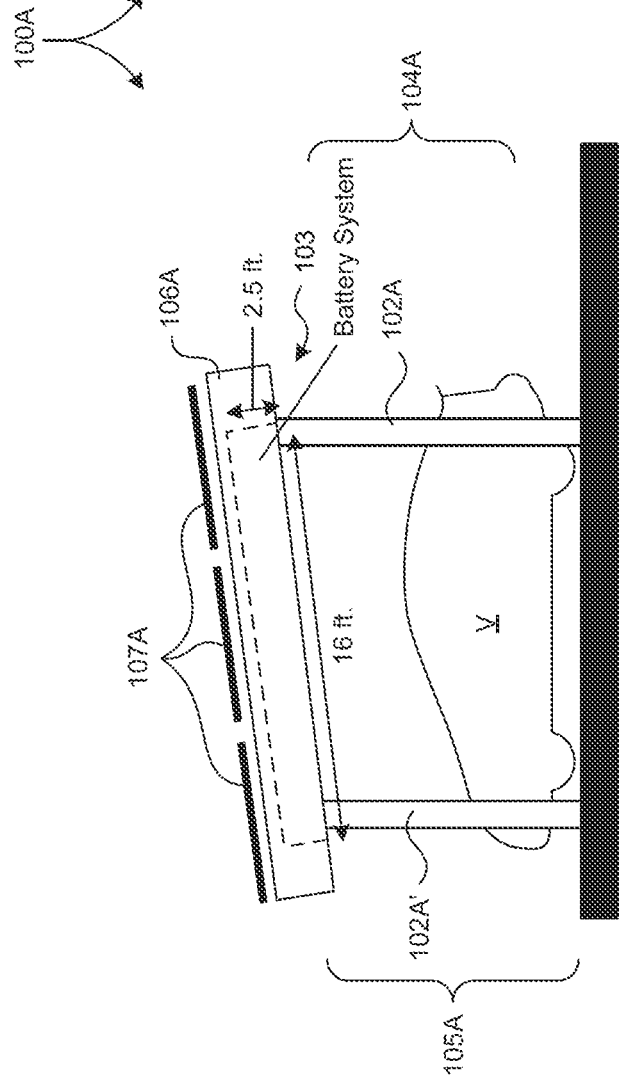

With reference to FIG. 1A, another embodiment of a solar canopy 100A is shown in a side elevation and partial top view. The solar canopy 100A includes vertical supports 102A and 102A'. Beams 103A (not specifically shown) extend laterally and longitudinally between the vertical supports 102A and 102A'. As shown, the solar canopy 100A has an entry side 104A where the vertical support 102A has a longer length than the terminal side 105A support 102A', which allows for angulation of a roof structure 106A supported by vertical supports 102A and 102A', and beams 103A. Generally, angulation of the roof structure 106A provides for better solar reception of photovoltaic cells 107A or panels. The photovoltaic panels 107A are typically raised from the roof to allow for ventilation. The solar canopy 100A may be sized similar to the dimensions as shown in FIG. 1A, which is generally sized to fit a parked vehicle V. The dimensions, however, are exemplary and should not be considered limiting. The solar canopy 100A may be a structure where connection is to a standalone load 1, such as an electrical vehicle charging station.

In certain embodiments, the solar canopy 100 may include an extendable antenna 5. The extendable antenna 5 may be a satellite antenna in certain embodiments, a cellular antenna in certain embodiments, or other type of radio frequency antenna. The extendable antenna 5 would be electrically coupled to a power source such as, for example, the power conditioner 116 and be powered electrically from either the solar panels 114, a high capacity battery (or batteries), or the power network such as a power grid or residential power network to allow for radio communication. In certain embodiments, a backup electrical generator may provide emergency power to the extendable antenna 5. This is especially useful in emergency conditions, such as, for example, relief efforts for hurricanes, humanitarian aid for disaster zone, war zones, and the like, when a power grid or residential power network in unavailable. Thus, in these conditions, the load 1 is the extendable antenna and transmission system. The high capacity battery referred to above, as will be clear from the below, may be in certain embodiments a battery from an electrical vehicle, such as is available from Tesla, Nisson, or the like. One of ordinary skill in the art would recognize on reading the disclosure that such a high capacity battery is configured to store at a minimum approximately 75-100 kWh (kilo watt hours) of power. Generally, the term high capacity battery as used herein stores at least 100 kWh to 150 kWh, but higher and lower capacity batteries are contemplated by the technology of the present application. Generally, the minimum capacity for the technology of the present application would be approximately 10 kWh. The high capacity battery may be of many types including lithium ion, lead acid, and the like to name but two (2) types of batteries. As can be appreciated, high capacity batteries in the magnitude of 10 or more kWh produce a significant amount of heat that must be dissipated by a heat dissipation system, as will be further explained below.

Figure 18:
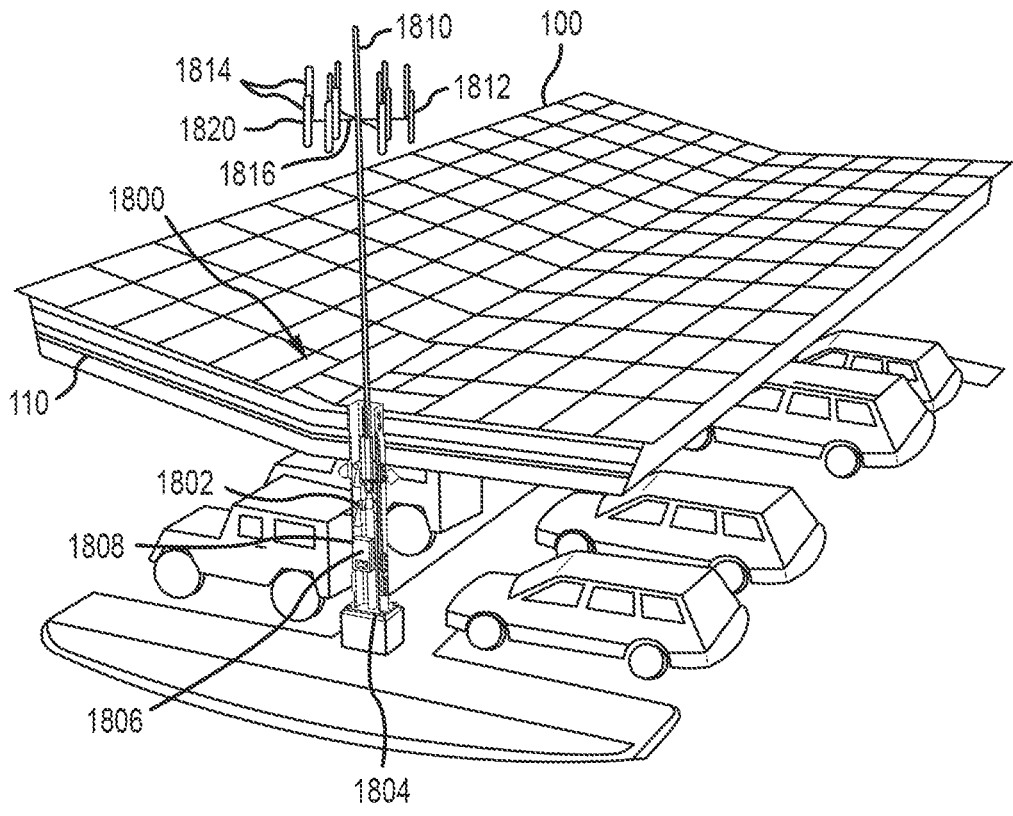
FIG. 18 is a perspective view of the exemplary solar canopy of FIG. 15 with a retractable antenna shown in the deployed configuration.
Figure 19:
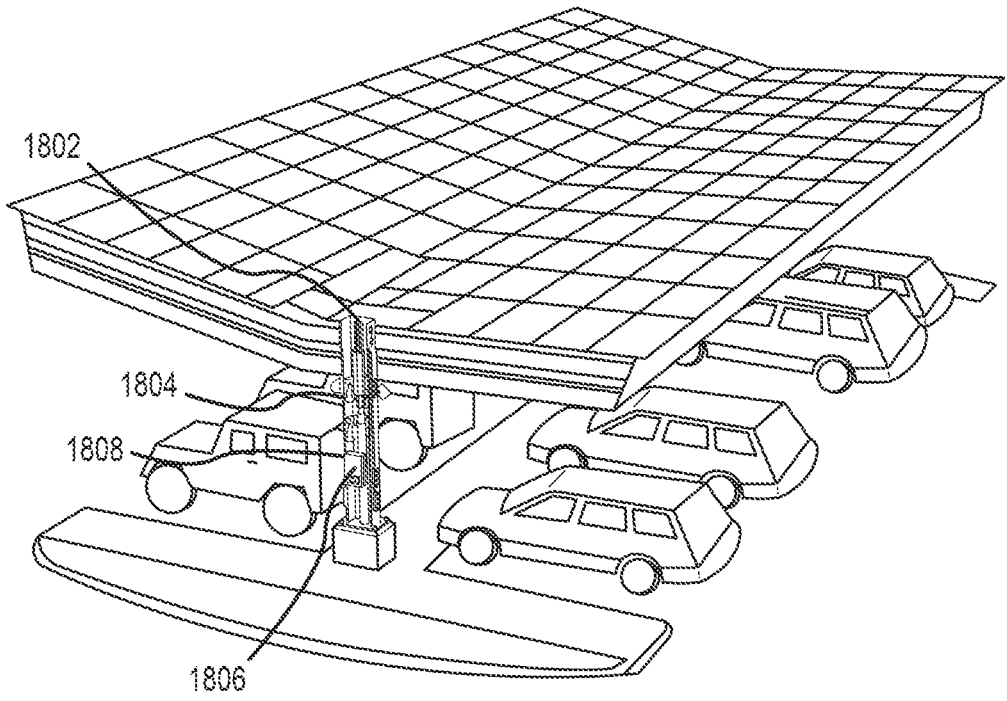
FIG. 19 is a perspective view of the exemplary solar canopy of FIG. 15 with the retractable antenna shown in the retracted configuration.
Figure 20:
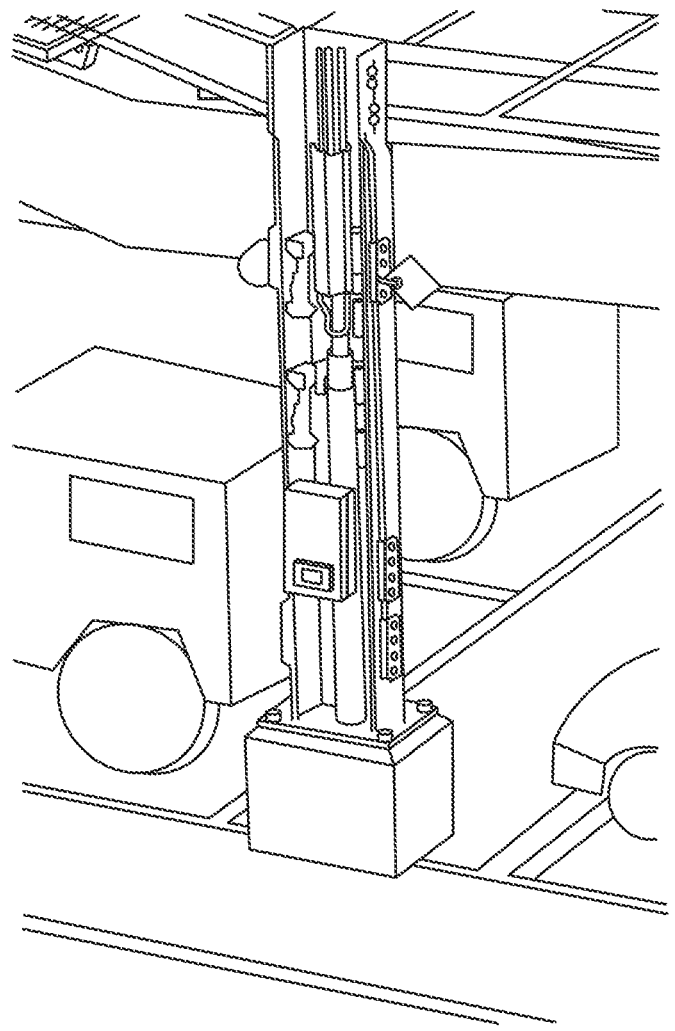
FIG. 20 is a detail of the retracted antenna of FIG. 19.

FIG. 18 shows a perspective view of the solar canopy 100 with an extendable antenna 1800. The extendable antenna 1800 is housed in this exemplary embodiment in a cavity 1802 formed in a vertical support strut 1804. The vertical support strut 1804 has a junction box 1806 electrically connecting the extendable antenna 1800 to the power source, which may be the power conditioners such as mentioned above or directly to either the batteries or the solar panels. The junction box 1806 may further comprise a port 1808, such as a USB port, conventional plug strip, or the like to allow electrically coupling emergency communication equipment to the power source as the load. FIG. 19 shows a perspective view of the solar canopy 100 with the extendable antenna 1800 retracted. The retractable antenna 1800 includes a telescoping shaft 1810 and a deployable antenna array 1812. The deployable antenna array 1812 includes a plurality of antenna elements 1814 pivotally coupled to a linkage arm 1816 at a first end 1820. The linkage arm 1816 is pivotally coupled at a second end to the telescoping shaft 1810. The linkage arms 1816 allow the plurality of antenna elements 1814 to be retracted close to the telescoping shaft to allow for compact storage in the cavity 1802. Of course, while shown as stored in a cavity in the vertical support strut 1804, the extendable antenna 1800 could be stored in a cavity located in the horizontal support strut 110 or some other similar compartment. Additionally, rather than being telescoping, the antenna may be foldable or otherwise collapsible. FIG. 20 shows a detail of the cavity 1802 and extendable antenna 1800 in the cavity 1802 in more detail. The junction box 1806 is shown in some detail as well. The junction box 1806 may include a motor and controls to extend the extendable antenna 1800. In some embodiments, the motor and controls would be operable from a remote location. As best seen in FIG. 20, the supports may include numerous peripheral devices, such as, plug strips, lighting, emergency lighting, ports, water purification systems, and the like (none of which is specifically labeled). All of the peripherals, and other equipment, may be a standalone load powered by the solar panels or high capacity battery.

With reference back to FIG. 1, solar power canopy 100 may include an integrated cavity 200 formed into the roof 112. The cavity 200 is shown to be sized and shaped to accept a relative flat, high capacity battery specifically designed for the solar power canopy 100 or such as the battery available from Tesla, Inc. for its Model S cars, or from Nissan, Inc. for its Leaf cars. Although the cavity 200 could be sized to fit other types of equipment, such as, for example, the radio frequency tower, servers, refrigeration units, and the like. Although other types of high capacity battery contemplated for the present technology include an electric vehicle battery (whether new, end-of-life, or refurbished), one of ordinary skill in the art would appreciate that a new or specially designed battery would be an acceptable alternative as would repurposed batteries associated with other high voltage, ampere battery system, which may be referred to as a high capacity battery as defined above. Thus, in the context of the present application, an electric vehicle battery may be considered to generically refer to a battery that may be designed for or from an electric vehicle or may be a similar battery in voltage and amperage. As mentioned above, one of ordinary skill in the art would now recognize on reading the disclosure that such high capacity batteries are configured to store in excess of 100 kWh. With specific reference to the Tesla battery pack (sometimes referred to as the Flat-Pack), the cavity 200 should have a length of about 2 to 2.5 meters, a width of about 1 to 1.6 meters, and a height of about 15 to 16 centimeters. The height may be extended a few centimeters, such as to about 20 centimeters to allow for space for air flow, space for equipment, and the like. Of course, the cavity could be expanded to accept multiple batteries along its length, width, or height. In each case, the cavity would be expanded accordingly. The cavity 200 is accessible through an opening 202. The opening 202 may include a door 204 movably coupled to the roof 112 using a hinge, an axle, or a slider. While the opening 202 is shown on one side of the canopy 100, the opening 202 could be on alternative sides to allow different or more access. Also, instead of a single cavity as shown, if multiple batteries are to be stored side-by-side, the cavity 200 may have a separation panel 206 to separate the cavities into first and second cavities $200_1$ and $200_2$, each of which may have an associated opening 202.

Figures 2, 2A:
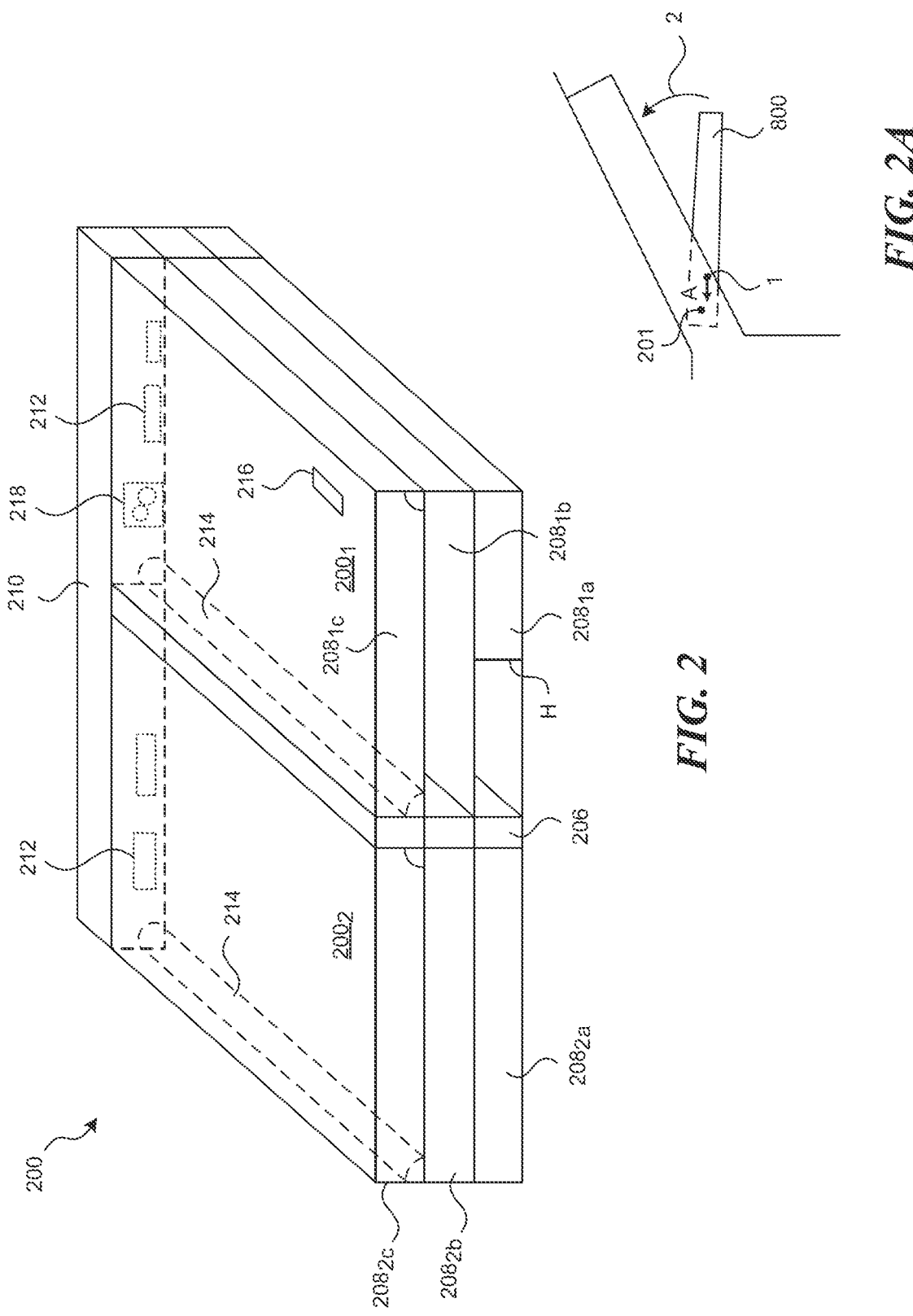
FIG. 2 is a perspective view of cavity chambers consistent with the technology shown in FIG. 1.
FIG. 2A is a view of loading a chamber to a solar canopy consistent with the technology shown in FIG. 1.

With reference to FIG. 2, one possible cavity 200 is shown having a single separation panel 206 to separate the cavity 200 into a first side $200_1$ and a second side $200_2$. As can be appreciated, the cavity 200 could be integral to the canopy 100 above or a compartment 200 designed to be coupled to the canopy 100 as described throughout the present application. The cavity 200 is further stacked into chambers $208_{1a}$, $208_{1b}$, and $208_{1c}$ on the first side $200_1$ and chambers $208_{2a}$, $208_{2b}$, and $208_{2c}$ on the second side $200_2$. The cavity 200 as shown would be sized to receive six separate batteries in individual chambers. More or less chambers are possible. Furthermore, the separation panel 206 is optional as is the floor of each chamber 208 although it is preferable not to stack batteries one directly on top of the other for heat buildup. In other words, the chambers 208 may be formed by open framed structures rather than completely enclosed structures. With reference now to FIGS. 33A-D and 34, the sidewalls, separation panels, floors, and/or ceilings of chambers 208 may be formed with fluid channels, such as tubes, or plates, such as cold plates, to receive fluid to facilitate heat dissipation as will be explained further below.

Figure 12:
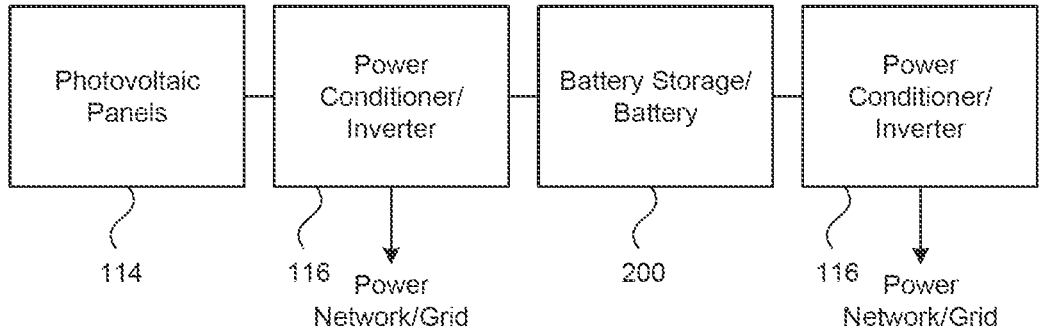
FIG. 12 is a functional schematic block diagram of a power circuit consistent with the technology of the present application.

The cavity 200 has integrated into it electric battery connector 210. Electric battery connector 210 has contacts 212 to connect an electric battery, not specifically shown, electrically to the power conditioner 116, which may include control electronics to control the charge and discharge of the electric battery. The term contacts is used generically to mean an electrical connection between two parts. A contact could be to electrical pads, plugs, pins, rods, soldered connections, ribbons, cables, busbars, or the like. The power conditioner 116 may be incorporated into the connector 210. One exemplary functional block diagram of an electrical configuration is shown in FIG. 12.

To facilitate the insertion and removal of the electric battery, the cavity chambers may include devices 214, as shown in chambers $208_{1c}$ and $208_{2c}$, to facilitate aligning and moving the electric batteries. The devices 214 may include rollers, bearings, rails, sliders or the like to name but a few devices. The device 214 engages the electric battery to align it with the contacts 212 and allow the battery to be inserted and removed without dragging the battery along the chamber bottom or along the surface of another battery. The contacts 212 are arranged to allow insertion of the battery to electrically connect the battery to the power conditioner 116. But, as shown in FIG. 12, the power conditioner 116 can output power from the renewable power source, such as panels 114, to the grid whether a battery is in the circuit or not. The cavity chambers also may include vents 216, of which only one is shown. The vents 216 would facilitate air flow. The battery connector 210 may include a fan module 218 to further facilitate air flow to dissipate heat and the like. The fan and vent path system will generally be referred to as forced air or forced air cooling.

Figure 33A:
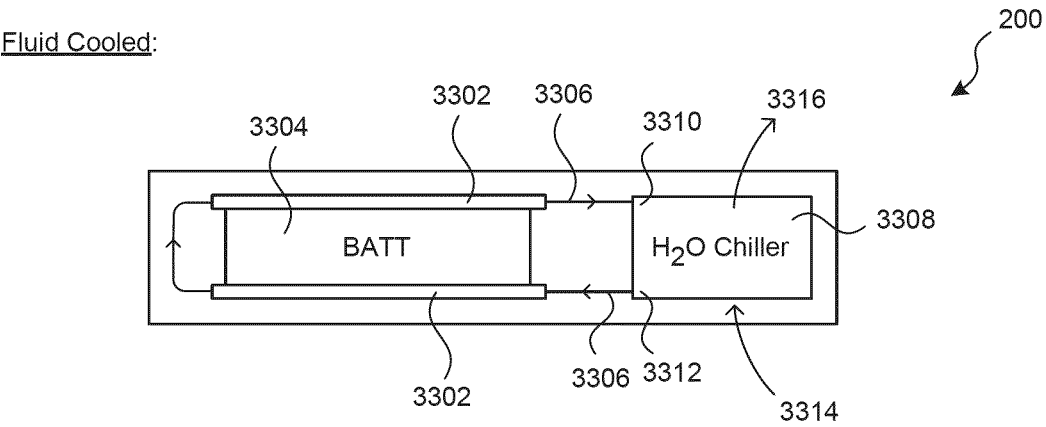

While the fan (or fans) 218 and vent (or vents) 216 allow for some air cooling of the high capacity batteries, the technology of the present application may generate a significant amount of heat as the batteries charge, store, and discharge energy. FIGS. 33A-D and 34 show several embodiments of heat dissipation systems. Each of the heat dissipations systems, including the fans and vents above, may be used singularly or in conjunction with one or more means for dissipating heat depending on the kWh of the batteries. For example, it is believed that simple air cooling will not be sufficient for the high capacity batteries described herein. Simple air cooling generally refers to convection to ambient air. Thus, as shown in FIG. 33A, the cavity 200 may include fluid plates 3302 on one or more sides of a battery 3304 (or battery compartment as that term is defined below). Fluid plates 3302 may be an open cavity through which fluid flows or a series of tubes or capillaries through which fluid flows contained in a plate structure. Generally the plate would need to have a high thermal conductivity. The fluid plates 3302 are coupled via pipes 3306 to a heat exchange 3308, typically a U-tube type heat exchanger. The heat exchanger 3308 has an inlet 3310 and an outlet 3312 as well as an intake 3314 and exhaust 3316. The heat dissipation system shown may further include a pump (not specifically shown) to facilitate fluid flow for cooling of the battery or compartment. Typically the fluid would be liquid water and the gas would be forced air. In some cases, however, the fluid may be other refrigerants. When used with water, the heat exchanger is sometimes referred to as a water chiller or the like. The intake 3314 and exhaust 3316 may intake ambient air to remove the heat from the fluid as it travels through the heat exchanger 3308.

Figure 33B:
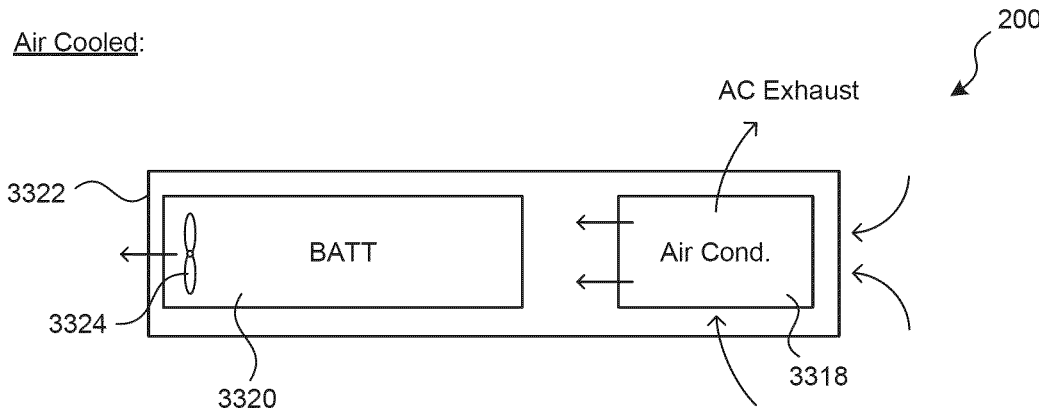
Figure 33C:
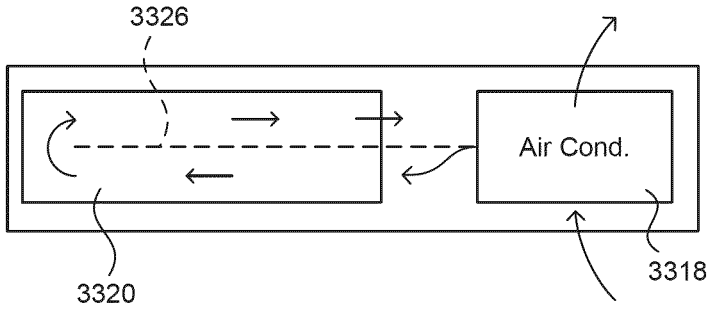
Figure 33D:
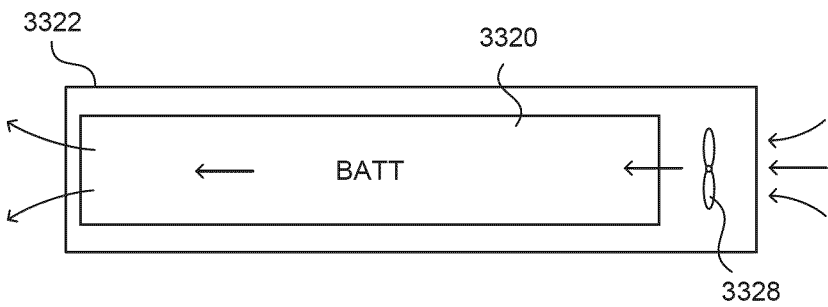

Forced air cooling systems may be used as well. For example, as shown in FIGS. 33B and 33C, an air conditioning unit 3318 (or simply an air conditioner) may be installed in the cavity 200. The air conditioner 3318 may be powered by the high capacity batteries, the power conditioner, or the solar panels directly. The relatively cool air from air conditioner 3318 travels across the surfaces of the high capacity battery 3320 and exits an air exhaust 3322, which may be a vent as described above. The cavity 200 may further have an exhaust fan 3324 downstream from the air conditioner 3318 to facilitate movement of the relatively cooler air from the air conditioner 3318 across the surfaces of the high capacity battery 3320 and out the exhaust 3322 as shown in FIG. 33B. FIG. 33C shows a similar forced air cooling system having the air conditioner 3318 that causes forced air over the surfaces of high capacity battery 3320. The air flow is directed by a panels 3326 (or vanes) along one surface and back along another surface of the high capacity battery 3320 where it is recirculated through the air conditioner 3318 in a closed loop air system. In certain lower power applications, the forced air cooling may simply have a fan to force ambient air across the surfaces of the high capacity battery. As shown in FIG. 33D, a blower 3328 (or fan) may intake ambient air and force it across the surfaces of the high capacity battery 3320 and out the exhaust 3322. Alternatively, the blower 3328 may be arranged downstream of the high capacity battery 3320.

Figure 34:
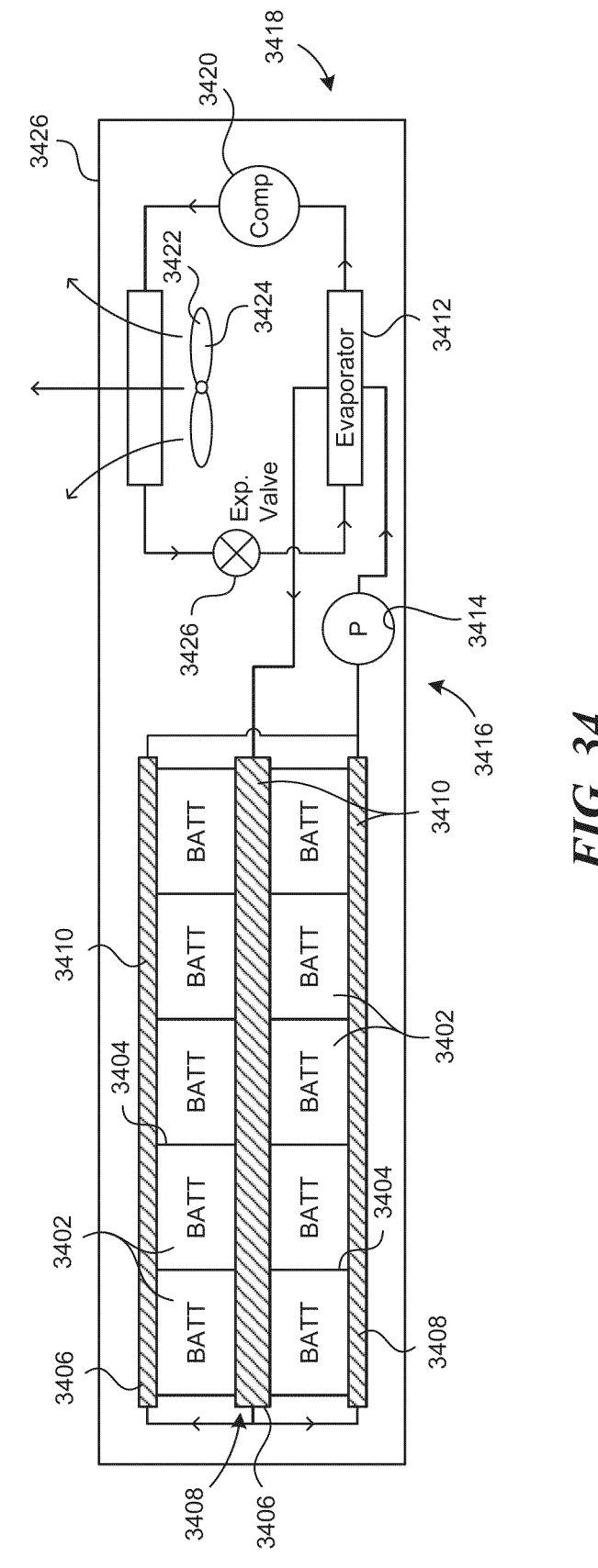

FIG. 34 shows a heat dissipation system 3400 consistent with the technology of the present application. The heat dissipation system 3400 may be incorporated into the cavity 200 or into other parts of the solar power canopy 100. The cavity 200 in this case has multiple high capacity batteries 3402 separated by panels 3404. The ceiling 3406 and floor 3408 may comprise cold plates 3410. The term cold plate and fluid plate is used interchangeably herein. A cold plate 3410 is a metal block with channels to allow fluid circulation throughout the cold plate 3410. The cold plate 3410 should be a good thermal conductor, such as, for example, aluminum or the like. The cold plates 3410 are in fluid communication with a fluid source 3412, which may be a fluid reservoir or the output of a heat exchanger such as an evaporator as shown in this exemplary embodiment. The fluid is forced through the cold plates 3410 and the fluid source via a pump 3414. In one exemplary embodiment, the fluid is water and the pump 3414 is a water pump. Under certain conditions, water may exit the fluid source 3412 at a discharge and travel through cold plates 3410. As heat is removed from the batteries, the water may phase change to steam. The steam would be returned to the fluid source at an intake where the evaporator would condense the steam back to water by circulating a refrigerant through the evaporator to remove the heat from the steam. Thus, the heat dissipation system 3400 has a coolant loops 3416 and also a refrigerant loop 3418. The refrigerant loop 3418 generally includes a compressor 3420, a condenser 3422, an air intake manifold including a fan 3424, an air exhaust manifold, and a pump 3426. The refrigerant may be any number of refrigerants. The refrigerant is used as the cooling medium for the fluid source, which is shown as an evaporator, but could be any type of heat exchanger. The relatively hot refrigerant exits the heat exchanger and is compressed by compressor 3420 and condensed back to a liquid in condenser 3422. The relatively cool refrigerant enters the heat exchanger and the process continues. The refrigerant is cooled by the air flow through the condenser.

Figure 29:
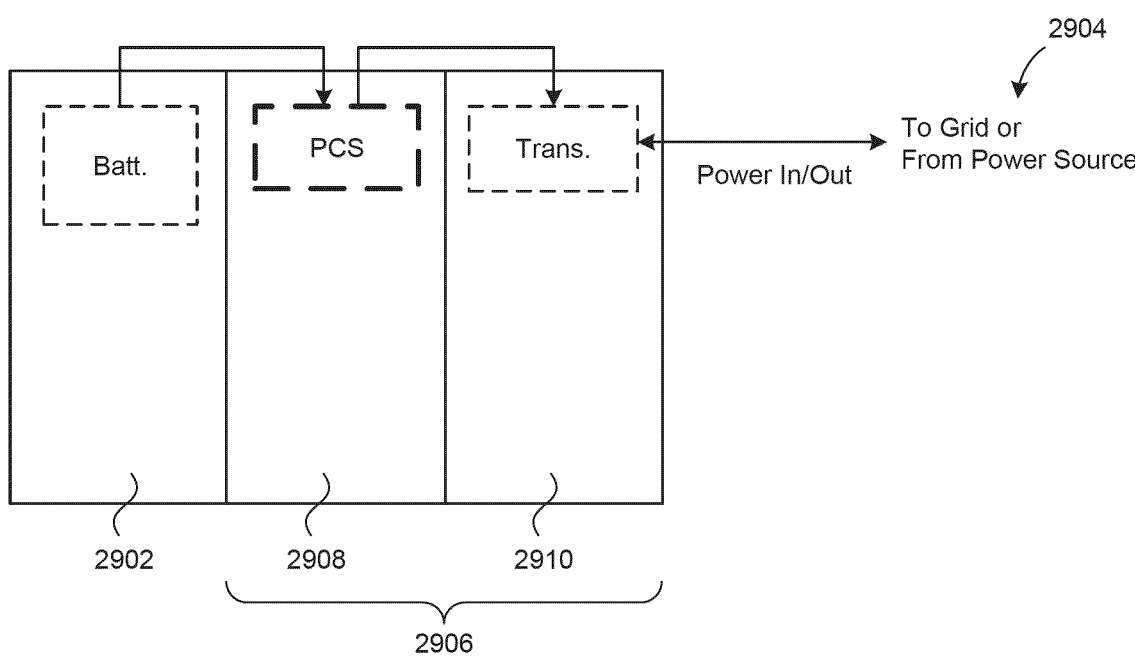
FIG. 29 is a functional block diagram of a circuit for the batteries to supply or receive power consistent with the technology of the present application.
Figure 29A:
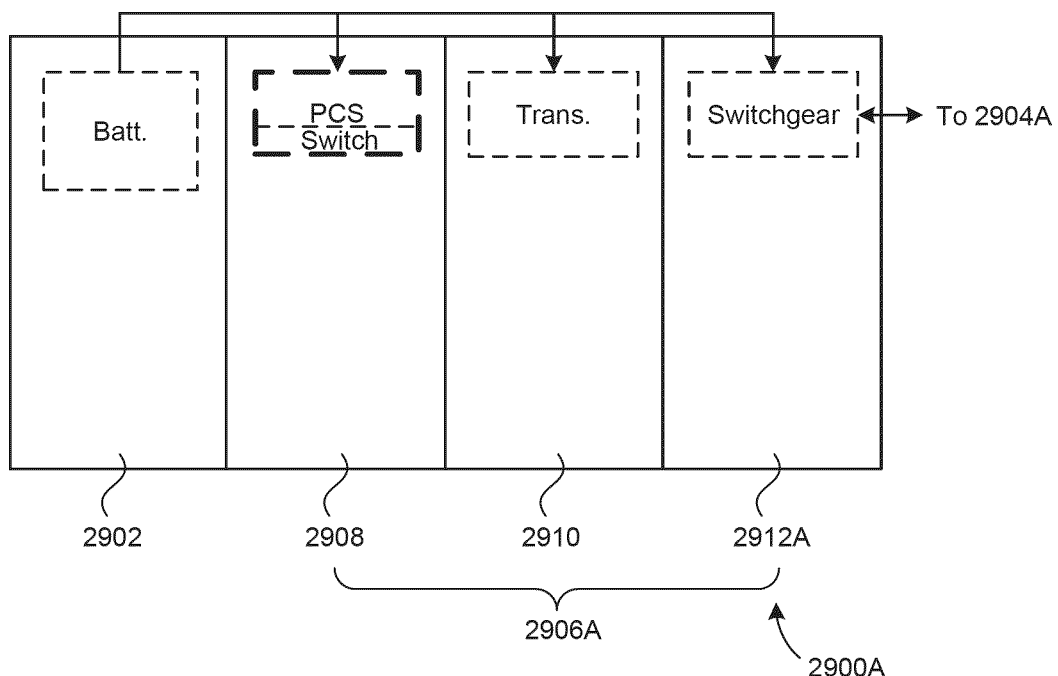
FIG. 29A is a functional block diagram of FIG. 29 with a switchgear consistent with the technology of the present application.

As shown in FIG. 12, above, the solar panels 114 may output power directly to the external unit, such as the grid 1 or local power network or any of the other devices mentioned throughout the application regardless of whether a battery is placed in the system. Similarly, the high capacity battery (or Energy Storage System) may output power directly to the external unit, such as the grid 1 or local power network or any of the other devices mentioned throughout the application regardless of a connection to another power supply. For example, with reference to FIG. 29, a functional schematic block diagram is shown connecting the high capacity battery 2902 to a power grid or local power network 2904. The high capacity battery 2902 is connected to the power grid or local power network 2904 through the power conditioner 2906, which as shown includes, for example, a power conversion system 2908 and a transformer 2910. Generally, the power conversion system 2908 provides a DC-AC inversion, DC-DC step up or down, and rectification of incoming AC to DC. The transformer 2910 provides an AC to AC conversion to grid voltage and inhibits a no-load condition on the grid. The transformer 2910, while generally used, is optional depending on the system. The power out to the grid or local power network 2904 is provided when the battery has stored sufficient energy to transfer power to the grid or local power network. When the battery lacks a sufficient store of energy, the grid, local power network, or alternative power source such as solar panels, would supply energy to the battery 2902 as storage for when needed, such as spikes in grid load or the like. With reference to FIG. 29A, the minimal system shown in FIG. 29 is shown in another aspect. FIG. 29A provides a functional schematic block diagram having the high capacity battery 2902 that may be coupled to an external load 2904A, such as the power grid or a local power network or other devices mentioned throughout the application. The energy storage system 2900A includes a power conditioner 2906A, which includes, for example, a power conversion system 2908, a transformer 2910, and a switchgear 2912A electrically, operably coupling the transformer 2910 to the external load 2904A. The switchgear 2912A would be contained in the compartment, such as the battery compartments described throughout the present application.

Figure 30:
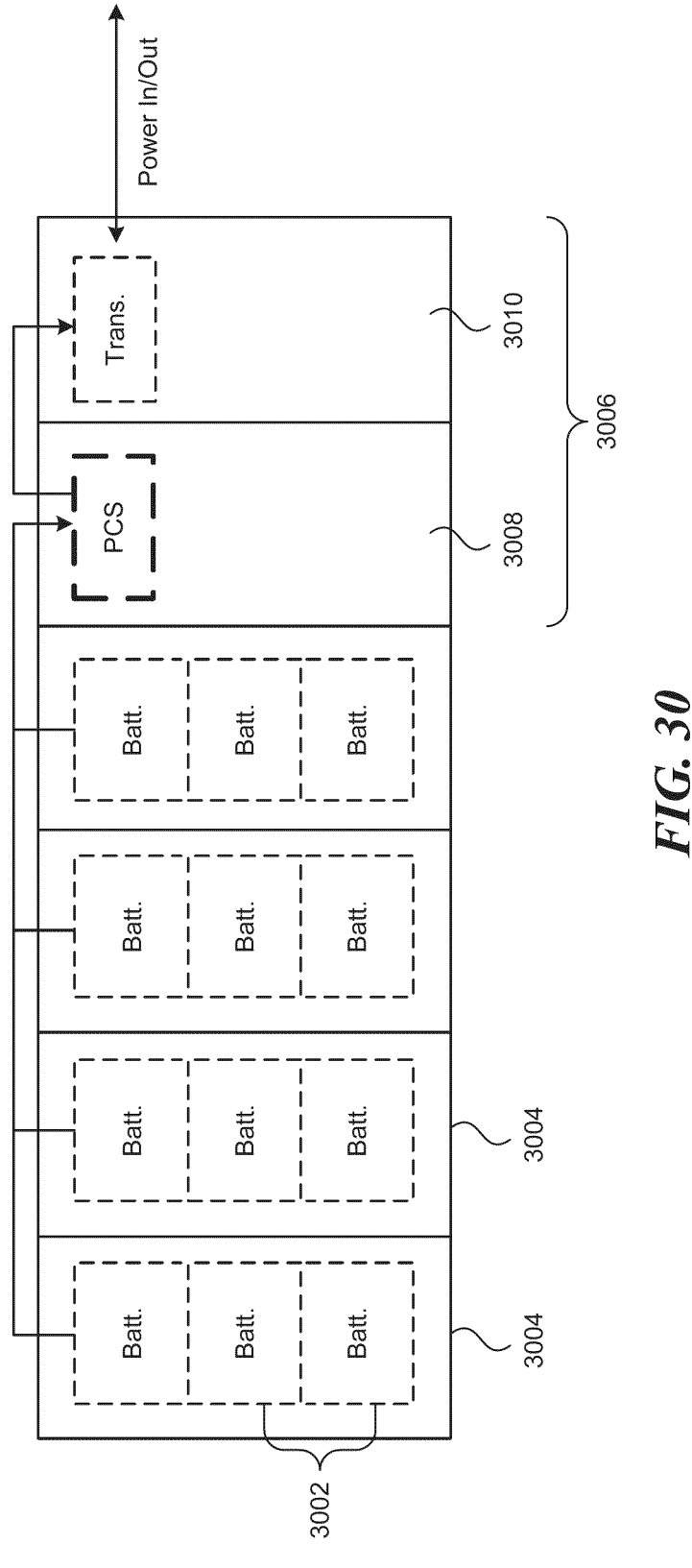
FIG. 30 is a scaled version of FIG. 29.
Figure 31:
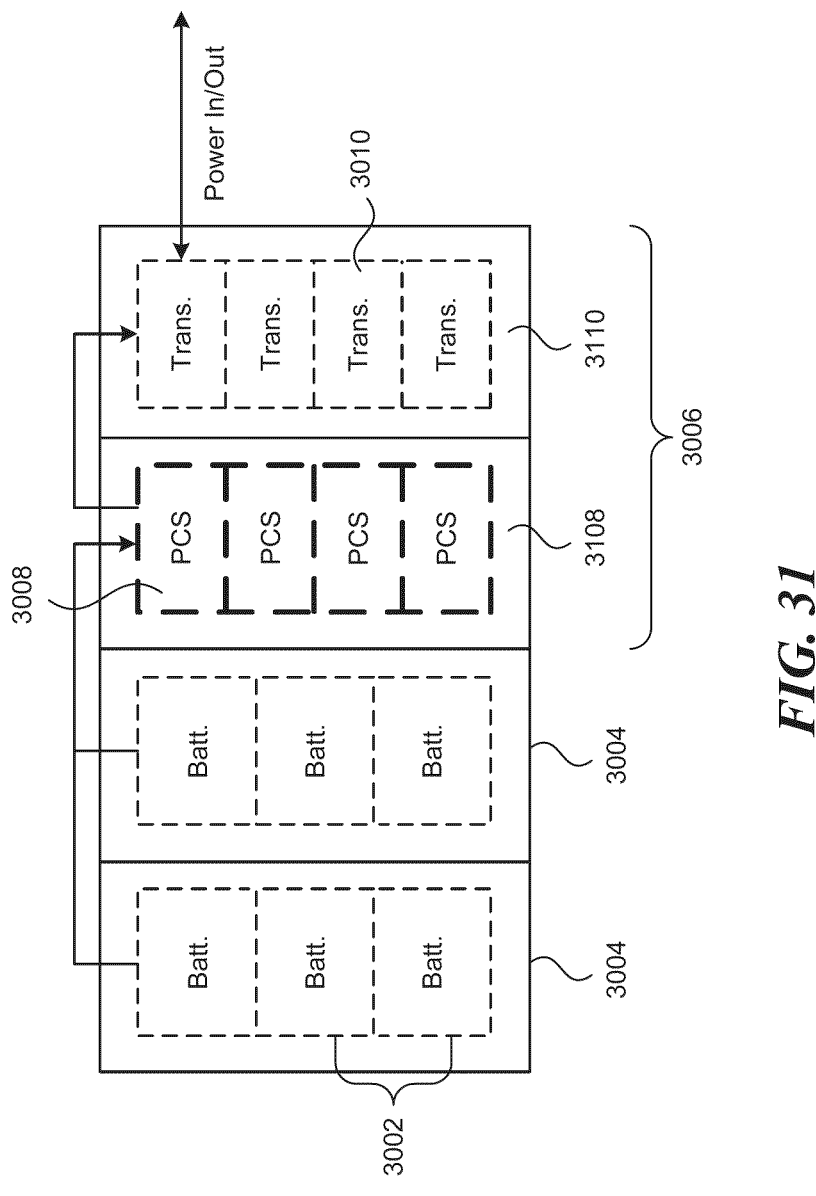
FIG. 31 is another scaled version of FIG. 29.

The technology of the present application, however, is scalable to a very high voltage, amperage arrangement. As mentioned above, each high capacity battery may be capable of storing up to approximately 150 kWh using conventional technology. The solar power canopy 100, however, may store several such batteries. With particular reference to FIGS. 30 and 31, functional schematic block diagrams are shown scaling batteries (or high capacity batteries) for increased voltage (stacked in series) and amperage (arranged in parallel). As shown, the scaled system provides a plurality of batteries 3002 to form a battery bank 3004 and a plurality of battery banks 3004. The plurality of battery banks are connected to a power conditioner 3006, which includes a power conversion system 3008 and a transformer 3010 as described above. For increased flexibility in design and operating schemes, the power conditioner 3006 may include a plurality of power conversion systems 3008 forming a bank of power conversion systems 3108 and a plurality of transformers 3010 forming a bank of transformers 3110. As can be appreciated, batteries, power conversion systems, and transformers can be added or removed as needed to facilitate the relatively rapid deployment and movability of the system making it highly adaptable for an emergency as well as a permanent power source. Thus, the energy storage systems described herein will generally include canopy mounted inter-connectable elements that include a minimum of a high capacity battery and a power conditioner, which may include power control electronics, transformers, inverters, and rectifiers as necessary. As used herein in one aspect, canopy mounted inter-connectable should be construed to mean parts of the energy storage system that are mounted inside, below, or on top of a canopy structure and that the elements are electrically operatively coupled together. The scalable described in FIGS. 30 and 31 may further include the switchgear 2912A as described with reference to FIG. 29A. Moreover, a single switchgear may be provided or a plurality of switchgears up to at least one switchgear for each transformer or more.

Figure 15:
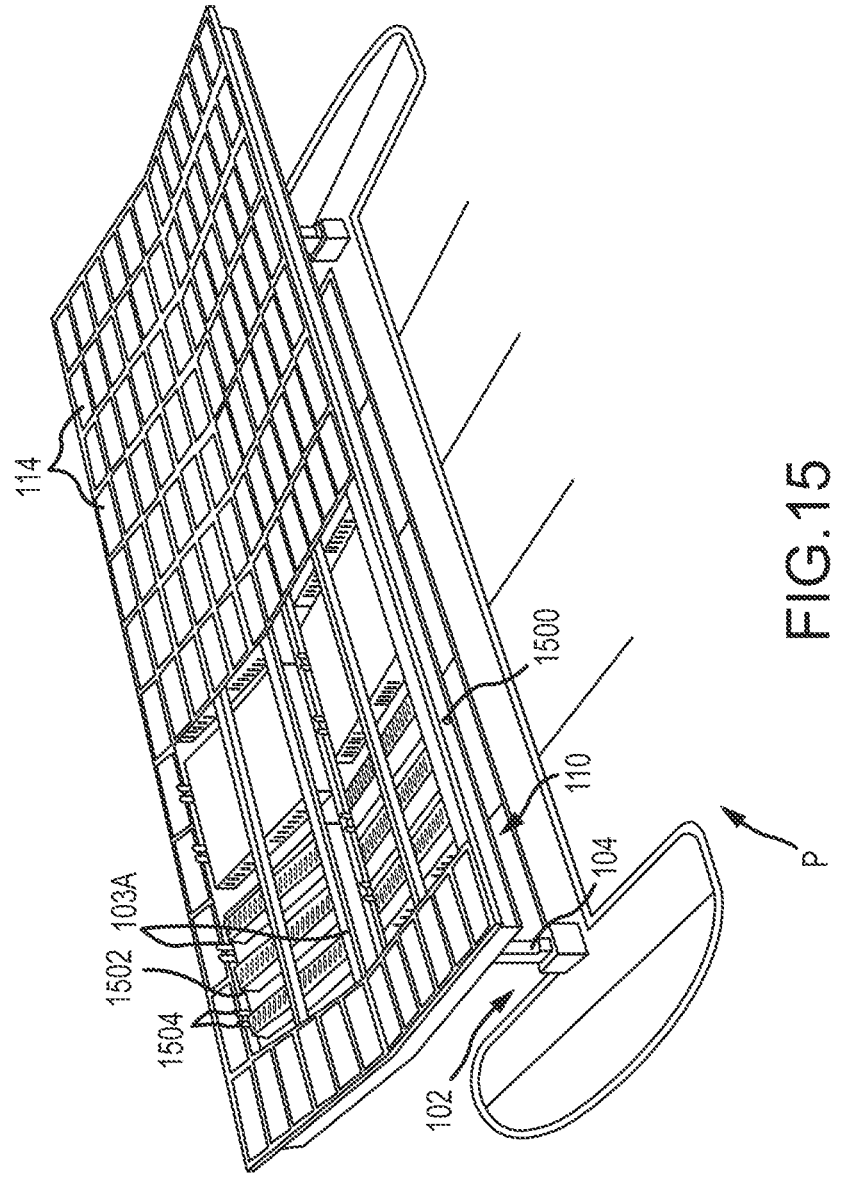
FIG. 15 is a perspective view of one exemplary solar canopy consistent with the technology of the present application with a portion of the solar panels cut-away to show the retrofit compartment(s) with high capacity batteries.
Figure 16:
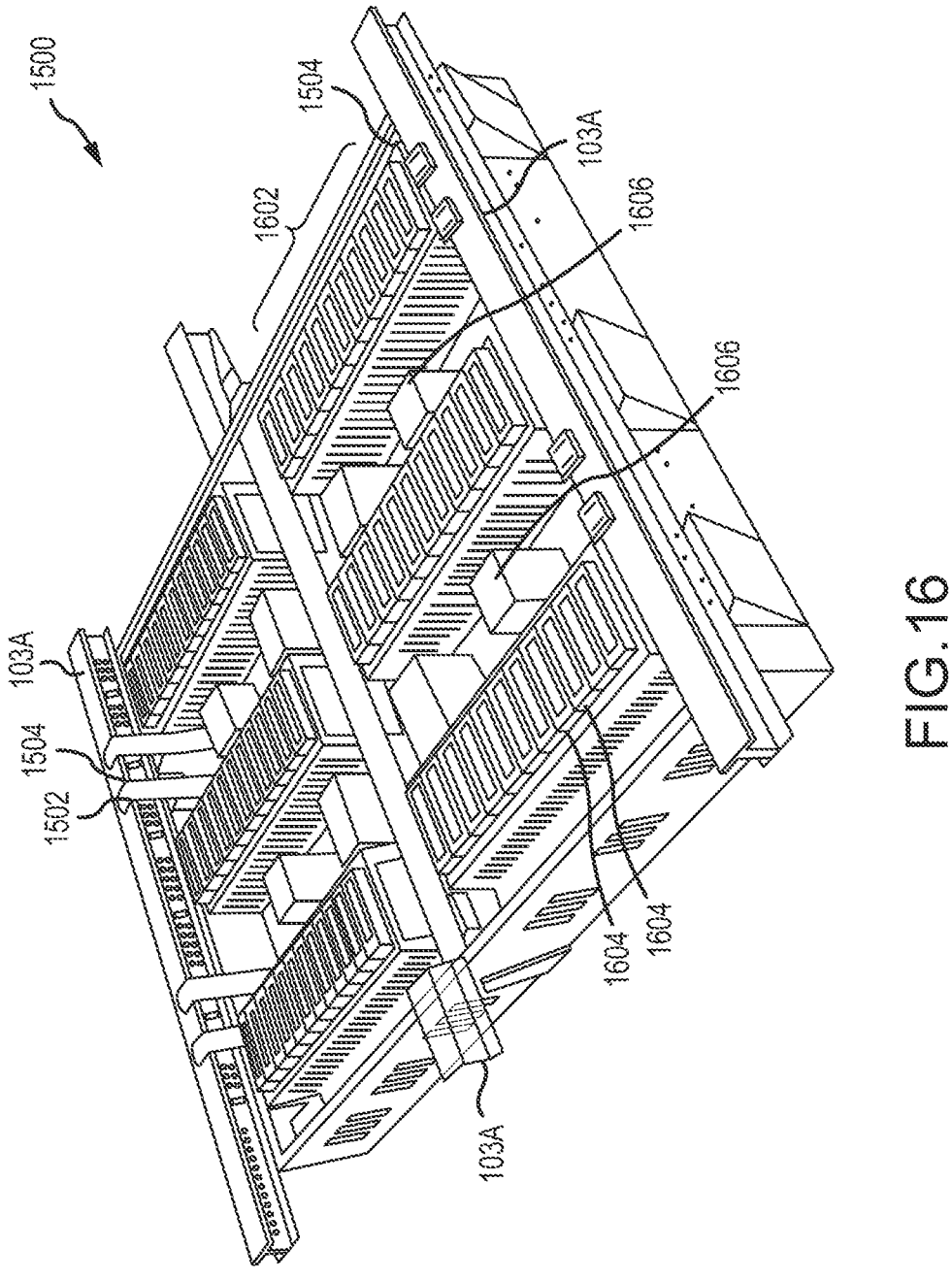
FIG. 16 is a perspective view of a portion of FIG. 15 with the retrofit compartment shown in more detail.
Figure 17:
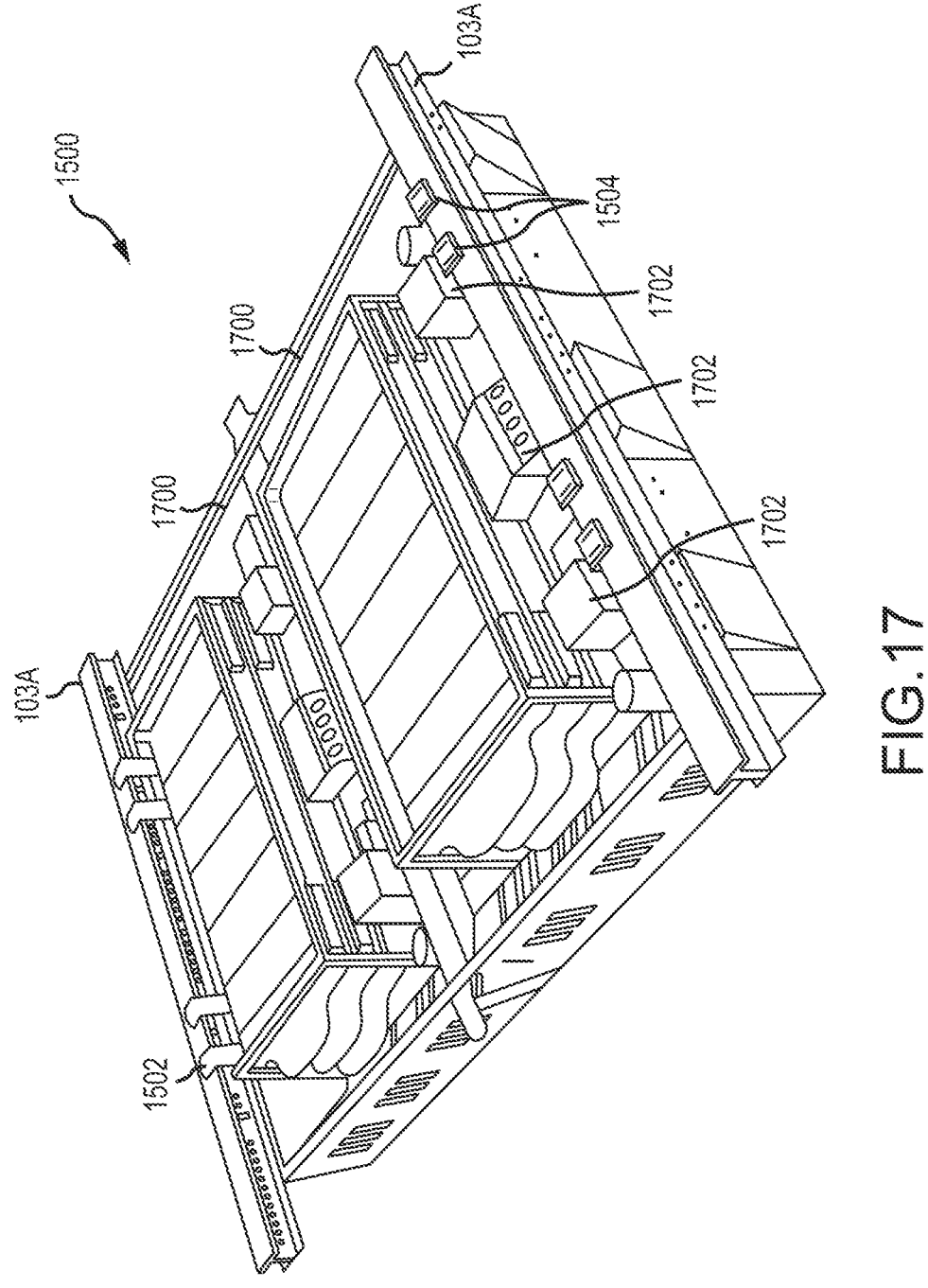
FIG. 17 is a perspective view of a portion of FIG. 15 with the retrofit compartment shown in more detail with a stack of electric vehicle batteries.

FIG. 15 shows a rendering of solar canopy 100 in one exemplary use in a generic parking lot P. The solar canopy 100 has the central support structure 102 with horizontal support struts 110 extending from the vertical strut 104. The solar canopy 100 has a plurality of solar panels 114 over an open roof structure 112 comprising a plurality of horizontal beams 103A extending between the horizontal support struts. A compartment 1500 forming the above-mentioned cavity 200 is shown coupled to the horizontal beams 103A by bolted flanged members 1502. As one of ordinary skill in the art will now recognize on reading the disclosure, compartment 1500 may be part of an original construction or integral with the canopy but also may be used to retrofit to an existing canopy not originally designed to incorporate the energy storage system described herein. The flanged members 1502 are shown bolted to the horizontal beams 103A by bolts 1504, but the bolts 1504 may be replaced by other fastening means such as, for example, rivets, welds, or the like, all of which are means for connecting the compartment 1500 (retrofit or original construction) to the canopy 100. In certain aspects, bolting the compartment 1500 to the canopy is preferable to allow for disconnecting the compartment 1500 from any particular canopy and moving the compartment 1500 to another canopy or replacing the compartment 1500 with another compartment 1500 that may be preloaded with equipment as explained herein. As shown in FIG. 15, the compartment 1500 can have an open top as it is protected from the elements by the solar canopy roof and/or panels, or be an enclosed compartment as also shown. The compartment 1500 has a heat dissipation system as explained above, and at a minimum has vents to allow for heat dissipation. With reference to FIG. 16, two retrofit compartments 1500 are shown in more detail without the solar panels, heat dissipation systems, and a beam 103A and the like for convenience. The compartments 1500 include a plurality of high capacity battery banks 1602. The high capacity battery banks shown in FIG. 16 comprise squarish batteries 1604 arranged horizontally. The retrofit compartments 1500 also include one or more power conditioners 1606, as explained above. The battery banks are coupled to the power conditioners 1606 via plugin adapters as shown or other comparable connectors. With reference to FIG. 17, two retrofit compartments 1500 are shown in more detail with flat pack high capacity batteries 300 stacked in a framework 1700. The high capacity batteries are similarly coupled to power conditioners 1702 via plugin adapters as shown or other comparable connectors. The flat pack high capacity batteries 300 may be separated by, for example, the fluid plates 3302 or cold plates 3410 as described above where the heat dissipation system is incorporated into the compartment 1500.

Importantly, as can be appreciated, each of the compartments 800 (as described below), 1500 (as described above) may contain both the high capacity storage batteries as well as the electronics to connect the same to the power grid or local power network as well as the heat dissipation systems. Additionally, the compartments 800 and 1500 may be designed to hold the external load, which load may include the refrigerants, servers, or electronic vehicle chargers, or the like. This provides for swapping, hot or cold swapping, a compartment 800, 1500 from one solar canopy 100 to another solar canopy 100 located in a different location. For example, in a disaster area, a compartment 800 from a solar canopy 100 in an area where a power grid is functioning normally may be removed an relocated to a solar canopy 100 in an area where the power grid is not functioning normally.

Figure 3:
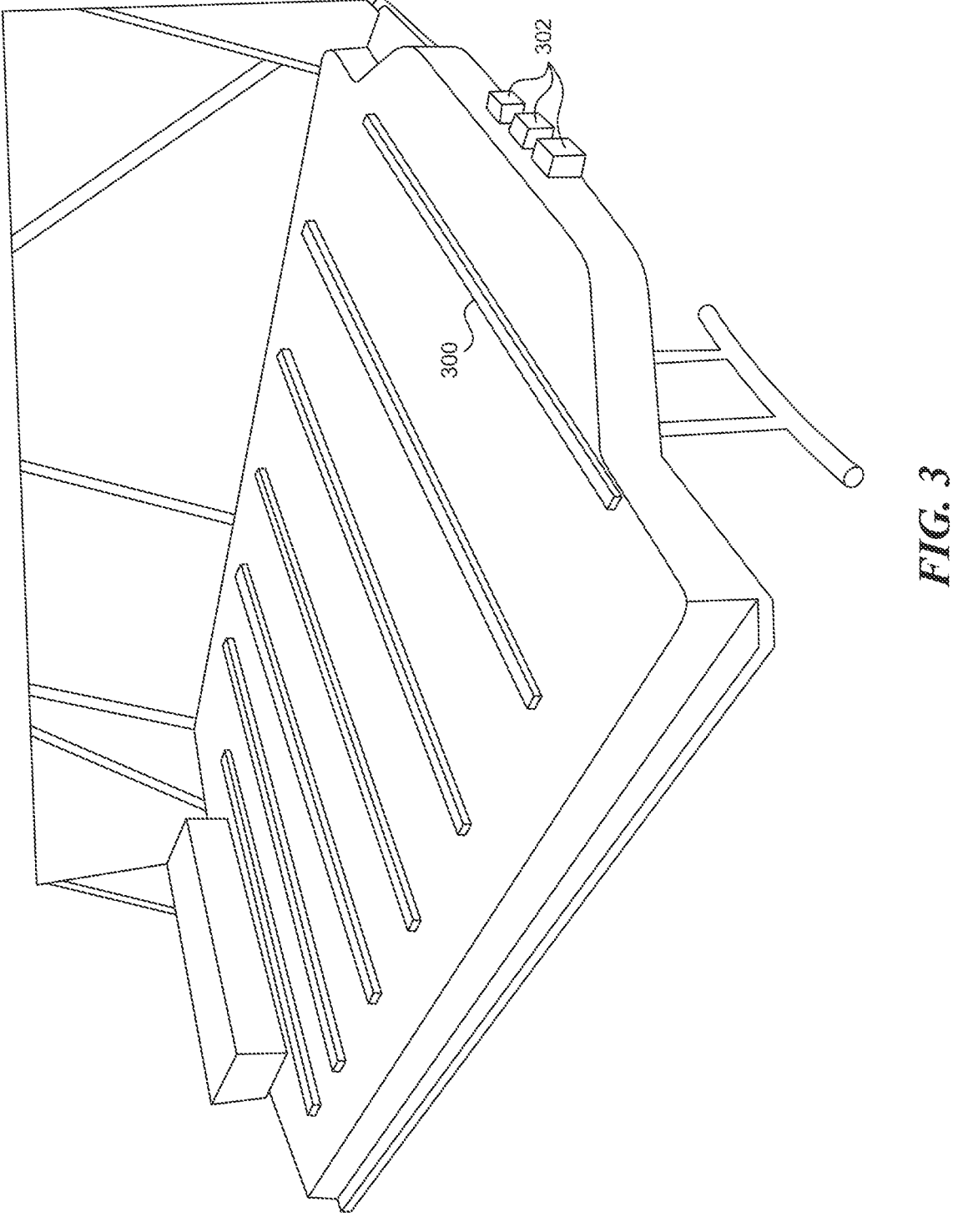
FIGS. 3-6 are perspective views of high capacity batteries including electric vehicle batteries usable with the technology of the present application.
Figure 4:
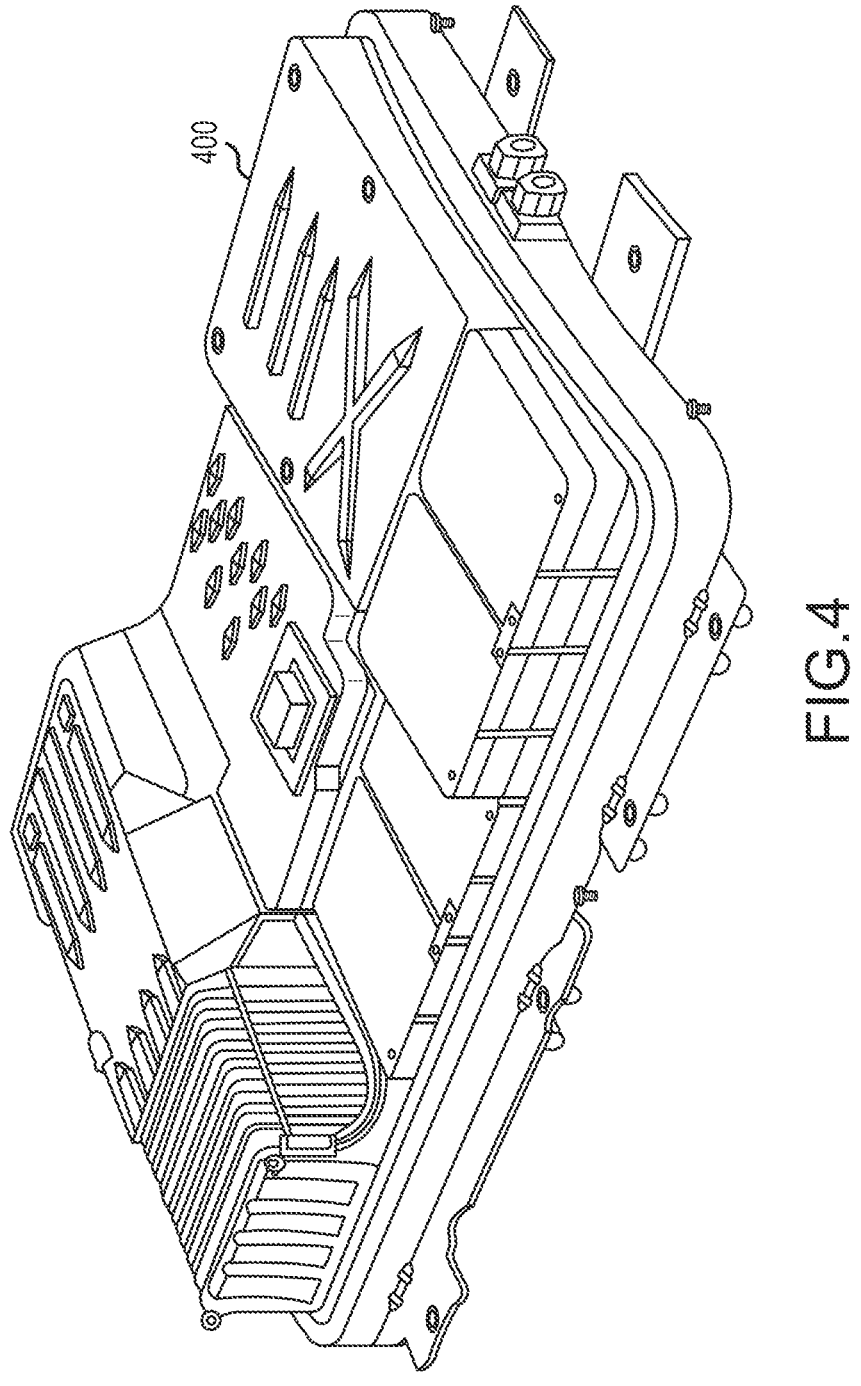
Figure 5:
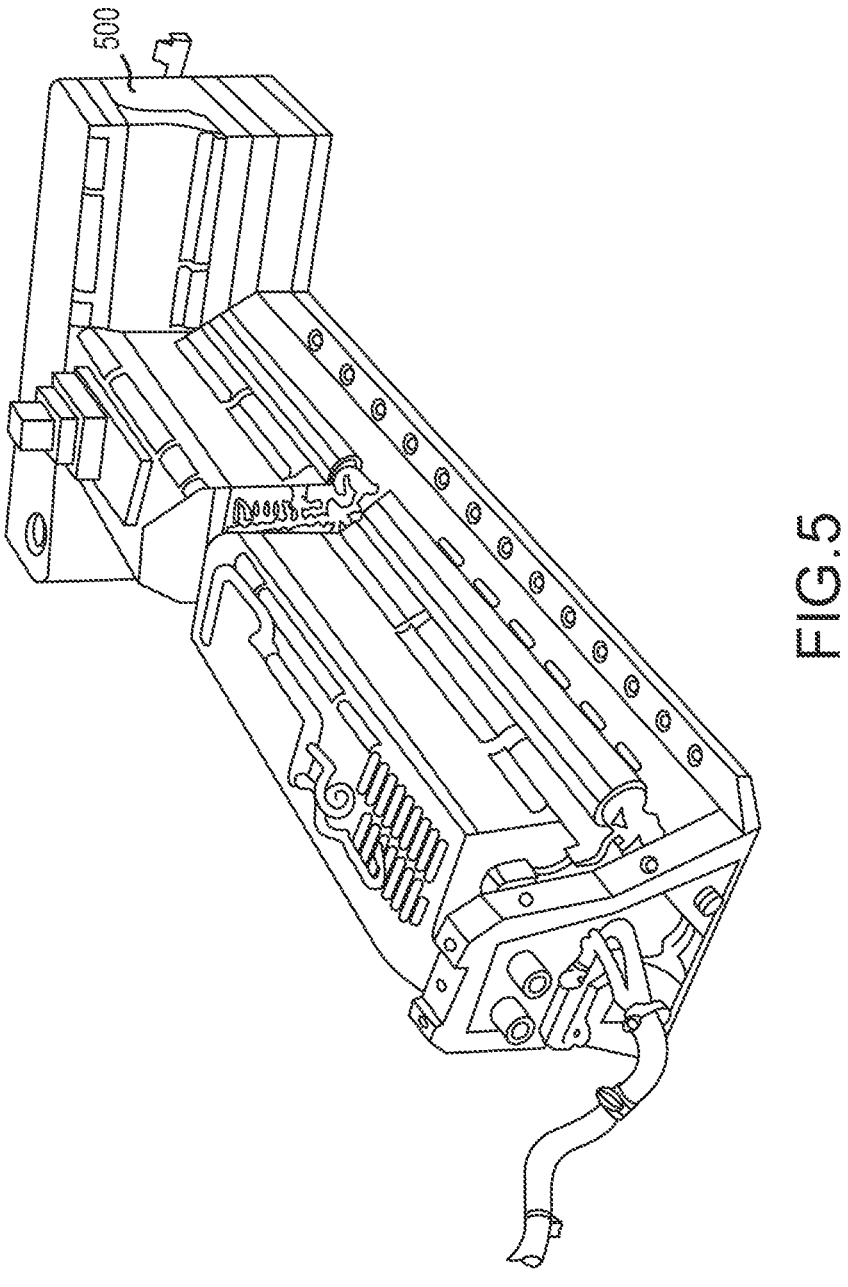
Figure 6:
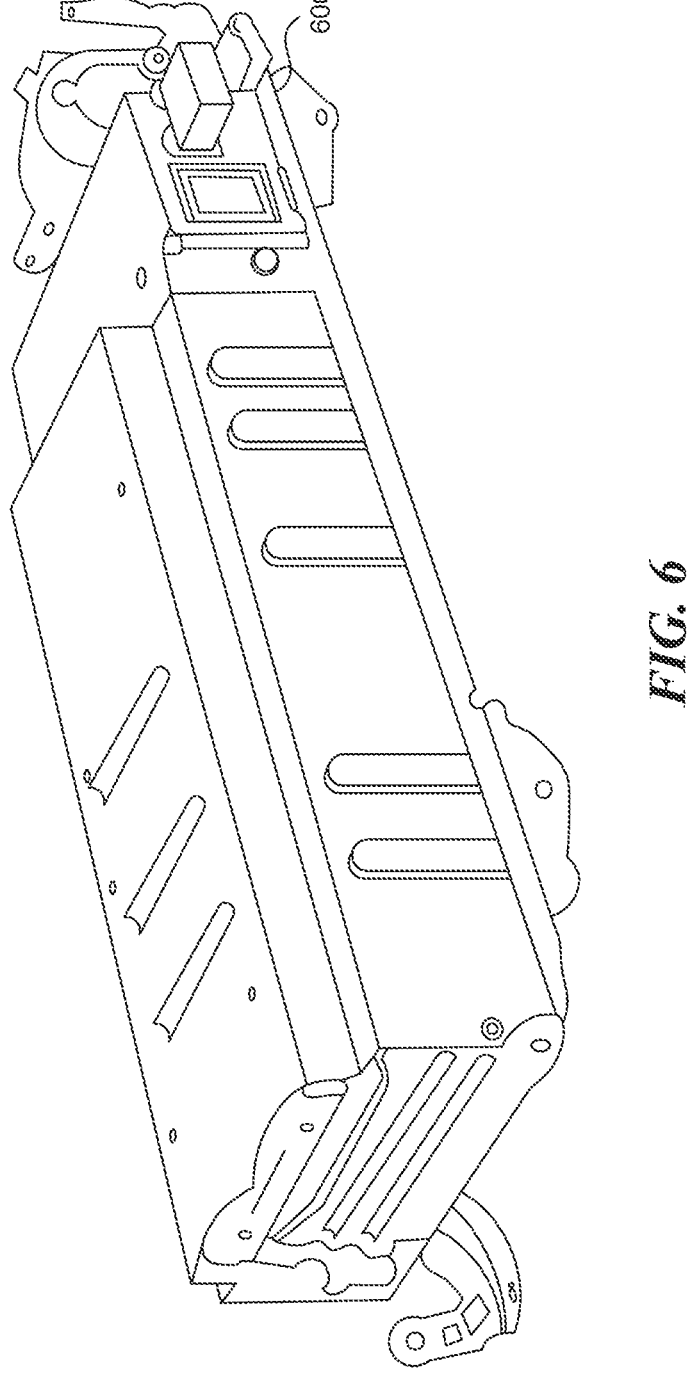

With reference back to FIG. 1, it can be appreciated that high capacity batteries, especially those associated with electric vehicles, have different sizes and shapes. While the technology of the present application is designed for use with high capacity batteries specifically designed for the solar power canopy 100, one possible source of high capacity batteries includes currently available electrical car batteries. Moreover, as no specific standard for high capacity batteries currently exists, it is envisioned that commercial high capacity batteries may take many shapes. With specific reference to electric vehicle batteries as shown in FIGS. 3-6, for example, a variety of current shapes are shown. FIG. 3 specifically shows a flat-pack type battery 300. The battery 300 has connectors 302 that are configured to couple to connectors 210 in the various cavities above. The connectors 302/210 may be electrically connected by physical contact or via plugin cables, busbars, or the like. While a number of contacts are possible, FIGS. 35 and 36 show two possible types of connectors. FIG. 35 provides for a modular busbar 3502 having one or more joinable sections 3504 running alongside of the compartments 800 and 1500, for example. The busbar 3502 may be increased or decreased in length as necessary by joining or removing sections 3504 as compartments are added or removed from the canopy structure. FIG. 36, alternatively, shows blind mate contacts 3602 on a side of the compartments 800 and 1500 having a positive contact 3604 and a negative contact 3606. The blind mate contacts 3602 would connect adjoining compartments or electronics. Each compartment or energy storage system may be provided with multiple types of interconnections. With reference to FIG. 4, another flat-pack type battery 400 is shown. The battery 400 is generally bulkier in certain sections, but generally configured to fit well in a flatter cavity such as cavity 200 shown above. The chamber 208 into which the battery is placed would need to have a height H of approximately 27 to 30 cms as opposed to the height H of 15 to 16 cms mentioned above. In any event, the batteries shown in FIGS. 3 and 4 are arranged generally long, wide, and flat, with flat generally meaning a height of less than 30 cms. The cavities could be specifically dimensioned for particular battery or design to accept the largest diameters associated with any particular battery type. In certain embodiments, the cavities or chambers would be sized to operatively receive a specially designed electric vehicle battery or a similar high voltage and amperage battery. With reference to FIG. 5, a battery pack 500 is shown. The battery pack 500 is configured in a different arrangement than the batteries 300 and 400 above. The battery pack 500 is generally associated with the Chevy Volt electric vehicle and is in a "T" shape configuration. Still another battery pack 600, as shown in FIG. 6, includes a box or cylinder like structure that is associated with the Toyota Prius electric vehicle. As can be appreciated, the batteries 500 and 600 are not as suited for insertion and removal from a long, flat cavity as may be associated with cavity 200. The cavity 200 for batteries of this type may provide cavities or chambers specifically designed to fit the different configurations. While the internals of the cavity (dimensions, electrical connections, and equipment) may be different for each battery type, the externals of the cavity may be designed with a uniform or standard configuration to allow for easy of changes outs or swapping of cavities from one canopy to the next. Alternatively, the solar canopy 100 may be provided with a cavity 700 in a support beam, or multiple cavities 700 as shown. For example, cavity 700$_1$ is shown in the central strut support 102. The cavity 700$_1$ includes a vertical portion 700$_{1v}$ that extends along the vertical strut 104. The cavity 700$_1$ also includes a horizontal portion 700$_{1h}$ that extends along the horizontal support strut 110. The cavity 700 may include a plurality of cavities similar to cavity 200 above, which similarities will not be re-summarized herein. The cavity 700 is sized to fit, for example, the battery pack 500. While the cavity 700$_1$ can be sized to fit the "T" shaped battery pack 500, it also could be designed to fit the box or cylinder structure associated with battery back 600. Alternatively, the solar canopy 700 could have another cavity 700$_2$ that was more of a cylindrical or box shape to accommodate the specific shape of a more cylindrical battery. The cavity 700$_2$ could be either vertical or horizontal in arrangement. Each support strut 104 and 110 could have multiple cavities depending on the size of the support strut. In at least one embodiment, the solar canopy would have multiple cavities 200 and 700.

Figure 7:
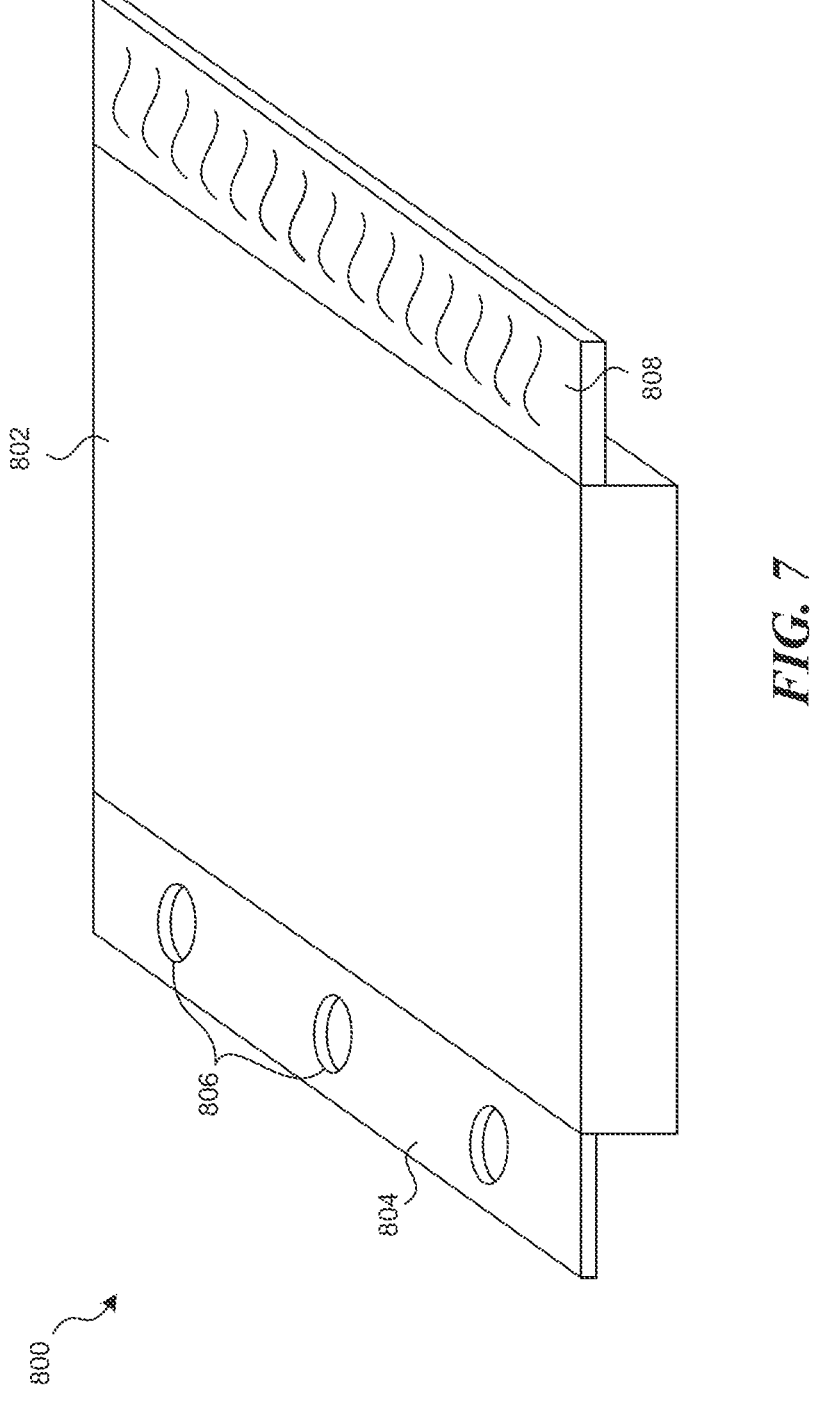
FIG. 7 is a perspective view of an exemplary compartment consistent with the technology of the present application.
Figure 8:
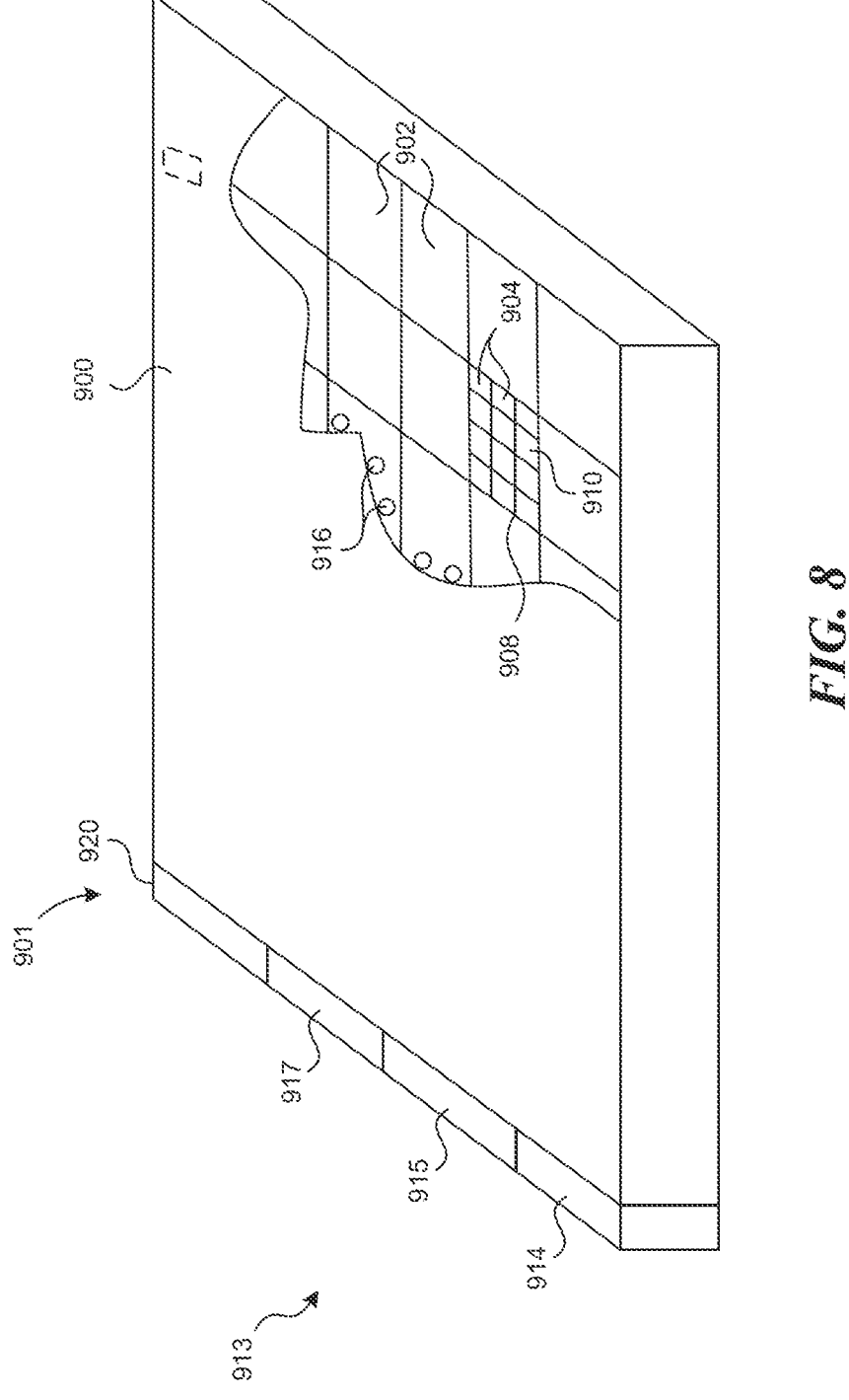
FIG. 8 is a perspective, partially cut-away view of a battery and battery housing consistent with the technology of the present application.

While FIG. 1 shows a solar canopy 100 specifically designed to incorporate the technology of the present application, existing solar canopies would need to be retrofitted with cavities specifically designed to hold/store high capacity batteries, a bank of batteries, one or more electric vehicle batteries, or the like. With reference now to FIG. 7, a retrofit compartment 800 is provided. As explained above, the retrofit compartment 800 is described with reference to incorporating the compartment into an existing solar canopy although the compartment 800 may be used in an original solar power canopy 100 construction as an alternative to a cavity in the roof structure as explained above. Retrofit compartment 800 comprises a cavity 802, which could be sized or shaped similar to any of the cavities 200 and 700 described above; although, cavity 802 is shown similar in size and shape to cavity 200 for ease of reference. Cavity 802, similar to cavity 200, may include multiple chambers or spaces sized to receive one or more high capacity batteries or battery banks. As mentioned above, the ceilings, floors, sidewalls, etc. may incorporate the fluid plates or cold plates for the heat dissipation system as described above or the forced air systems as described above. Retrofit compartment 800 also includes a means of connecting the retrofit compartment 800 to the solar canopy 100, either the roof 112 or the support strut 102. For example, the retrofit compartment 800 may include one or more extended flanges 804 that extend from one of the top, side, or bottom surfaces of the retrofit compartment 800, of which two are shown in FIG. 8. The flanges 804 may include bores 806 to accept bolts to allow the retrofit compartment 800 to be bolted to the solar canopy 100, which bores 806 are shown on one of the flanges 804. As shown on the other flange 804, a weld or adhesive material 808 may be applied to the flange 804 to adhere, weld, glue, etc. the retrofit compartment 800 to the solar canopy 100. With reference back to FIG. 11, if the canopy 100 is provided with a standalone inverter box 2 (also known as a power conditioner box) or a rack 3, the retrofit compartment 800 may be fit into a box that is connectable to either the standalone inverter box 2 or rack 3 rather than the roof 112 or support structure 102. In certain embodiments, the roof of the canopy may be provided with a pivot 201 connection to the compartment 800 (such as an axle or the like). The compartment 800 can be operatively connected to the canopy as shown in FIG. 2A with movement of the compartment 800 in a direction shown by arrow 1 until the pivot 201 provides a rotatable or pivotal connection along an axis A. The compartment 800 would be rotated in a direction shown by arrow 2 until the compartment 800 is latched at the end opposite the pivot 201. Any conventional latch would be appropriate, but not specifically shown herein.

With reference to 39, rather than bolts to couple the solar canopy 100 and the compartment 800, a plurality of clamps 3900 may be provided. The clamps 3900 may be pivotally coupled to, for example, the support beams, struts, or the like as described throughout the present application, using a hinged connection or the like. The clamp 3900 has a support arm 3902 an a pair of protruding clamp arms 3904. The pair of protruding clamp arms 3904 are separated by approximately the associated dimension of the compartment 800 (or other compartments as explained throughout the present application). The clamp arms 3904 may be coated with a rubber or the like to frictionally engage the compartment 800 or the like. The compartment 800 would be lofted to the appropriate position (possibly with a fork lift) and the clamps 3900 would be pivoted until the clamp arms 3904 coupled to the compartment 800 to secure the compartment. When deployed, the support arm 3902 may be generally perpendicular to the ground or the roof of the canopy.

Figure 13:
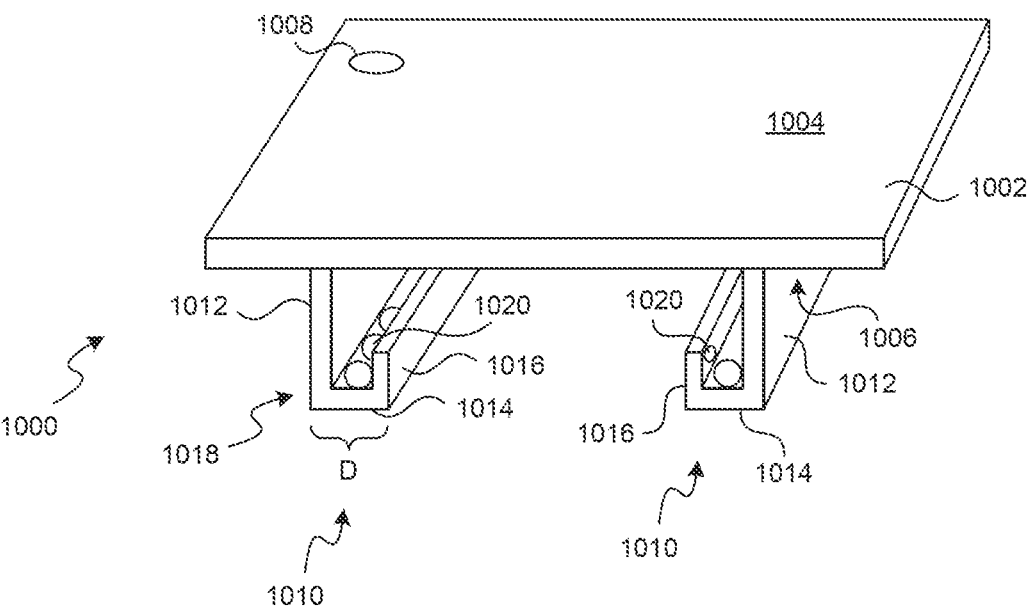
FIG. 13 is a perspective view of a rail system for allowing a retrofit compartment to be removably coupled to the solar canopy consistent with the technology of the present application.

Another possible retrofit or original construction may include a rail system 1000 to allow modular insertion of the retrofit compartment 800 as shown in FIG. 13. As can be appreciated, the modular retrofit compartment 800 may be used for canopies specifically designed for the retrofit compartment but retrofit compartment 800 is not added until subsequent to actual deployment. In still other embodiments, the retrofit compartment 800 may be included with the rail system 1000 prior to the original or actual deployment of the canopy 100. The rail system 1000 comprises another possible means of attaching the retrofit compartment 800 to the canopy 100. The rail system 1000 may include a carrier plate 1002 or the like having a top side 1004 and a bottom side 1006 opposite the top side 1004. The designations of top and bottom are for orientation of the device and should not be considered limiting. The carrier plate 1002 may be arranged such that the top side 1004 is attachable to the roof 112 of the canopy 100 (not shown in FIG. 13 for clarity). The carrier plate 1002 may have a plurality of bores 1008 to allow the carrier plate to be bolted to the roof 112. Alternatively, the carrier plate 1002 may be welded to the roof 112. Also, in certain embodiments, the carrier plate 1002 may not be necessary as the below described parts of the rail system 1000 may be attached directly to roof 112.

A pair of rails 1010 are attached to or integral with the bottom side 1006 of the carrier plate 1002. The rail 1010 has a first wall 1012 extending generally perpendicular to the bottom side 1006 of the carrier plate 1002, a second wall 1014 extending generally perpendicular to the bottom side 1006 of carrier plate 1002, and a third wall 1016 extending generally parallel to first surface 1012 displaced by a distance D to form a channel 1018. The second wall 1014 may alternatively be called a bottom of the channel 1018 herein. The channel 1018 may contain rollers 1020, which are shown on the bottom of channel 1018, but could also be in the walls 1012 or 1016. The rollers 1020 may be bearings or the like. The rollers 1020 may be optional if the surfaces of the rail 1010 are sufficiently lubricious to allow sliding movement of the retrofit compartment. With reference back to FIG. 7, retrofit compartment 800 has flanged surfaces 804. The flanged surface 804 would be shaped to operatively fit in channel 1018 in a tongue and groove configuration to allow the retrofit compartment 800 to slide into the rail system 1000. Notice while one exemplary rail system 1000 and fanged surface 804 is shown, other shapes or configurations for similar rail systems are possible. Additionally, the flanged surface 804 in certain embodiments may have rollers 1020 rather than or in combination with the channel 1018.

Figures 21, 22, 23:
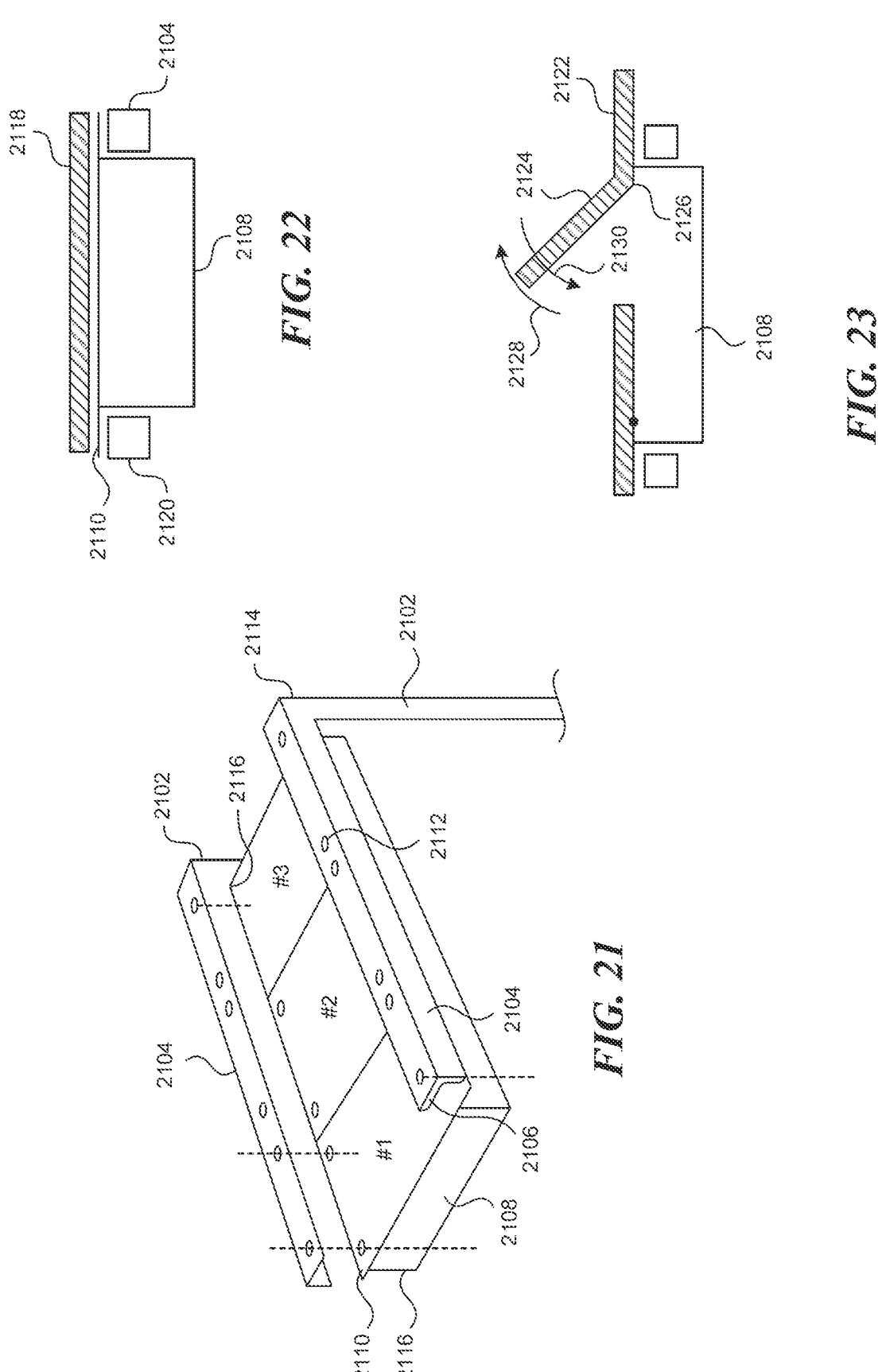
FIG. 21 is a perspective view of an exemplary use of the solar canopy of FIGS. 1 and 1A.
FIG. 22 is a side elevation view of mounting a battery compartment consistent with the technology of the present application.
FIG. 23 is a side elevation view of a battery compartment to hold electronics consistent with the technology of the present application.

FIG. 21 shows alternative rail mounting systems 2100. Portions of the solar canopy are not shown in FIG. 21 for convenience. The rail mounting system 2100 includes one or more vertical struts 2102 and at least two horizontal struts 2104 although more or less horizontal struts are possible depending on the weight of the compartment 2108 and other design factors. The horizontal struts 2104, or mounting rails, may support the solar panels 2118 as shown in the side elevation of FIG. 22. The horizontal struts 2104 have a flanged rail 2106. The retrofit compartments 2108 have flanged supports 2110. The flanged supports 2110 may be bolted to the flanged rail 2106 via corresponding bolt bores 2112, which is similar to the coupling of compartment 800 described above. As shown, three retrofit compartments 2108 are shown attached to two horizontal struts 2104 with flanged rails 2106. Alternatively to having horizontal struts, the vertical struts 2104 could have flanged rails 2106 at a top of the posts 2114 forming posts at each corner 2116 of a retrofit compartment 2108 such that the flanged supports 2110 are attached to flanged rails 2106 on the vertical struts 2102. As shown in FIG. 22, the solar panels 2118 are mounted supported by the horizontal struts 2104. The horizontal struts 2104 do not have a flanged rail but rather form a beam with a top side 2120. The retrofit compartment 2108 has flanged supports 2110 that extend over the top side 2120 such that the top side 2120 acts as the flanged rail 2106 such that the flanged support 2110 can be bolted or coupled to the horizontal struts 2104. As can be appreciated, the retrofit compartment 2108 may be an enclosed compartment to protect the electronics from the elements or the like. To access the retrofit compartment 2108 while installed, the roof 2122 of the retrofit compartment 2108 may have one or more doors 2124 that are connected to the roof 2122 via a hinge 2126 to allow the one or more doors to rotate open (as shown by the directional arrow 2128) or closed (as shown by the directional arrow 2130). The solar panels 2118 may be removable or coupled to the doors 2124 to allow access to the internals of the retrofit compartment 2108 while mounted to a canopy. Bolting the retrofit compartment 2108 to the rails allows for unbolting and moving of retrofit compartments from one solar canopy to another as required.

Figure 24:
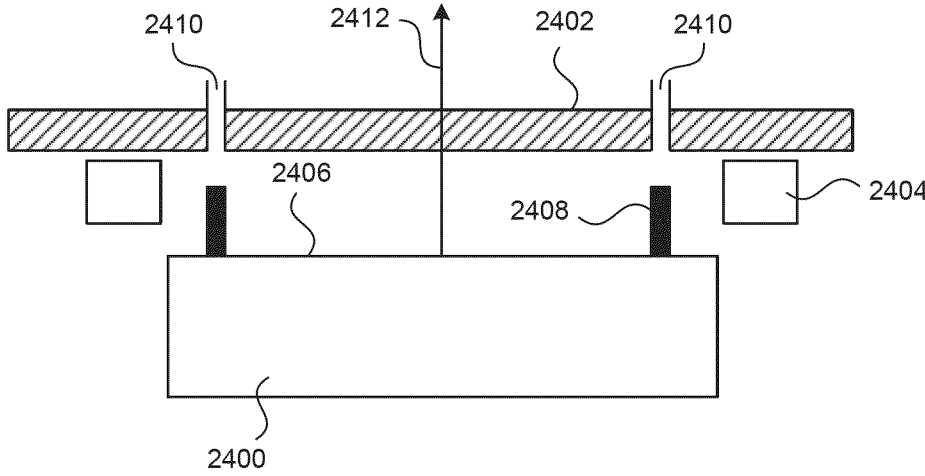
FIGS. 24 and 25 are side elevation views of a mechanism to mount a battery compartment to a solar canopy consistent with the technology of the present application.
Figure 25:
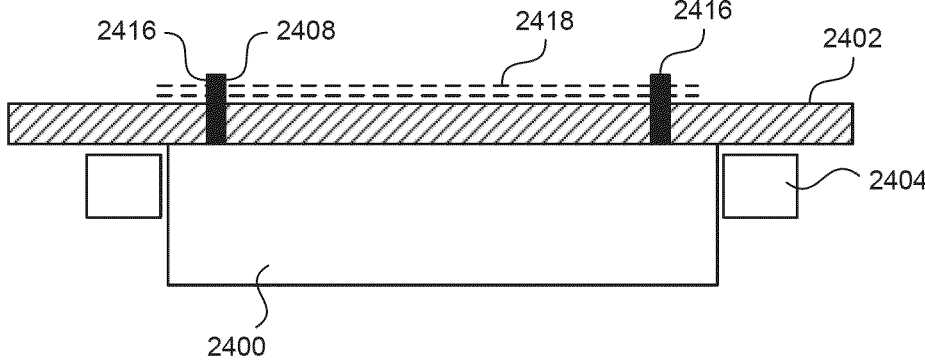

FIGS. 24 and 25 show an alternative mounting configuration for a retrofit compartment 2400. In this configuration, the solar canopy may have a roof 2402 to which the solar panels (not shown) are mounted. The roof 2402 may be supported by one or more beams 2404, such as I beams or the like. The retrofit compartment top panel 2406 may have threaded protrusions 2408 that extend through bores 2410 in the roof 2402 when the retrofit compartment 2400 is moved into place as shown by directional arrow 2412. Nuts, not specifically shown, would be threaded onto the threaded protrusions 2408 to fasten the retrofit compartment 2400 to the roof 2402 of the solar canopy. Alternatively, to the threaded protrusions 2408, the protrusions 2408 may be solid pins or stakes with a bore 2416. A rod 2418, or a pair of pins rather than a rod, may be lock in the bore to hold the retrofit compartment 2400 in place.

Figure 26:
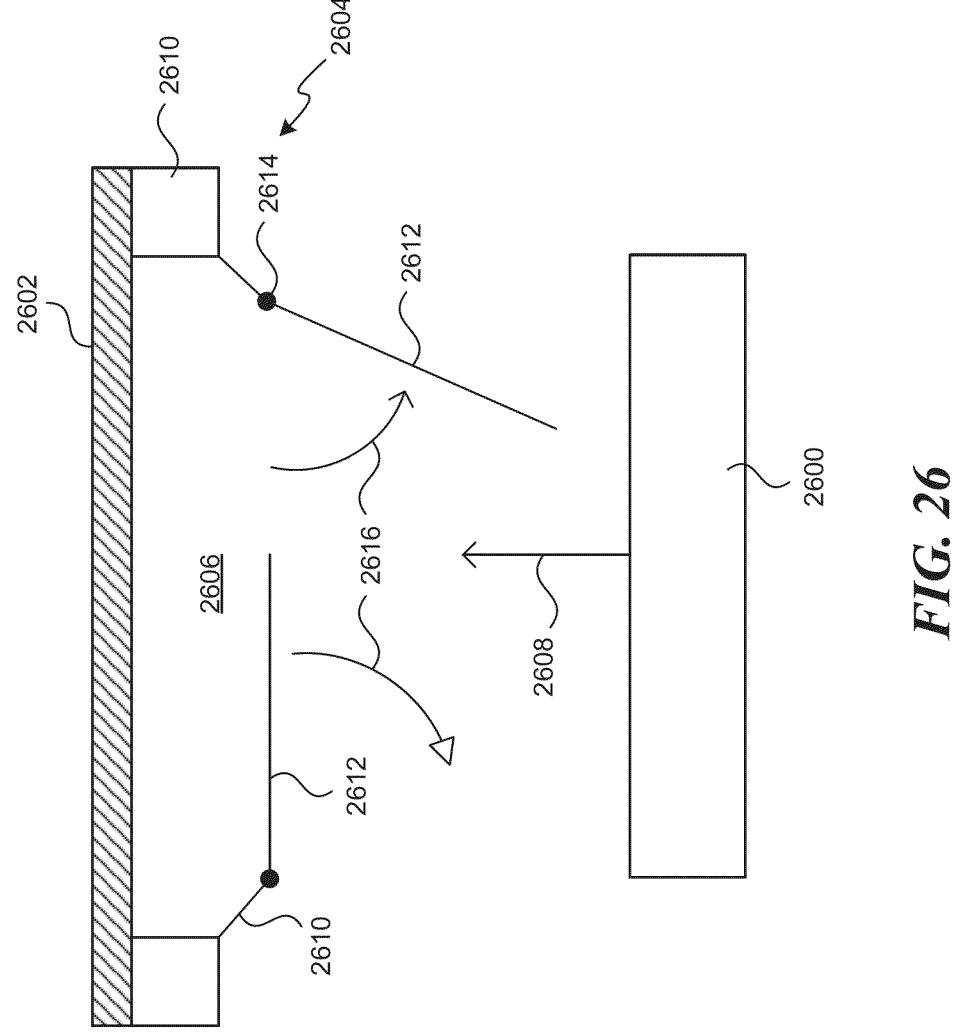
FIG. 26 is another side elevation view of a mechanism to mount a battery compartment to a solar canopy consistent with the technology of the present application.

FIG. 26 shows still another means for fastening the retrofit compartment 2600 to a solar canopy, only a portion of which is shown in FIG. 26. The solar canopy comprises a roof 2602 that includes or forms part of a sleeve or container 2604 defining a space 2606 into which the retrofit compartment 2600 may be placed, as shown by directional arrow 2608.

The sleeve comprises struts 2610 defining sidewalls depending from the roof 2602 (or an upper surface if not the roof). The base 2610 is formed by a sheet, such as steel or concrete. The base 2610 has one or more doors 2612 pivotally connected to the base 2610 by one or more hinge 2614, such as a conventional door or piano hinge, to allow the doors 2612 to be opened as shown by directional arrows 2616. While shown as a bottom loaded space 2606, the doors 2612 could be formed in the roof 2602 rather than the base 2610.

To facilitate the modular design, and the retrofitting of existing canopies that may not have roof structures designed for the weight of a battery compartment, other means for supporting the compartments may be provided such as, for example, the exemplary support system shown in FIG. 37A-C. For simplicity, FIGS. 37A and 37B show a solar canopy 3700 with a roof 3702 having solar panels 3704 mounted thereon. The roof 3702 in this exemplary embodiment is supported by at least two vertical legs 3706, which may be connected to a concrete foundation or buried as required. Each of the vertical legs 3706 incorporate, or are modified to have, a plurality of bolt holes 3708 extending therethrough, although the bolt holes 3708 could be blind holes. A pair of flanged connectors 3710 having corresponding bolt bores 3712 in a flanged surface 3714, which is shaped to operatively join the vertical legs 3706, that align with bolt holes 3708 are provided. Bolts and nuts couple the flanged connectors 3710 to the vertical legs 3706. The flanged connectors have one or more protrusions 3716 extending from the flanged surface 3714 forming a shelf or arm on which a battery compartment 3718 or energy storage system may rest. The protrusions 3716 may have bolt holes or bores to stabilize the battery compartment 3718. As an alternative to bolt holes 3708 and bolt bores 3713, the flanged connectors 3710 may include a clamp that encircles the vertical leg 3706 to hold the flanged connectors 3710 in place.

With reference to FIG. 37C, it should be appreciated that certain solar canopies may have vertical legs that are separated by a distance much greater than a dimension of the battery compartment 3718. A roof connector 3720 may be provided to work cooperatively with a single flanged connector 3710 or multiple flanged connectors 3710 as shown. The roof connector has a flanged surface 3722 from which a support column 3724 extends. The flanged surface 3722 may comprise a plurality of bolt bores 3712 to align with bolt holes 3708 in the roof 3702 of the solar canopy 3700. The support column 3724 may have a flare 3726 to a radial protrusion 3728 (or one or more arm like protrusions 3728) forming a shelf or ledge on which the battery compartment 3718 may be held. FIG. 37C shows a pair of battery compartments 3718 held with a pair of flanged connectors 3710 and a single roof connector 3720. More or less battery compartments 3718 may be held between vertical legs 3706. Moreover, a battery compartment 3718 may be held by two or more roof connectors 3720 in certain embodiments contemplated herein.

FIG. 38 shows a solar power canopy 3800, which is similar to the solar power canopy 3700 shown in FIGS. 37A-C. Solar power canopy 3800 includes a roof 3802 having solar panels 3804 mounted thereon. The roof 3802 in this exemplary embodiment is supported by at least two vertical legs 3806, which may be connected to a concrete foundation or buried as required. Each of the vertical legs 3806 incorporate, or are modified to have, at least one bolt hole 3808 extending therethrough, although the bolt hole 3808 could be a blind hole. A support beam 3810, such as a truss as shown in the exemplary embodiment, has protrusions 3812 that extend into the bolt holes 3808 on adjacent vertical legs 3806. The protrusions 3812 may have threaded ends to receive a nut (not shown) to secure the support beam 3810. Battery compartments 3814 can be coupled to the support beam 3810 as shown to hang from the support beam 3810. Alternatively, the support beam 3810 can be used as a floor on which the battery compartments 3814 can rest.

Figure 27:
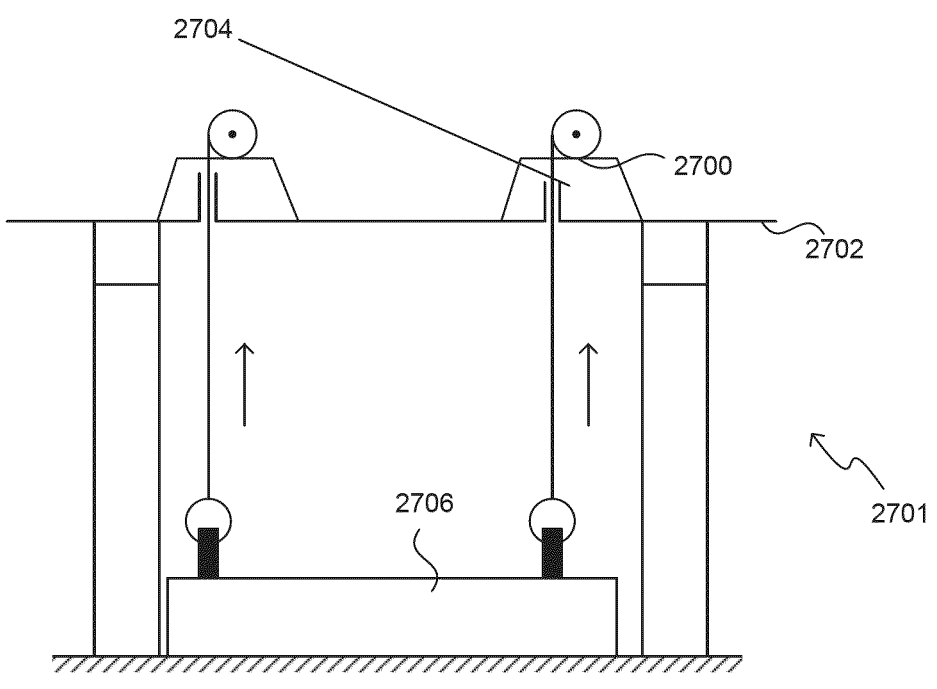
FIG. 27 is a side elevation of a solar canopy with a winch system to facilitate mounting the battery compartment to the solar canopy consistent with the technology of the present application.

As can be appreciated, the retrofit compartments outlined above, and hereinbelow, may comprise a significant weight as they may contain all the hardware and electronics necessary for the functioning of the solar canopy. Thus, in one embodiment of the technology of the present application, a winch 2700 may be provided as shown in FIG. 27. The winch 2700, which may be permanently fixed to the solar canopy in a preferred embodiment or portable, is fastened to the roof 2702 of the solar canopy 2701. The winch 2700 may comprise a series of pulleys and motors as required. A cable 2704 extends from the winch 2700 to the retrofit compartment 2706. The winch 2700 is operable to lift the retrofit compartment 2706 until it can be coupled to the roof 2702 by any of the means described herein.

Figure 9:
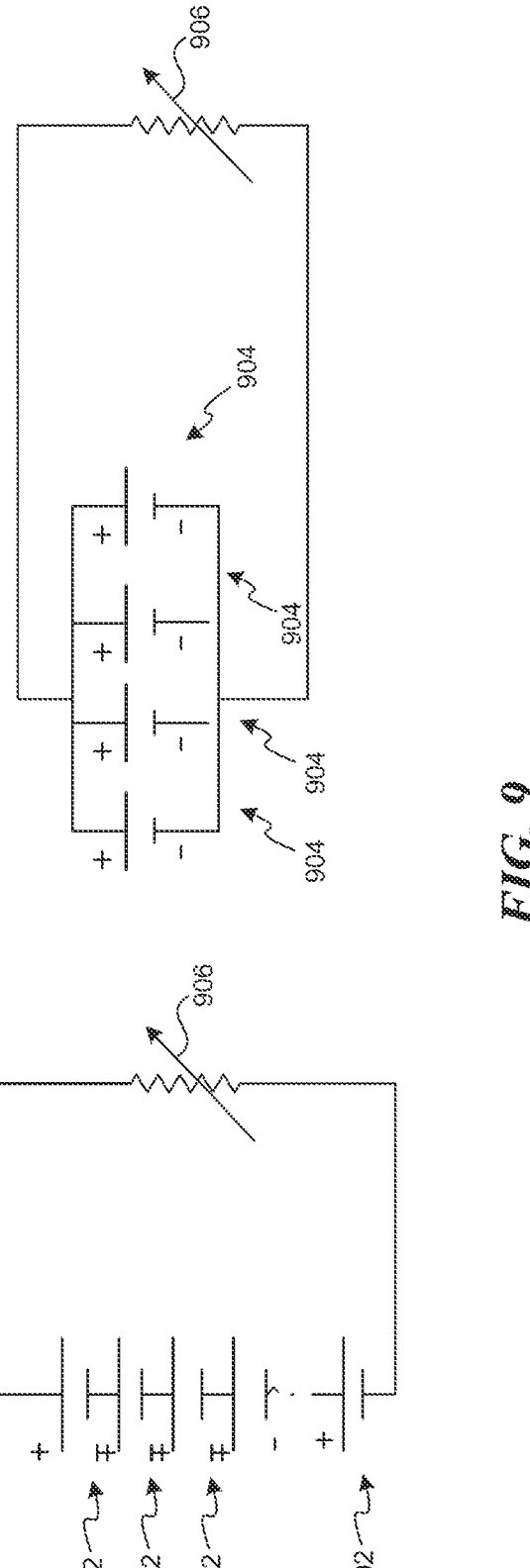
FIG. 9 is an electrical schematic of the small units, and individual cells or batteries consistent with application of the electrical vehicle batteries used with the technology of the present application.

The batteries 300, 400, 500, and 600 are contemplated to be end of life large capacity batteries such as are used in the propulsion systems of electric vehicles, as outlined above. While it is contemplated that end of life large capacity batteries from electric vehicles will generally be used with the technology of the present application, other high capacity batteries also are contemplated such as, for example, new batteries, refurbished batteries, or specially designed batteries. Alternatively, a series of batteries may be provided into a battery bank. These high capacity batteries 901 are housed in a housing, such as housing 900 shown in FIG. 8, but generally comprise a number of smaller units. The high capacity batteries, such as battery 300 for example, are generally comprised of a number of smaller units 902. For example, the high capacity battery 300 may comprise 50 to 100 smaller units 902 connected in series to produce a high volt and amperage battery as each of the units 902 add to the overall charge output. Each of the smaller units 902 are themselves comprised of a number of individual cell batteries 904, typically connected in parallel. With reference to FIG. 9, the battery 901 may be represented electrically as a number of smaller battery units 902 in series, which add up to a total voltage output of between about 250 volts to about 400 volts depending on the electric vehicle manufacturer. The battery drives the car or load 906, which is variable depending on many conditions of the operating car. As mentioned earlier, each small unit 902 comprises a number of individual cells or batteries 904 typically arranged in parallel. With reference, for example, to the Tesla battery for the original Roadster, 69 cells or individual batteries 904 are connected in parallel to make one small unit 902, or brick as referred to by Tesla. The Roadster battery further comprises 99 bricks or small units 902 connected in series for a total of 6,831 cells to make the entire battery.

Figure 14:
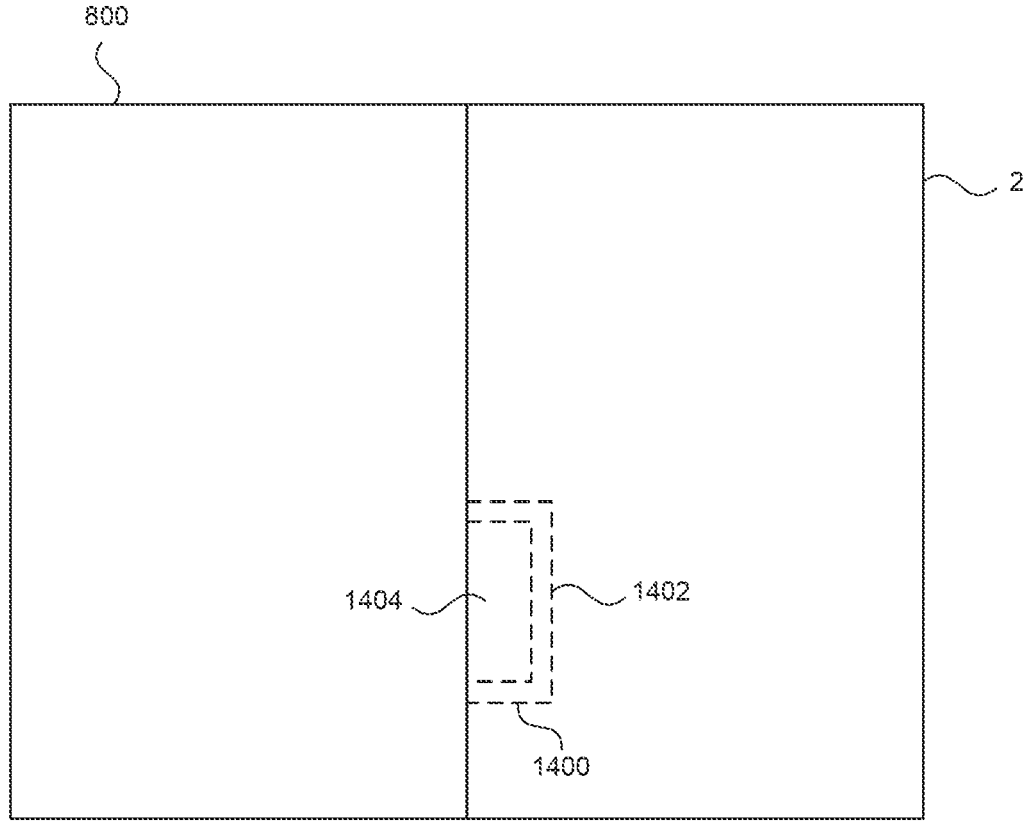
FIG. 14 is a view of an interface between a retrofit compartment and a portion of the solar canopy consistent with the technology of the present application.

In the case of the canopy 100 where a retrofit compartment 800 is used to add the high capacity battery storage or energy storage system, the retrofit compartment 800 may be designed with the cavity 802 shaped to fit the battery being stored. For example, the cavity 802 would have a T-shape to store the battery pack 500 described above. The cavity 802 would have other shapes operative to store and electrically connect the appropriate battery shape to the power conditioner 116 as described above. In other words, the retrofit compartment 800 would have a generic interface connection electrically to the solar panels or power conditioner but internally in the cavity or chamber, the generic interface connection would route to the electric vehicle battery contacts. Also, as mentioned above, the retrofit compartment 800 may be sized and shaped to interconnect with the standalone inverter box 2 or rack 3. For example, with reference to FIG. 14, a standalone inverter box 2 is shown. A retrofit compartment 800 is joined to the standalone inverter box 2 at junction 1400. The junction 1400 comprises an electrical mating of the electronics in the retrofit compartment 800 (e.g., from the battery to the junction 1400) and the electronics in the standalone inverter box 2 to the junction 1400 (e.g., from the power conditioner 116 (which includes an inverter). As shown the junction 1400 includes a male protrusion, female socket arrangement where the female socket 1402 shown in the standalone inverter box 2 may have pins or contacts that couple with the pins or contacts of the male protrusion 1404 extending from the retrofit compartment 800. While shown as connected to a standalone inverter box 2, the retrofit compartment 800 could similarly electrically and mechanically mate to the rack 3.

As can be appreciated, at the end of a useful life, the individual cells or batteries 904 begin to fail. Because they are arranged in parallel, the charge of the smaller unit 902 in which the failing battery 904 is situated will be substantially degraded. For example, smaller unit 908 contains failing individual cell or battery 910. The individual cell or battery 910 may, for example, fail to 0%, but in the normal case will fail to some reduced level of voltage capacity, such as, for example, 20% full capacity charge. If the individual cells or batteries 904 had a full voltage capacity (e.g., at 100% capacity) of 4 volts, for example, at 20% capacity, the individual cell or battery 910 would have a voltage capacity of 0.8 volts. Thus, the smaller unit 902 is limited to its capacity to the maximum capacity of the most compromised individual cell or battery. Assuming all the other individual cells or batteries 904 are at 100% efficiency, which is unlikely, the overall voltage of the battery 901 would be reduced 3.2 volts because of the single damaged or compromised individual cell. Generally, many of the individual cells or batteries 904 are in various states of degradation. Thus, the overall capacity of the battery 901 varies over time. Generally, it is believed that the overall efficiency of the battery 901 will reduce, on average, to 85% over approximately 5 to 10 years of use. While the overall capacity of the battery 901 may be approximately 85%, that 85% capacity may include some individual cells or batteries 904 being at or close to 0% capacity, rendering the smaller unit 902 to essentially 0% capacity while others will remain at a higher capacity, potentially around 95 to 100% capacity. Generally, charge and discharge of li-ion batteries is regulated using a battery management system of some type to control the maximum charge and discharge of series units in particular. For example, if you have seven four-volt units in series, the total charge on the series of units is 28 volts. However, if you charge the series of units to 28 volts when one of the units is underperforming, the units become unbalanced and, instead of each having four volts, one unit may have 2 volts and another 6 volts, which is damaging to the li-ion battery. Similarly, when discharging the series of units, a battery management system prevents any one unit from over discharging. For example, if the above 7 units in series discharged in a balanced manner to 21 volts, each of the units would have about 3 volts. However, in an unbalanced discharge, one of the units may over discharge, which can damage the chemical compositions of the battery. Thus, a battery management system is implemented for each battery. The battery management system may be associated with the housing of the particular battery or incorporated into the power conditioner instead of being a standalone unit. The batteries shown above, 300, 400, 500, and 600 each have battery management systems incorporated into the systems, which systems may be leveraged herein or replaced.

In one aspect of the technology of the present application, end of life batteries 901 may be refurbished to replace deficient smaller units 902 or individual cells or batteries 904. For example, the housing 900 may be opened and each of the individual smaller units 902 may be tested for capacity and retained or replaced as required. Alternatively, the original housing 900, such as for example, the original housing for batteries 300, 400, 500, and 600 may be discarded in favor of a new or alternative housing 900. The housing 900 may include a battery management unit 912. The battery management unit 912 may include, among other things, a coolant system 913. The coolant system 913, in one aspect, may include a liquid coolant system and comprise one or more of a pump 914 or motive force, a heat exchanger 915, a fan 917, a compressor (not shown), a sump, and a plurality of tubes 916 carrying coolant throughout the housing. A plurality of temperature sensors 918 strategically placed in the housing 900 may provide temperature information to processor 920 that controls the pump, the fan, and/or the compressor to regulate the temperature of the housing 900. In one exemplary embodiment, the pump 914 controls a speed amount of coolant flowing through the system. The fan 917 may change airflow both through the housing 900 and across the heat exchanger 915.

Figure 28:
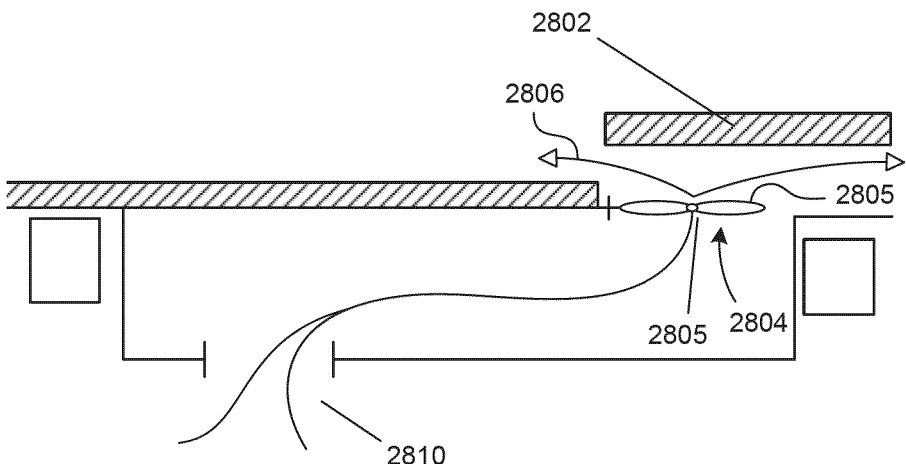
FIG. 28 is a side elevation of a heat dissipation system consistent with the technology of the present application.

As mentioned above, the cavities 200 and 700 have further cooling mechanisms such as fans and vents to facilitate airflow over and around the housing 900, but the solar canopies 100 may further include liquid coolant systems similar to those described in the above. Also, the power conditioner 116 or the battery connector 210 also may receive information from temperature sensors in the cavities to facilitate electrical disconnection of the battery or cells to avoid an exothermic reaction. FIG. 28 shows one exemplary configuration for a cooling system. The solar canopy 2800 may have a roof panel (or solar panel) 2802 that has a fan bank 2804 with one or more fans 2805. The roof panel 2802 provides one or more exhaust ports 2806. The retrofit compartment 2808 may further comprise one or more intakes 2810, which may be slots, bores, perforations or the like. The intake 2810 may include a screen or filter to inhibit debris from entering the retrofit compartment. The fan or fans 2804 may be powered by the battery unit and power conditioner in the retrofit compartment 2808.

One of the batteries described herein, such as, for example, battery 300, 400, 500, 600, or 901 may be mechanically coupled to the solar canopy in one or more chambers 200 or 700 as described above. The battery may be electrically coupled to the solar panels 114. The electrical charge generated by the solar panels 114 may be fed directly to the batteries or, in the alternative, the battery or batteries may be electrically coupled to the power conditioner 116, which is electrically coupled to the solar panels 114. The power conditioner 116 may further be coupled to the power grid as is generally understood in the art. During operation of the solar canopy 100, the power conditioner 116 may be used to regulate the charge and discharge of the battery to maintain a constant power supply to the public power grid. For example, during daylight hours when the solar panels 114 produce the highest amount of energy, the power conditioner 116 may split the energy to provide a first constant energy output to the power grid and use the remainder to charge the large capacity batteries outlined above. During periods with less direct sunlight, the power conditioner 116 may switch off the charging of the battery and supply the energy produced by the solar canopies only to the power grid. When even less energy is produced by the solar canopies, the power conditioner 116 may switch to providing energy from the power grid directly from the solar panels and the allow a discharge from the battery to ensure a constant power output to the power grid. If the solar panels are producing no energy, the power conditioner 116 may provide the predetermined power output completely from the electric battery. In still other embodiments, the power conditioner 116 provides all the output of the solar panels 114 to charge the electric battery (or batteries) when the solar panels output any energy. The power conditioner 116 further provides a constant output or discharge from the battery (or batteries) to eliminate any potential fluctuation in power due to the irregular output of the solar panels. In this option, typically the battery or batteries would be in a constant state of charge and discharge.

From review of the above, one of ordinary skill in the art will now recognize that the energy storage systems (ESSs) described in the present application may weight a significant amount. The weight includes the high capacity battery, power conditioner electronics, and potentially other equipment and external units in some embodiments, but also the heat dissipation systems in other embodiments and the liquid required for the coolant. Thus, as shown in FIG. 40, the canopies may be designed with or provided with fluidic or mechanical lift equipment. In one exemplary embodiment, hydraulic or pneumatic lifts 4000 or hydraulic/pneumatic cylinders may be provide. The lifts 4000 include vertical stanchions 4002 and movable piston members 4004 connected by a floor 4006. The battery compartment 4008 may be mounted on the floor 4006 and hoisted into position by the lift 4000.

Figure 32:
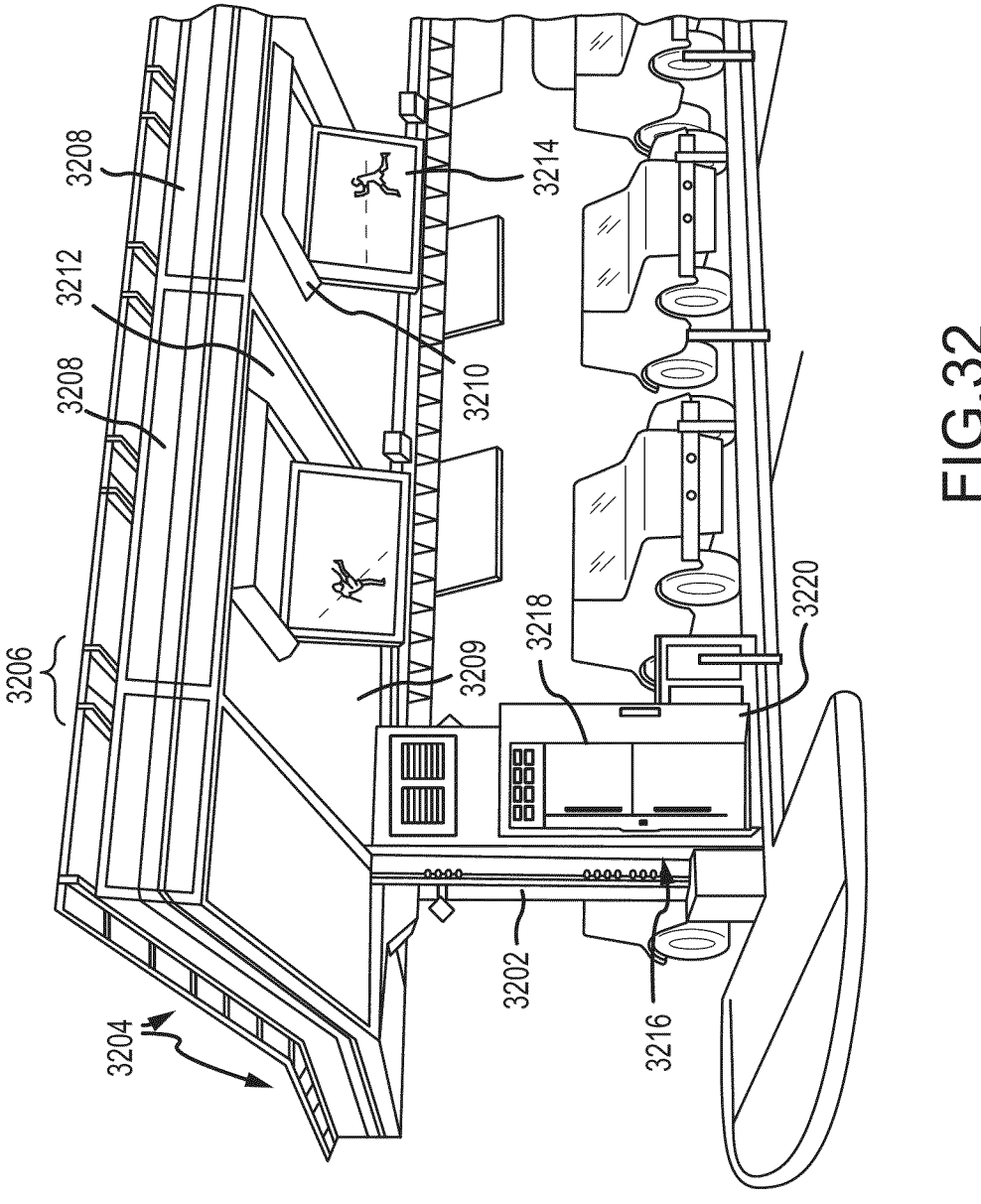
FIG. 32 is a perspective view of a potential use of a solar canopy consistent with the technology of the present application.

While generally described as an energy storage device, sometime potentially referred to as "Storage as a Service", that is particularly useful for emergency conditions, the technology of the present application is not limited to emergency conditions. Rather, the technology may be useful in many everyday environments. FIG. 32 shows one particularly useful application of the technology of the present application for sporting events. In particular, the solar canopy 3200 is shown with a central vertical support 3202 coupled to a pair of horizontal supports 3204 angled slightly upward to form an inverted "V" structure (although any solar canopy shape is usable). The horizontal supports 3204 support the solar panels 3206. The solar canopy 3200 is loaded with a plurality of retrofit compartments 3208 in this particular embodiment. The retrofit compartments 3208 have a base 3209 with a depending sidewall 3210 forming a cavity or recess 3212. In this particular embodiment, the recess 3212 is sized to fit a monitor 3214 or other display device, such as, for example, a high definition monitor or 3-D screen to name but two potential monitors. The monitor 3214 is pivotally connected to one or more of the depending sidewalls 3210 to allow the monitor 3214 to have a stowage position and a viewing position as shown. Further, as shown in FIG. 32, the central vertical support 3202 may be enlarged as shown in the figure. The enlarged vertical support 3202 may allow for the inclusion of the extendable antenna 1800. Additionally, other useful or convenience items may be located in a bin 3216, such as a refrigerator 3218. The bin 3216 may otherwise hold common items for the function being supported, similar to a household pantry or the like. The bin 3216 may have one or more doors 3220 that may be lockable. The solar canopy may further include vending machines 3222 or the like as well as is desired by the end users.

Other uses for the technology include, among other things having the external unit be an electric vehicle charger to allow for high capacity charging of electric vehicle batteries. This may be particularly useful in remote locations where access to national or State power grid is not available. The solar panels and high capacity batteries ensure the electric vehicle charger station would always have sufficient stored energy or available energy to charge an electric vehicle battery. Yet another use is for computing power, such as, for example, cryptocurrency mining computational power. Servers mining cryptocurrency, or solving the equations, use a tremendous amount of energy, but the servers may be intermediately turned off as needed. Thus, powering servers using the solar canopy renewable energy and/or stored energy allows for powering the servers to solve equations when power is available. For those solar canopies with connections to a national or State power grid, the servers could also be shut off when the national or State power grids are at peak or exceeded power demands such that additional power can be provide to the grid. The solar canopies also are uniquely suited to solve cryptocurrency equations for those currencies that require "GREEN" energy sources.

Another use for the Energy Storage Canopy is described with reference now to FIG. 41, an energy storage canopy 5100 is provided in a parking lot as evidenced by the parking strips. The energy storage canopy 5100 may be considered a renewable energy storage canopy 5100 or a solar canopy 5100 with energy storage as will be explained further below. While shown in a parking lot, the energy storage canopy 5100 may be erected in many diverse locations. The energy storage canopy 5100, as shown, is a conventional T or Y shape formed by a central vertical support 5102 and horizontal supports 5104 extending in opposite directions from the central vertical support 5102. The T or Y shape is formed depending on whether the horizontal supports 5104 are flat or angulated. In some embodiments, the energy storage canopy 5100 may have a cantilever or L shape. In these instances, the horizontal support typically extends in only one direction. In other embodiments, the central vertical support 5102 may be side supports such that the profile of the solar canopy is more of a box or rectangular shape.

The energy storage canopy 5100 may be operatively coupled to the power grid and to a local building, such as a commercial building or residence. Often these buildings have limited space. The local buildings often are loath to provide real estate that could be used for other conventional business operations for equipment to offset energy needs. Thus, the energy storage canopy 5100 provides a unique solution in that the equipment can be located in a superstructure separate from the local building that at the same time has a limited footprint impact on the business's real estate. The energy storage canopy 5100, as provided in FIG. 41, provides a location above already assigned parking to house the equipment to be described herein, which minimizes the impact of the equipment on the business's real estate.

The energy storage canopy 5100 further includes a roof 5106, which is shown as generally supported by horizontal supports 5104. The roof 5106 may have perimeter support beams 5108. As shown, the energy storage canopy 5100 provides for a solar array 5110 of solar panels 5112 over the roof 5106. Thus, energy storage canopy 5100 may be referred to as a solar canopy 5100 in view of the use of the solar array 5110. The solar array 5110 may be combined with a wind turbine system 5200, as shown in FIG. 42. The wind turbine system 5200 shown is considered a micro-wind turbine and generally has a vertical support 5202, such as the vertical pole shown. A wind turbine 5204 is coupled to the top end 5206 of the vertical support 5202. A plurality of blades 5208 are coupled to a rotor of the wind turbine 5204. The wind turbine may have a directional vane 5210 to facilitate the optimal positioning of the blades 5208. The vertical support 5202, in certain embodiments, may have guy wires 5212 to facilitate support. In some embodiments, the central pole 5202 may be replaced by a more substantial derrick as is generally known. In certain embodiments, the wind turbine system 5200 may replace the solar array 5110. In certain embodiments, the wind turbine system 5200 may be storable such that the vertical support 5202 can retract and expand to allow deployment of the wind turbine system 5200. As multiple renewable energy sources are possible, the energy storage canopy 5100 may be referred to as a renewable energy storage canopy 5100. If only a wind turbine system 5200 is used, the energy storage canopy 100 may be referred to as a wind turbine canopy 5100.

With reference back to FIG. 41, a portion of the solar array 5110 has been removed to show portions of the energy storage canopy 5100 below the solar array 5110. As can be seen, the roof 5106 comprises a plurality of weight bearing members 5120, which are shown as longitudinally extending beams in the figure, but could be transversely extending beams, a combination thereof, or other arrangement of beams. The weight bearing members 5120 may be, for example, one or more I beams or the like. The weight bearing members 5120 support a plurality of compartments 5122. The compartments 5122, which may be removable or integral with the solar canopy 5100, contain equipment as will elsewhere explained herein. The equipment includes structure to store energy, whether electrical energy or refrigerant energy as will be explained. The stored energy is released or used during on-peak energy time to reduce the drain on power systems such as grid or local power, which also has the benefit of reducing costs.

FIG. 41 also shows an interior 5124 of some of the plurality of compartments 5122. The interior 5124 may include, among other things, connectors 5126, conductors 5128 (such as bus bars or the like), high capacity storage batteries 5130, power conditioning systems 5132, and a DC/AC inverter 5134, which transforms the DC power of the renewable source, such as the solar array 5110, or the high capacity storage batteries 5130 into AC for the grid. The DC/AC inverter 5134 also converts AC to DC when (and if) grid power is used to charge the high capacity storage batteries 5130. In certain embodiments, it may be beneficial to charge the high capacity storage batteries 5130 using the power grid during off-peak demand times to provide more fully charged batteries 5130 available for use during on-peak demand times. One or more of the compartments 5122 may further include a switchgear 5136 coupling the solar array 5110 and high capacity storage batteries 5130 to the power grid. The connection to the power grid may be contained in the compartments 5122 or otherwise coupled to energy storage canopy 5100 through an electrical distribution panel 5138. High capacity storage battery 5130 means, for the purposes of the present application, the batteries can store a minimum of 10 kWh of energy, but typically include upwards of 100 kWh to about 150 kWh or more.

As can be appreciated, the high capacity batteries may be similar to batteries associated with electric cars such as, for example, a Tesla car battery, a Toyota Prius car battery, a Chevrolet Volt car battery, a Nissan Leaf, a combination thereof, or the like. Each of these batteries are typically formed by a number of battery pods coupled in parallel wherein each of the battery pods includes a number of battery cells coupled in series. Each of the battery pods typically has an individual capacity of between about 2 to 10 kWh. Each of the battery pods and or battery cells may include electronics to allow for swapping or isolation of damaged components. The electronics may include, for example, DC/DC converts or transformers and switches.

FIG. 43 shows a schematic of the electrical connection between a plurality of high capacity storage batteries 5130, some stacked in series and some stacked parallel, which results in a battery bank 5300. The battery bank 5300 may be coupled to a power conditioner 5302. The power conditioner 5302 includes, among other things, power conversion system 5304 and a DC/AC inverter 5306 (or transformer 5306). While only one (1) power conditioner 5302 is shown, the compartments 5122 may include multiple power conditioners 5304, which would include multiple power conversion systems 5304 and multiple DC/AC inverters 5306. While not specifically shown in FIG. 43, the power conditioner 5302 includes one or more switchgears operatively coupling the battery bank 5300 to the external load, which may include a power grid or other external loads. Power conditioners 5302 also may be used to couple the electrical output of the solar array 5110 to the grid or external load or both. Power conditioners 5302 still also may be used to couple the electrical output of the solar array 5110 to the batteries, battery bank, or other loads. Generally, the power conditioner(s) 5302 facilitate matching the conditions for seamless transition of energy from one source to another, such as a battery to the grid, without disrupting the performance of the load. Power conditioner(s) 5302 also facilitate avoiding no-load conditions. In certain embodiments, the power conditioner(s) 5302 may be contained in a standalone unit associated with the solar canopy 100 rather than contained in the compartments 5122. Power conditioner(s) 5302 are generally known in the industry and will not be further explained herein except as necessary for a complete understanding of the present technology.

While suppling alternative electrical energy may reduce the on-peak demand of the associated unit to which the solar canopy is associated, whether the associated unit is a local building (commercial or residence) or grid, the high capacity storage batteries only store a portion of the overall energy need for the associated unit over the on-peak demand. That is to say, typically the high capacity storage batteries only provide reduced energy demands for a few hours of operation of most commercial buildings, which requires the commercial building to use grid power for the time the high capacity storage batteries cannot provide the full load of energy. In most cases, the high demands of the commercial building result from refrigerant systems, such as food storage, server room temperature control, or HVAC systems.

The technology of the present application provides that some of the plurality of compartments 5122 have equipment to store refrigerant energy. FIG. 44 provides an exemplary compartment 5122 including equipment to store refrigerant energy, also known as the refrigerant energy storage system 5400. While FIG. 44 shows a compartment only with equipment to store refrigerant energy, the compartment 5122 (as shown in FIG. 41) may include the energy storage equipment described above as well as refrigerant energy storage system 5400 equipment.

In certain embodiments of the technology, the compartment 5122 houses a refrigerant energy storage tank 5400 filled with a working fluid 5402, which may be, for example, water, salt water, certain waxes, or other material that experiences a phase change at the working temperature and pressure. The refrigerant energy storage tank 5400 would include insulation 5404 to retain the energy within the tank as much as possible. The refrigerant energy storage tank 5400 includes one or more fluid conduits 5406, which may be coils. The fluid conduits would be in fluid communication with a local refrigerant system 5408 of an HVAC or refrigerant system, which is not shown but generally understood in the art, through a conduit or pipe. The local refrigerant system 5408 would have a refrigerant fluid 5410 that would flow into and out of the refrigerant energy storage tank 5400 through the fluid conduits 5406.

During off-peak demand times, the refrigerant energy storage tank 5400 would evaporate the refrigerant fluid 5410, which would take heat from the working fluid 5402 causing the working fluid 5410 to become a liquid or a solid (depending on the phase change temperature). In the case of water, or salt-water, the working fluid 5410 would change to ice during off-peak demand times. This process stores refrigerant energy in the refrigerant energy storage tank 5400 (the energy storage is generally referred to as the latent heat of phase change). Generally, the compressor of the HVAC system or refrigerant system operates to cause the working fluid 5410 to change from water to ice in this exemplary working fluid example. The compressor of the HVAC or refrigerant system, however, is operating during off-peak demand when energy is more economical.

As explained above, the refrigerant fluid 5410 is used in refrigerant energy storage tank 5400 to add or remove energy from the working fluid 5402. Certain embodiments of the technology, however, may require additional separation between the refrigerant energy storage tank 5400 and the refrigerant fluid 5410. To facilitate the additional separation, a vapor compression cycle including compressors, pumps, evaporator, pipes, and valves may be incorporated into the compartment 5122 or a plurality of compartments 5122. In certain configurations, the equipment may be arranged such that several compartments 5122 work in conjunction. For example, a first compartment 5122 may include a refrigerant energy storage tank 5400 and a second compartment 5122 may include a compressor and pump to move refrigerant fluid 5410 between the local building and the refrigerant energy storage tank 5400 and/or an interim heat exchanger between the local building HVAC system or refrigeration system and the refrigerant energy storage tank 5400. Thus, a compartment having a refrigerant energy storage tank and a compressor may in fact be two compartments rather than a single compartment.

During on-peak demand times, the stored refrigerant energy is released back to the HVAC system by reversing the process and releasing heat from the refrigerant fluid 5410 to the working fluid 5402 causing the working fluid to become a gas or a liquid (again depending on the phase change temperature). In the case of ice, the working fluid 5402 would phase change from ice to water, or salt-water. While releasing the stored refrigerant energy back to the HVAC system or refrigerant system, the compressor of the HVAC system or refrigerant system will ideally be idle or operate minimally during time of on-peak demand times.

In certain embodiments, the stored electrical energy of the high capacity storage batteries 5130 or battery banks 5300 and/or the electrical energy from the renewable source, such as solar arrays 5110 or a wind turbine system 5200 may be used to power the compressor of the HVAC system or refrigerant system to recharge the refrigerant energy storage system and/or simply operate the compressors. Additionally, the compartments 5122, specifically compartments 5122 with a refrigerant energy storage tank 400, may include a canopy compressor 5140 (see FIG. 41). The canopy compressor 5140 would be powered from the high capacity batteries 5130, the renewable energy source, such as the solar array 5110 or the wind turbine system 5200, or from the power grid, typically through the power conditioner 5132 and inverters 5134. The canopy compressor 5140 may operate with a compression vapor cycle to take heat from the refrigerant energy storage tank 5400 to generally cause the working fluid 5402 to freeze. The canopy compressor may be used during off-peak demand times to store energy in the refrigerant energy storage tank 5400 (e.g., by removing heat as part of the compression vapor cycle) or extend the ability of the refrigerant energy storage tanks 5400 to deliver on-peak thermal energy to the local buildings HVAC system or refrigerant system by continuing to remove heat at its capacity as the working fluid 402 either melts or vaporizes.

In operation, the energy storage system, as shown in FIGS. 41-44, may include a processor, such as the servers mentioned throughout the application, capable of directing the flow of a refrigerant fluid 5410. During periods of off-peak demand (e.g., low energy cost), the refrigerant fluid 5410 removes heat from the refrigerant energy storage tank 5400 as well as the environment that the associated HVAC system and/or refrigerant system is servicing. During periods of on-peak demand (e.g., high energy costs), the refrigerant fluid 5410 adds heat to the refrigerant energy storage tank 5400, which effectively uses the stored energy in the refrigerant energy storage tank 5400 to cool the environment that the associated HVAC system and/or refrigerant system is servicing. The off-peak demand time and the on-peak demand time is generally known and can be pre-set into the processor such that the refrigerant energy storage tank 5400 is used during predetermined times. The processor may further receive a signal from a thermal sensor to facilitate regulation of the environment. Flow to and from the refrigerant energy storage tank 5400 may be increased or decreased as necessary to maintain a desired temperature or range of temperature. The working fluid 5402, and the associated latent heat of phase change, would be determined based on the desired temperature or range of temperature of the environment. Also, during periods of on-peak demand, should the compressor of the HVAC system or refrigerant system be required, the processor may first cause power to be supplied to the compressors from the high capacity storage batteries 5130 (or a battery bank 5300) or directly from one of the renewable sources, such as the solar array 5110 or the wind turbine system 5200. Power may be provided to the compressor from the grid at on-peak demand times when the other sources of refrigeration and electrical energy are otherwise insufficient or more costly.

In certain embodiments, the refrigerant fluid 5410 may simply be the atmosphere in the environment for the HVAC system or refrigerant system. During periods of when the compressor may be operating to regulate the environment, the cool atmosphere may be sufficiently cool to cause, for example, water to freeze, which is generally about 0° Celsius. Thus, when the compressor is working, the atmosphere takes heat away from the refrigerant energy storage tank. During periods when the compressor is not operating or operating minimally, the atmosphere may be forced through the refrigerant energy storage tank 400 to remove heat from the refrigerant energy storage tank. In this exemplary embodiment, the range of temperatures for the HVAC system and or refrigerant system must be sufficient to perform both functions.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

I claim:

1. An energy storage canopy comprising:

at least one vertical support and at least one horizontal support coupled together;

a solar array comprising a plurality of photovoltaic panels coupled to the roof of the energy storage canopy;

at least one compartment coupled to at least one of the at least one vertical support and the at least one horizontal support of the energy storage canopy, the compartment comprising:

at least one high capacity battery that can store at least 10 kilo-watt hours of electrical energy; and at least one opening between the solar array and the least one compartment configured to dissipate heat; and a junction box on the energy storage canopy operationally coupled to the at least one high capacity battery, wherein the junction box is configured to couple to local loads.

2. The energy storage canopy of claim 1, wherein the at least one compartment is operable to allow replacement of the at least one high capacity battery.

3. The energy storage canopy of claim 1, wherein the local loads include a power grid.

4. The energy storage canopy of claim 1, wherein the local loads comprise an electric vehicle charger configured to allow an electric vehicle to plug into the electric vehicle charger for charging.

5. The energy storage canopy of claim 4, wherein the electric vehicle charger is configured for high capacity charging.

6. The energy storage canopy of claim 1, wherein the local loads comprise an electrical generator.

7. The energy storage canopy of claim 1, wherein the local loads comprise a plurality of emergency equipment.

8. The energy storage canopy of claim 7, wherein the plurality of emergency equipment comprises at least one light.

9. The energy storage canopy of claim 7, wherein the emergency equipment includes communication equipment.

10. The energy storage canopy of claim 9, wherein the communication equipment includes an antenna.

11. The energy storage canopy of claim 10, wherein the antenna comprises an extendible antenna coupled to the energy storage canopy.

12. The energy storage canopy of claim 1, wherein the local loads comprise communications equipment.

* * * * *